US010501385B1

(12) United States Patent
Buckner et al.

(10) Patent No.: US 10,501,385 B1
(45) Date of Patent: Dec. 10, 2019

(54) NANOCOMPOSITE ENHANCED FUEL GRAINS

(71) Applicants: Steven Wayne Buckner, St. Louis, MO (US); Paul Jelliss, St. Louis, MO (US); Stephen Chung, Florissant, MO (US); Jacob M Laktas, St. Louis, MO (US); Gregory J Place, St. Louis, MO (US); Albert Michael Becksted, Jr., Brentwood Bay (CA)

(72) Inventors: Steven Wayne Buckner, St. Louis, MO (US); Paul Jelliss, St. Louis, MO (US); Stephen Chung, Florissant, MO (US); Jacob M Laktas, St. Louis, MO (US); Gregory J Place, St. Louis, MO (US); Albert Michael Becksted, Jr., Brentwood Bay (CA)

(73) Assignee: Saint Louis University, Saint Louis, MO (US)

( * ) Notice: Subject to any disclaimer, the term of this patent is extended or adjusted under 35 U.S.C. 154(b) by 369 days.

(21) Appl. No.: 15/681,349

(22) Filed: Aug. 19, 2017

Related U.S. Application Data

(63) Continuation-in-part of application No. 15/675,815, filed on Aug. 14, 2017, which is a
(Continued)

(51) Int. Cl.
*C06B 45/32* (2006.01)
*B22F 1/00* (2006.01)
(Continued)

(52) U.S. Cl.
CPC ............ *C06B 45/32* (2013.01); *B22F 1/0018* (2013.01); *B22F 1/0062* (2013.01); *B82Y 30/00* (2013.01);
(Continued)

(58) Field of Classification Search
CPC ......... C06B 45/00; C06B 45/18; C06B 45/30; C06B 45/32
(Continued)

(56) References Cited

U.S. PATENT DOCUMENTS 3,216,842 A * 11/1965 Skeist ................. C08L 2666/36
106/236
3,357,806 A 12/1967 Dvorak et al.
(Continued)

OTHER PUBLICATIONS

Agrawal, Jai P., High Energy Materials: Propellants, Explosives, and Pyrotechnics. Weinheim:Wiley VCH Verlag GmbH & Co. KgaA. 2010.
(Continued)

*Primary Examiner* — James E McDonough
(74) *Attorney, Agent, or Firm* — Benjamin Davis, Esq.

(57) ABSTRACT

The present invention generally concerns decomposing a ternary metal hydride to isolate nanoparticles to use in a fuel grain. More specifically, the present invention harnesses increased energy densities from two distinct nanoparticles isolated by a precise decomposition of $LiAlH_4$. The singular material is air stable and is a nanocomposite of $Li_3AlH_6$ nanoparticles, elemental Al nanoparticles, an amount of Ti metal, and a nanoscale organic layer. We call this nanocomposite nMx, which protects and preserves the high energy densities of the core metals isolated from the controlled reaction, making the nanoparticles safe to handle in air. The narrow distribution of nanoparticles has no byproducts or phase transitions that decrease energy output. The unique burning characteristics of nMx enhance the combustion of solid propellant formulations compatible with solid or hybrid rocket motors, where fuel grains are cast, pressed, or 3D printed with nMx powder, a polymeric binder, or optional additives.

15 Claims, 29 Drawing Sheets

Related U.S. Application Data continuation-in-part of application No. 15/659,557, filed on Jul. 25, 2017, now Pat. No. 10,173,945, which is a continuation-in-part of application No. 14/259,859, filed on Apr. 23, 2014, now abandoned, and a continuation-in-part of application No. PCT/US2016/046760, filed on Aug. 12, 2016.

(60) Provisional application No. 62/380,367, filed on Aug. 27, 2016, provisional application No. 62/517,194, filed on Jun. 9, 2017, provisional application No. 62/205,448, filed on Aug. 14, 2015, provisional application No. 62/377,562, filed on Aug. 20, 2016.

(51) Int. Cl.
*B82Y 30/00* (2011.01)
*B82Y 40/00* (2011.01)
*C06B 21/00* (2006.01)
*F02K 9/08* (2006.01)
*C06B 45/12* (2006.01)
*C06B 45/00* (2006.01)

(52) U.S. Cl.
CPC .......... *B82Y 40/00* (2013.01); *C06B 21/0083* (2013.01); *F02K 9/08* (2013.01)

(58) Field of Classification Search
USPC ............................................. 149/2, 3, 5, 6, 7
See application file for complete search history.

(56) References Cited

U.S. PATENT DOCUMENTS

| | | | | |
|---|---|---|---|---|
| 3,506,752 | A * | 4/1970 | Varnell | F16L 9/121 264/135 |
| 5,927,621 | A * | 7/1999 | Ziolo | B82Y 25/00 241/170 |
| 6,599,631 | B2 | 7/2003 | Kambe et al. | |
| 10,173,945 | B1 * | 1/2019 | Buckner | C06B 45/32 |
| 2003/0026757 | A1 | 2/2003 | Pecharsky et al. | |
| 2003/0164215 | A1 | 9/2003 | Woodson et al. | |
| 2006/0060272 | A1 | 3/2006 | Naud et al. | |
| 2010/0135937 | A1 * | 6/2010 | O'Brien | A61K 8/02 424/59 |
| 2011/0165061 | A1 | 7/2011 | Yang et al. | |
| 2012/0009424 | A1 | 1/2012 | Jelliss | |
| 2015/0086416 | A1 | 3/2015 | Anderson et al. | |
| 2015/0307962 | A1 * | 10/2015 | Jelliss | C01B 3/04 429/421 |
| 2016/0362594 | A1 * | 12/2016 | Rojas | C09K 8/467 |

OTHER PUBLICATIONS

Ehrlich et al. (1966) The Chemistry of Alane. XI. A New Complex Lithium Aluminum Hydride, Li3AlH6. Journal of the American Chemical Society, 88:4, pp. 858-860.

Dilts et al. (1971) A Study of the Decomposition of Complex Metal Hydrides. Inorganic Chemistry, vol. 11 No. 6, pp. 11230-1236.

Fasolino, L. G. Department of Navy—Office of Naval Research. (1963) Heat of Formation of Li3AlH6. Washington, DC.

Choi, J.Y. et al. (2011) Reaction Mechanisms in the Li3AlH6/LiBH4 and Al/LiBH4 Systems for Reversible Hydrogen Storage. Part 1: H Capacity and Role of Al. The Journal of Physical Chemistry C, 115, pp. 6040-6047.

Buzea, C., Pacheco-Blandino, I. I., et al. (2007) Nanomaterials and nanoparticles: Sources and toxicity. Biointerphases, vol. 2(issue 4), pp. MR17-MR172.

Balema et al. (2000) Rapid solid-state transformation of tetrhedral [AlH4]—into octahedral [AlH6]—in lithium aluminhydride. Chemical Communications—The Royal Society of Chemisty, pp. 1665-1666.

Balema et al. (2001) Titanium catalyzed solid-state transformation in LiAlH4 during high-energy ball milling. Journal of Alloys and Compounds, vol. 329, pp. 108-114.

Chen et al. (2001) Reversible Hydrogen Storage via Titanium-Catalyzed LiAlH4 and Li3AlH6. J. Phys. Chem. B, vol. 105, pp. 11214-11220.

"Incomplete reactions in nanothermite composites", Jacob, Rohit J.; Ortiz-Montalvo, Diana L.; Overdeep, Kyle R.; Weihs, Timothy P.; Zachariah, Michael R., Journal of Applied Physics, (2017), 121(5), 054307/1-054307/10.

"Safer Energetic Materials by a Nanotechnological Approach" Siegert, Benny; Comet, Marc; Spitzer, Denis, Nanoscale (2011), 3(9), 3534-3544.

B. P. Aduev, D. R. Nurmukhametov, R. I. Furega, and I. Yu. Liskov, Russian Journal of Physical Chemistry B, 2014, vol. 8, No. 6, pp. 852-855.

M. F. Gogulya, M. A. Brazhnikov, M. N. Makhov, A. Yu. Dolgoborodov, A. V. Lyubimov, and I. L. Sokolov, Russian Journal of Physical Chemistry B, 2012, vol. 6, No. 6, pp. 730-743.

A. D. Warren, G. W. Lawrence, and R. J. Jouet, proceedings of the Conference of the American Physical Society Topical Group on Shock Compression of Condensed Matter, 955, 1018-1021 (2007).

Pyrz W. D., et al., (2008) Particle Size Determination Using TEM: A Discussion of Image Acquisition and Analysis for the Novice Microscopist, Langmuir, 24, pp. 11350-11360.

Varin, et al. (2010) Decomposition behavior of unmilled and ball milled lithium alanate (LiAlH4) including long-term storage and moisture effects. Journal of Alloys and Compounds 504 89-101.

Ghanta, S. R.; et al. (2010) Solution phase chemical synthesis of nano aluminium particles stabilized in poly (vinylpyrrolidone) and poly(methylmethacrylate) matrices. Nanoscale, 2, 976-980.

Thomas et al., "Synthesis of aluminum nanoparticles capped with copolymerizable epoxides," J. Nanopart. Res., 15:1729, 2013.

Thomas et al., "Energetic nanoparticle formation by the thermal decomposition of alanates," ACS National Meeting, Abstract 306, 2013.

Mahendiran, C. et al. (2009) Sonoelectrochemical Synthesis of Metallic Aluminum Nanoparticles. Eur. J. Inorg. Chem. 2050-2053.

\* cited by examiner

PXRD of nMx$_{11}$

PXRD of nMx₁₂

PXRD of nMx₁₃

PXRD for nMx₁₆

PXRD for nMx$_{19}$

PXRD for nMx$_{20}$

FTIR Spec for nMx$_{20}$

Raman Spec for nMx$_{12}$

Raman Spec for nMx₁₃

Raman Spec for nMx₁₆

Raman Spec for nMx$_{19}$

DCS/TGA for nMx$_{10}$

DCS/TGA for nMx$_{11}$

DCS/TGA for nMx$_{12}$

DCS/TGA for nMx₁₃

DCS/TGA for nMx$_{16}$

DCS/TGA for nMx$_{19}$

TEM of nMx$_{10}$

TEM of nMx$_{12}$

TEM of nMx$_{13}$

TEM of nMx₁₆

TEM of nMx$_{19}$

TEM of nMx$_{20}$

NANOCOMPOSITE ENHANCED FUEL GRAINS

RELATED APPLICATIONS

This patent application claims priority to and is a continuation-in-part of U.S. patent application Ser. No. 15/675,815 filed on Aug. 14, 2017. U.S. patent application Ser. No. 15/675,815 claims priority to and is a continuation-in-part of U.S. patent application Ser. No. 15/659,557 filed on Jul. 25, 2017. U.S. patent application Ser. No. 15/659,557 claims priority to and is a continuation-in-part of U.S. patent application Ser. No. 14/259,859 filed on Apr. 23, 2014. U.S. patent application Ser. No. 15/659,557 claims priority to U.S. Prov. Pat. App. No. 62/377,562 filed on Aug. 20, 2016, U.S. Prov. Pat. App. No. 62/380,367 filed on Aug. 27, 2016, and U.S. Prov. Pat. App. No. 62/517,194 filed on Jun. 9, 2017. U.S. patent application Ser. No. 15/659,557 is also claims priority to and is a continuation-in-part of PCT/US2016/046760 filed on Aug. 12, 2016, where PCT/US2016/046760 claims priority to U.S. Prov. Pat. App. No. 62/205,448, filed Aug. 14, 2015.

GOVERNMENT INTEREST

This invention was made with government support under Subrecipient Agreement No. RSC10011, Rev. No. 1; Prime Cooperative Agreement No. FA8650-10-2-2934 awarded by US Air Force Research Lab Nanoenergetics Program and CHE-0963363 awarded by the National Science Foundation. The Government has certain rights in the invention.

FIELD OF THE INVENTION

The present invention generally concerns decomposing a ternary metal hydride to isolate nanoparticles to use in a fuel grain. More specifically, the present invention harnesses increased energy densities from two distinct nanoparticles isolated by a precise decomposition of $LiAlH_4$. The singular material is air stable and is a nanocomposite of $Li_3AlH_6$ nanoparticles, elemental Al nanoparticles, an amount of Ti metal, and a nanoscale organic layer. We call this nanocomposite nMx, which protects and preserves the high energy densities of the core metals isolated from the controlled reaction, making the nanoparticles safe to handle in air. The narrow distribution of nanoparticles has no byproducts or phase transitions that decrease energy output. The unique burning characteristics of nMx enhance the combustion of solid propellant formulations compatible with solid or hybrid rocket motors, where fuel grains are cast, pressed, or 3D printed with nMx powder, a polymeric binder, or optional additives.

BACKGROUND OF THE INVENTION

Of Combustion & Work

Combustion and fire represent the earliest reactions used to perform work. It involves the burning of a fuel in the presence of an oxidizer to produce heat, potential flames and smoke, and reaction byproducts (gases). All chemical changes due to combustion are accompanied by the flow of heat energy into or out of a chemical system. Processes that can perform work take advantage of energy flow from fuels during oxidation reactions.

Industry is constantly seeking new source materials, or advanced fuels, that produce a great amount of heat at a reasonable cost. The present invention meets this need by disclosing a nanomaterial that displays unique combustion characteristics. nMx is a nanocomposite of $Li_3AlH_6$ nanoparticles, elemental Al metal nanoparticles, an amount of Ti metal, and a nanoscale organic layer. The present invention's heat of combustion, $\Delta H°$, is higher than historical $\Delta H°$ values for burning materials typically used as advanced fuels.

Having high energy densities is an important measure for novel fuels and energetic materials. Higher energy densities indicate that a material can do more work while having a lighter mass and/or volume, which is of particularly importance as it impacts the ability to launch payloads into space, lightens the weight of aircrafts to fly faster, and gives the creation of munitions more flexibility.

Our composite falls within many classifications of advanced fuels due to its air-stability and tune-able combustion properties. We tune the chemical composition of our nanocomposite to ensure an energy density (both volumetric and gravimetric) that is suited for use as an additive to liquid propellants, a solid propellant, as additives to high energy materials, for use with explosives, pyrotechnics, for use as a source material for welding reactions, and as a source material for advanced materials production.

Metal Particles & Combustion

Due to the present invention disclosing the combustion of two distinct nanosized core metals, we address the importance of metals that burn. The combustion characteristics of metal particles make them viable alternatives to high energy fossil fuels. Iron or aluminum can be milled, or synthesized, and turned into solid fuel grains for lifting payloads into space or creating thermite hot enough to cut through steel. Some metal powders burn like hydrocarbon fuels. The energy and power of a metal-burning engine are comparable to traditional combustion engines. Metal powders often have shorter ignition delays, they burn faster, and have a higher volumetric energy density (energy per unit volume of fuel) than do fossil fuels and other organic materials. An increased volumetric energy density reduces the size of the launch vehicle and improves efficiency through better aerodynamics.

Creating metal particles with high-energy output is challenging. There are serious safety concerns in handling the starting materials and reactant products, unfeasible reaction times, high production costs, and competing reactions at the metal's surfaces. The present invention discloses nMx as a nanocomposite that overcomes such hurdles and produces novel burning profiles by harnessing the combustion properties of a homogeneous mixture of $Li_3AlH_6$ nanoparticles, elemental Al nanoparticles, an amount of Ti metal, and a nanoscale organic layer. The energetic nanoparticles are safe to handle in air for use in applications.

Aluminum Metal & Combustion

Aluminum is a valuable and versatile metal. Small aluminum particles are commonly used as an additive to propellants to increase energy output of a material or base fuel, a non-limiting example being nanoscale aluminum increasing the ignition probability of diesel fuels [1]. Al micro-particles are used in kiloton amounts for solid rocket boosters and other solid rocket propellants. While there are many applications for nanoscale aluminum materials, there are challenges with producing air stable aluminum nanoparticles having diameters smaller than 100 nm for industrial or commercial use.

When not in its neutral elemental (0) oxidation state, natural aluminum exists in a $^{+3}$-oxidation state. Any process to reduce $Al^{3+}$ to $Al^0$, by gaining the three electrons, requires a large amount of energy. Because of its high reactivity, pure aluminum readily reacts with oxygen or water to form a layer of aluminum oxide or hydroxide on its outer surfaces, which explains why pure aluminum is mostly found and used in one of its many oxidized forms, non-limiting examples being $Al_2O_3$ or the mineral bauxite.

The oxide layer that forms on aluminum's surfaces greatly reduce the metal's combustion properties. The oxide blocks the core metal. This blocking slows the combustion process, and it prevents systems needing a high-energy output and a high burn rate from taking full advantage of the metal's ability to combust.

In smaller nanoparticles, aluminum's oxide layer can account for more than 70% of the nanoparticle's mass. The combustion inefficiency of aluminum metal increases for nanoparticles with diameters less than 20 nm. The oxide coating significantly lowers the nanoparticle's energy density, slows the nanoparticle combustion rate, may prevent complete aluminum nanoparticle consumption, and can reduce hydrogen absorption for storage applications.

Commercially available aluminum is very inefficient as a fuel or fuel additive. A non-limiting example being solid fuels using ammonium perchlorate, $NH_4ClO_4$, as an oxidizer for reducing aluminum metal beads bound to solid rubber. Once the rubber is ignited and starts to burn, the oxidizer reacts exothermically with the fuel, thereby forming $O^{2-}$ and $Al^{3+}$ and producing an energy release. Oxygen diffuses into the outer layer of the metal to form aluminum oxide, $Al_2O_3$. The oxygen from the oxidizer can only diffuse by about 20 microns into the surface of a pre-coated aluminum bead. Every single aluminum bead has a coating of $Al_2O_3$ that is approximately 100 nm thick. A fair amount of the aluminum metal does not participate in combustion due to the protective oxidized layer on each bead.

This phenomenon is evidenced by the expulsion of byproducts during rocket launches. Molten aluminum chunks are ejected from the nozzle as a non-contributory element to gas expansion and thrust. When aluminum beads burn, the $Al_2O_3$ coating thickens. The additional oxide further slows combustion by reducing the amount of pure aluminum metal that participates in reduction to create an effective energy release for a combustion engine. The passivated surfaces of the present invention give a greater amount of surface reactivity for both $Li_3AlH_6$ nanoparticles and elemental Al nanoparticles for combustion events.

Recounting $Li_3AlH_6$

The production of complex metal hydrides has a somewhat convoluted purpose, where some seek reducing agents, others seek a hydrogen storage material, and still others seek ways of exploiting the material as an advanced fuel or additive. The purpose often dictates the method of making these materials, e.g. ball milling, using varied starting materials for solvent based synthesis, and the like, thereby producing dispersions and a range of sizes within a bulk metal.

Although lithium aluminum hexahydride, $Li_3AlH_6$, sparks the imagination as an energy source, it is a difficult material to work with. There are many drawbacks to $Li_3AlH_6$ being a viable energy source. $Li_3AlH_6$ is wildly expensive, where the pricing for 1 kg of $Li_3AlH_6$ can run as high as $20,000 USD. $Li_3AlH_6$ is unstable and reacts with water and ambient gases to produce spontaneous burning. In their "natural" form most metal hydrides are not safe to handle in air. Because our nanocomposite is a first reporting of a cost-effective method for creating stabilized $Li_3AlH_6$ nanoparticles, making $Li_3AlH_6$ nanoparticles air safe and sensible for applications, we present a brief retelling of important moments for $Li_3AlH_6$.

Synthesis of $Li_3AlH_6$ was first reported by Ehrlich et al. in the late 1960's, and the thermal decomposition of $LiAlH_4$ into $Li_3AlH_6$ was later reported by Dilts and Ashby in the early 1970's. Since then, $LiAlH_4$ has become commonly used in industrial processes as a reducing agent to convert esters, carboxylic acids, acyl chlorides, aldehydes, and keytones into their corresponding alcohols, as drying agents, and as materials for hydrogen gas storage [2-4].

$LiAlH_4$ and $Li_3AlH_6$, as with most of the metal hydrides, are highly reactive with water and ambient gases. These chemicals are pyrophoric and must be carefully handled and stored. When $LiAlH_4$ is heated, Dilts and Ashby found that the thermal decomposition of $LiAlH_4$ occurs in three steps as follows:

$$3LiAlH_4 \rightarrow Li_3AlH_6 + 2Al + 3H_2 \;(150°\,C.\text{-}170°\,C.), \qquad (R1)$$

$$2Li_3AlH_6 \rightarrow 6LiH + 2Al + 3H_2 \;(185°\,C.\text{-}200°\,C.), \qquad (R2)$$

$$LiH + Al \rightarrow LiAl + \tfrac{1}{2}H_2 \;(\text{above } 400°\,C.). \qquad (R3)$$

$LiAlH_4$ is metastable at room temperature and partially decomposes into $Li_3AlH_6$ over very long periods of time. However, reaction steps R2 and R3 will occur at temperatures above 150° C. Meaning, to make nMx, it is vital to hold the reaction vessel below 150° C. to keep the decomposition of $LiAlH_4$ to R1, where we further alter the surfaces of $Li_3AlH_6$ nanoparticles and elemental Al nanoparticles as needed [4].

In 1963, the heat of formation for $Li_3AlH_6$ was measured as $\Delta H_{298°} = -79.40$ kcal/mol. The reaction was driven in 4 N HCl in a closed bomb, where the final $\Delta H_{298}°$ value was estimated from $\Delta H_{298°}$ values obtained for aluminum, lithium, and $Li_3AlH_6$ [5]. Zaluska et al. reports a DSC scan for ball milled bulk $Li_3AlH_6$ having a burn event at about 240° C.-260° C. [20].

Chen et al. uses a vibrating mill technique to make nanocrystallites of $LiAlH_4$ and $Li_3AlH_6$, where two different experiments are performed to measure $H_2$ gas desorption and resorption [6]. Firstly, Chen et al. vibrate mills $LiAlH_4$ along with titanium chloride anhydrous aluminum reduced ($TiCl_3 \cdot \tfrac{1}{3}AlCl_3$) for up to one hour. They report that alkoxide catalysts, such as titanium-n-butoxide ($Ti(OBu)_4$), are highly problematic for their reversible hydrogen experiments. Chen et al. mills $LiAlH_4$ into a micro scaled (μm) powder that contains a range of particle sizes, including dispersed $LiAlH_4$ nanocrystals below 20 nm. However, Chen et al. could not convert $LiAlH_4$ into both $Li_3AlH_6$ nanoparticles and elemental Al nanoparticles [6].

Secondly, in a separate experiment, Chen et al. vibrate mills $2LiH + LiAlH_4$ along with titanium chloride anhydrous aluminum reduced ($TiCl_3 \cdot \tfrac{1}{3}AlCl_3$) for up to one hour to create $Li_3AlH_6$. The result is $TiCl_3$ doped $Li_3AlH_6$ nanocrystals that are granular shaped at about 20 nm. Chen et al. believe the $Li_3AlH_6$ nanocrystals are due to many factors including the presence of a separate Ti phase and a nanocrystalline Al and $Ti_xAl_y$ phase associated with the milled powder [6]. However, Chen et al. does not give PXRD data substantiating the presence of Al nanocrystals in their powder, which should give strong PXRD peaks in terms of 2Θ at ~37°, ~45°, ~65°, and ~78° as compared to other methods that report PXRD peaks for elemental Al nanoparticles [7].

In both instances, Chen et al. does not create a true nanoparticle system by stopping the decomposition of $LiAlH_4$ at the first reaction step. Chen et al. examines the catalytic effect of a $Ti^0/Ti^{2+}/Ti^{3+}$ defect on $H_2$ formation and resorption of $Li_3AlH_6$. Chen et al. continues the reaction through $Li_3AlH_6$ decomposition, $2Li_3AlH_6 \rightarrow 6LiH + 2Al +$ $3H_2$. They create large bundles of multiple nanocrystals that have been fused together by cold welding, where the creation and extraction of single crystal nanoparticles is impossible. Also note that Chen et al.'s nanocrystalline domains are randomly dispersed within a system that is primarily bulk material that range from about 1 μm to about 10 μm in size [6].

U.S. Pat. Pub. No. 2003/0026757 as filed by Percharsky et al. discloses the release of hydrogen gas from mechanical processing of a metal hydride at room temperature. In one instance, the starting material may be $LiAlH_4$. The reaction takes place in the absence of any solvents to forcefully collect hydrogen gas from the storage material. The process does not use any nanostructures [8].

Choi et al. disclose the use of a $Li_3AlH_6/LiBH_4$ mixture as a reversible storage medium for making hydrogen gas via ball milling Choi et al.'s ball milling conditions are adjusted to account for unexpected reactions or changes in the original phases [9]. The process of ball milling results in aggregated nanocrystallites that morph into larger mesoscale structures that are not nanoparticles. All materials were unstable in air and were handled in a glove box under an inert atmosphere.

Varin et al. disclose the effects of ball milling on nm sized (300 nm to 90 nm±30 nm) $LiAlH_4$. Through DSC data, they report a thermal decomposition of $LiAlH_4$ to micron sized $Li_3AlH_6$ between 190° C.-300° C. [24]. Varin et al. does not create a true nanoparticle system by stopping the decomposition of $LiAlH_4$ at the first reaction step. Varin et al. continues the reaction past $Li_3AlH_6$ decomposition to form LiH and Al molecules, $2Li_3AlH_6 \rightarrow 6LiH+2Al+3H_2$ [24].

U.S. Pat. Pub. No. 2011/0165061 as filed by Yang et al. discloses a method of increasing thermal conductivity in hydrogen storage systems [10]. Yang creates a reversible reaction for making hydrogen gas by forcing $Li_3AlH_6$ and $Mg(NH_2)_2$ to liberate hydrogen under certain thermal conditions. Because metal hydrides are inherently poor thermal conductors, Yang et al. cool their ball milled particles with an aluminum film that acts as a heat sink. All of Yang et al.'s materials are air unstable.

The present invention is the first to harness the energetic properties of nanoscaled products created from the thermal decomposition of $LiAlH_4$ for combustion processes. None of the references disclose a bottom-up synthesis that creates a homogenous material composed of nanoparticles of both $Li_3AlH_6$ and elemental Al metal that are carefully sized and passivated by a nanoscale organic layer at the first reaction step of $LiAlH_4$ decomposition. nMx is air stabilized, contains a certain amount of Ti metal, is safe to handle, and protects and preserves the combustion properties of the same for energy applications. Therefore, there is a need for the present invention.

SUMMARY OF THE INVENTION

It is a primary objective of the present invention to provide a solid propellant formulation being a combination of a nanocomposite powder, a polymeric binder, and optional additives, where the nanocomposite powder further comprises a first nanoparticle being $Li_3AlH_6$ and a second nanoparticle being elemental Aluminum metal, wherein both nanoparticles are associated with an amount of Ti metal and are passivated by a nanoscale organic layer.

It is an aspect of the present invention where the solid propellant formulation includes a polymeric binder being, without limitation, polypropylene, PP Homopolymer (HPPP), PP Copolymer (CPPP), Polylactic Acid (PLA), acrylonitrile-butadiene-styrene (ABS), High Impact Polystyrene (HIPS), Thermoplastic Elastomer (TPE), Ethylene Vinyl Acetate (EVA), PolyAmide (PA), PE Low Density (LDPE/LLDPE), PE High Density (HDPE), Thermoplastic Elastomer, Polyphenylene Sulphide, thermoplastic polyurethane or polybutadienes $((C_4H_6)_n)$, polybutadiene-acrylic acid terpolymer, styrene block-copolymers, thermoplastic silicone elastomer, aliphatic or semi-aromatic polyamides, thermoplastic vulcanisate, polyvinyl alcohol, polycarbonate, polylactic acid, polymethylmethacrylate, polyethylene, polystyrene, nylon, polycarbonate, polyvinyl chloride, Teflon, glycidyl azide polymer (GAP), BAMO, NMMO, HTPB, Low Viscosity HTPB (hydroxyl-terminated polybutadiene/LV HTPB), polyurethane or polybutadienes $((C_4H_6)_n)$, polybutadiene-acrylic acid (PBAA), polybutadiene-acrylic acid terpolymer, polybutadiene-acrylic acid acrylonitrile (PBAN) carboxyl terminated polybutadiene (CTPB), elastomeric polyesters, polyethers, polymerized epoxy resins, poly-norbornene, poly-norbornadiene, poly-dicyclopentadiene, poly-cyclopentene, poly-cycloheptene, poly-cyclooctene, poly-cyclooctadiene, poly-cyclododecene, poly-7-oxanorbornene, poly-7-oxanorbornadiene, or any combination thereof.

It is an aspect of the present invention where the solid propellant formulation has optional additives that may include, without limitation, a powdered oxidizer, plasticizers, a fuel, a curing agent, a bonding agent, a burn rate modifier, or any combination thereof.

It is an aspect of the present invention wherein the powdered oxidizer includes, without limitation, ammonium perchlorate ($NH_4ClO_3$) powder, metal perchlorates, metal nitrates, ammonium nitrate, ammonium dinitramide ($NH_4N(NO_2)_2$), or any combination thereof.

It is an aspect of the present invention wherein the plasticizer includes, without limitation, dioctyl sebacate, dioctyl adipate ("DOA"), isodecyl perlargonate (IDP), dioctyl phthalate ("DOP"), or any combination thereof.

It is an aspect of the present invention wherein the fuel includes, without limitation, micron aluminum (Al 32 μm or 44 μm), beryllium, zirconium, titanium, boron, magnesium, or alloys or combinations thereof.

It is an aspect of the present invention wherein the curing agent includes, without limitation, Modified diisocyanate (143L), polyurethane hexamethylene diisocyanate ("HMDI"), isophorone diisocyanate ("IPDI"), toluene diisocyanate ("TDI"), trimethylxylene diisocyanate ("TMDI"), dimeryl diisocyanate ("DDI"), diphenylmethane diisocyanate ("MDI"), naphthalene diisocyanate ("NDI"), dianisidine diisocyanate ("DADI"), phenylene diisocyanate ("PDI"), xylene diisocyanate ("MXDI"), ethylenediisocyanate ("HDI"), triisocyanates, polyfunctional isocyanates, or any combination thereof.

It is an aspect of the present invention wherein the bonding agent includes, without limitation, coconut oil, palm oil, cottonseed oil, vegetable oil, soybean oil, olive oil, peanut oil, corn oil, sunflower oil, safflower oil, jojoba oil, canola oil, shea butter, cocoa butter, milk fat, amaranth oil, apricot oil, argan oil, avocado oil, babassu oil, ben oil, algaroba oil, coriander seed oil, false flax oil, grape seed oil, hemp oil, kapok seed oil, meadowfoam seed oil, okra seed oil, perilla seed oil, tepanol, poppyseed oil, prune kernel oil, pumpkin seed oil, quinoa oil, ramtil oil, rice bran oil, camellia oil, thistle oil, wheat germ oil, poly amines (HX-752), beeswax, chinese wax, lanolin, shellac wax, bayberry wax, candelilla wax, carnauba wax, castor wax, esparto wax, japan wax, ouricury wax, rice bran wax, soy wax, tallow tree wax, ceresin wax, montan wax, ozocerite, peat wax, petroleum wax, paraffin wax, microcrystalline wax, or any combination thereof.

It is an aspect of the present invention wherein the polymeric binder includes, without limitation, polypropylene, PP Homopolymer (HPPP), PP Copolymer (CPPP), Polylactic Acid (PLA), acrylonitrile-butadiene-styrene (ABS), High Impact Polystyrene (HIPS), Thermoplastic Elastomer (TPE), Ethylene Vinyl Acetate (EVA), Poly-Amide (PA), PE Low Density (LDPE/LLDPE), PE High Density (HDPE), Thermoplastic Elastomer, Polyphenylene Sulphide, thermoplastic polyurethane or polybutadienes $((C_4H_6)_n)$, polybutadiene-acrylic acid terpolymer, styrene block-copolymers, thermoplastic silicone elastomer, aliphatic or semi-aromatic polyamides, thermoplastic vulcanisate, polyvinyl alcohol, polycarbonate, polylactic acid, polymethylmethacrylate, polyethylene, polystyrene, nylon, polycarbonate, polyvinyl chloride, Teflon, or any combination thereof, wherein these polymeric binders are compatible base materials for 3D printing techniques including fused deposition modeling (FDM), Selective Laser Sintering (SLV), Stereolithography, Continuous Liquid Interface Production, powder bed printing, or Inkjet Head printing, and wherein said base material is endowed with the burning characteristics of the nanocomposite powder.

It is an aspect of the present invention wherein the polymeric binder is a matrix for the nanocomposite powder and is endowed with the burning characteristics of the same. The polymeric binder includes optional additives being a powdered oxidizer, plasticizers, a fuel, a curing agent, a bonding agent, a burn rate modifier, or any combination thereof. In addition, the polymeric binder may be cast, molded, extruded, or machined into a cylindrical shape having a center port that is star shaped, circular shaped, Maltese cross shaped, clover shaped, helix shaped, double anchor, rod in tube, or any combination thereof, so long as there is an outer cylindrical body having two distal ends and a hollow inner cavity.

It is an aspect of the present invention wherein the cylindrical shaped polymeric binder having a center port may be used as a fuel grain for a solid rocket motor or a hybrid rocket motor.

It is an aspect of the present invention wherein the hybrid rocket motor includes pressurized gaseous oxidizers such as hydrogen peroxide, nitrous oxide, oxygen, or any combination thereof.

It is an aspect of the present invention wherein the nanocomposite powder may be pressed, cast, or 3D printed within a solid fuel grain with a mass from 0.05% to 50% along with any one of the polymeric binders having a mass from 1% to 20%, and a solid oxidizer having a mass from 50% to 80%.

It is an aspect of the present invention wherein the nanocomposite powder may be pressed, cast, or 3D printed within a solid fuel grain with a mass from 0.05% to 50% along with any one of the polymeric binders having a mass from 1% to 50%.

It is an aspect of the present invention where the mass percentage of the nanoscale organic layer about the two distinct core metal nanoparticles in the solid propellant formulation can vary from 25% to 75% by mass of the nanocomposite and includes, without limitation: 1,7-octadiene, 1,9-decadiene, myrcene, or 1,13-tetradecadiene, 1,3-butadiene, isoprene, 2-methyl-1,3-pentadiene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4 diethyl 2,4-diethyl-1,3-butadiene, 2,3-di-n-propyl-1,3-butadiene, and 2-methyl-3-isopropyl-1,3-butadiene, fatty alcohols being tert-butyl alcohol, tert-amyl alcohol, 3-methyl-3-pentanol, ethchlorvynol, 1-octanol (capryl alcohol), pelargonic alcohol (1-nonanol), 1-decanol (decyl alcohol, capric alcohol), undecyl alcohol (1-undecanol, undecanol, hendecanol), lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol), heptadecyl alcohol (1-n-heptadecanol, heptadecanol), stearyl alcohol (1-octadecanol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), ceryl alcohol (1-hexacosanol), 1-heptacosanol, montanyl alcohol, cluytyl alcohol, or 1-octacosanol, 1-nonacosanol, myricyl alcohol, melissyl alcohol, or 1-triacontanol, 1-dotriacontanol (lacceryl alcohol), geddyl alcohol (1-tetratriacontanol), cetearyl alcohol, carboxylic (fatty) acids being butyric acid [CH3(CH2)2COOH], valeric acid $[CH_3(CH_2)_3COOH]$, caproic acid $[CH_3(CH_2)_4COOH]$, enanthic acid $[CH_3(CH_2)_5COOH]$, caprylic acid $[CH_3(CH_2)_6COOH]$, pelargonic acid $[CH_3(CH_2)_7COOH]$, capric acid $[CH_3(CH_2)_8COOH]$, undecylic acid $[CH_3(CH_2)_9COOH]$, lauric acid $[CH_3(CH_2)_{10}COOH]$, tridecylic acid $[CH_3(CH_2)_{11}COOH]$, myristic acid $[CH_3(CH_2)_{12}COOH]$, pentadecylic acid $[CH_3(CH_2)_{13}COOH]$, palmitic acid $[CH_3(CH_2)_{14}COOH]$, margaric acid $[CH_3(CH_2)_{15}COOH]$, stearic acid $[CH_3(CH_2)_{16}COOH]$, nonadecylic acid $[CH_3(CH_2)_{17}COOH]$, arachidic acid $[CH_3(CH_2)_{18}COOH]$, PEG having various molecular weights, tetraethylene glycol, triethylene glycol, or any combination thereof.

BRIEF DESCRIPTION OF THE FIGURES

The following figures are non-limiting examples of the present invention and are not intended to narrow the scope of the same.

Figure 1:
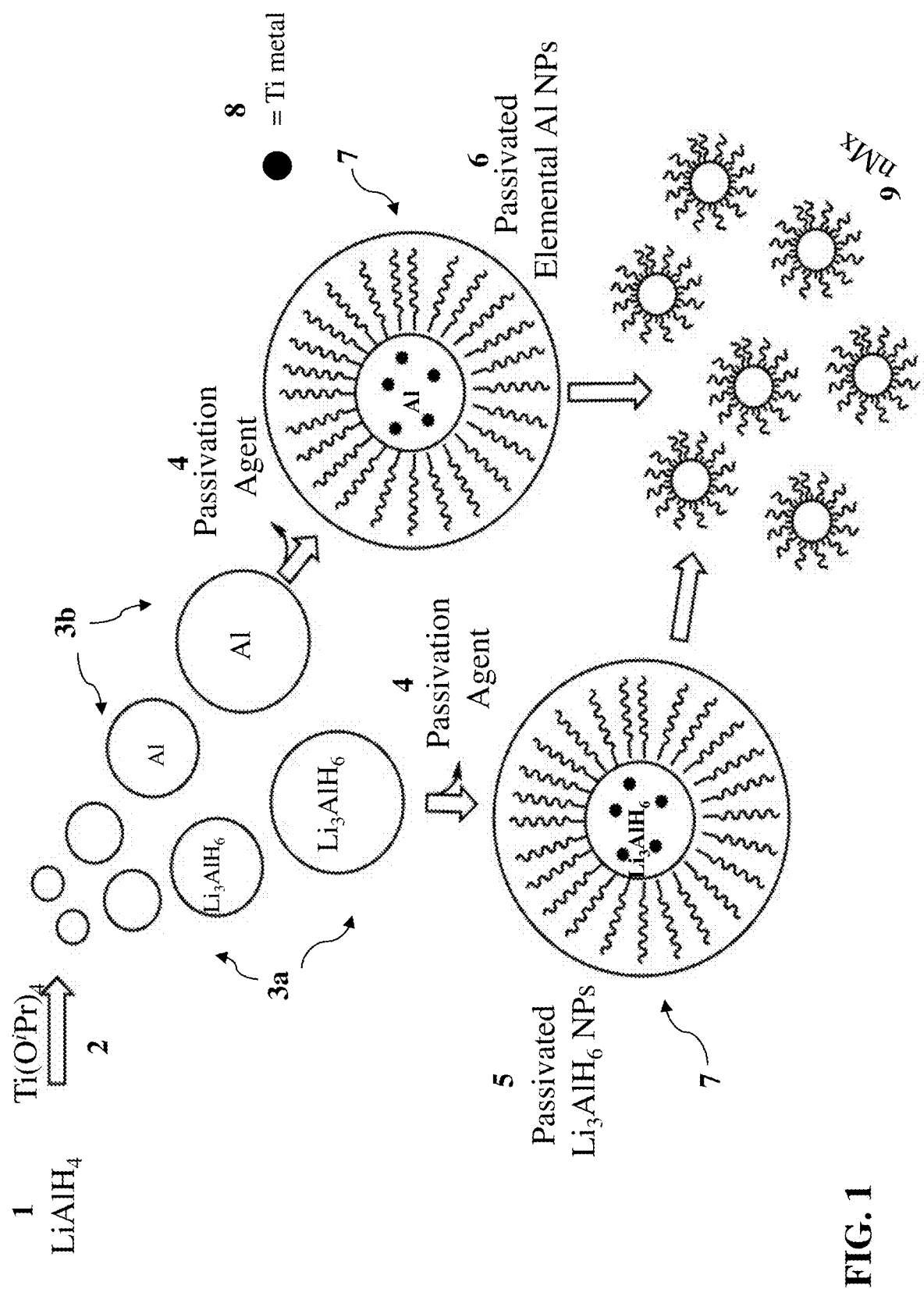
FIG. 1 depicts a bottom up synthesis for the nMx nanocomposite 9. Ti alkoxides 2 react to decompose LiAlH$_4$ 1 at 100° C. The alkoxide 2 acts as a nanoparticle initiator, where the decomposition of LiAlH$_4$ 1 creates molecular seeds of Li$_3$AlH$_6$ 3a and elemental Al 3b metals by which the nanoparticles grow. A passivation agent 4 is added to the reaction. A monolayer passivation scheme 7 is detailed using hydrophobic capping agents 4 with a reactive head group. The reaction is stopped when the passivated nanoparticles 5, 6 are roughly from about 8.5 nm to 100 nm in diameter, where Ti 8 remnants associate with both the Li$_3$AlH$_6$ nanoparticles and the elemental Al nanoparticles in the final nMx nanocomposite 9.
Figure 2:
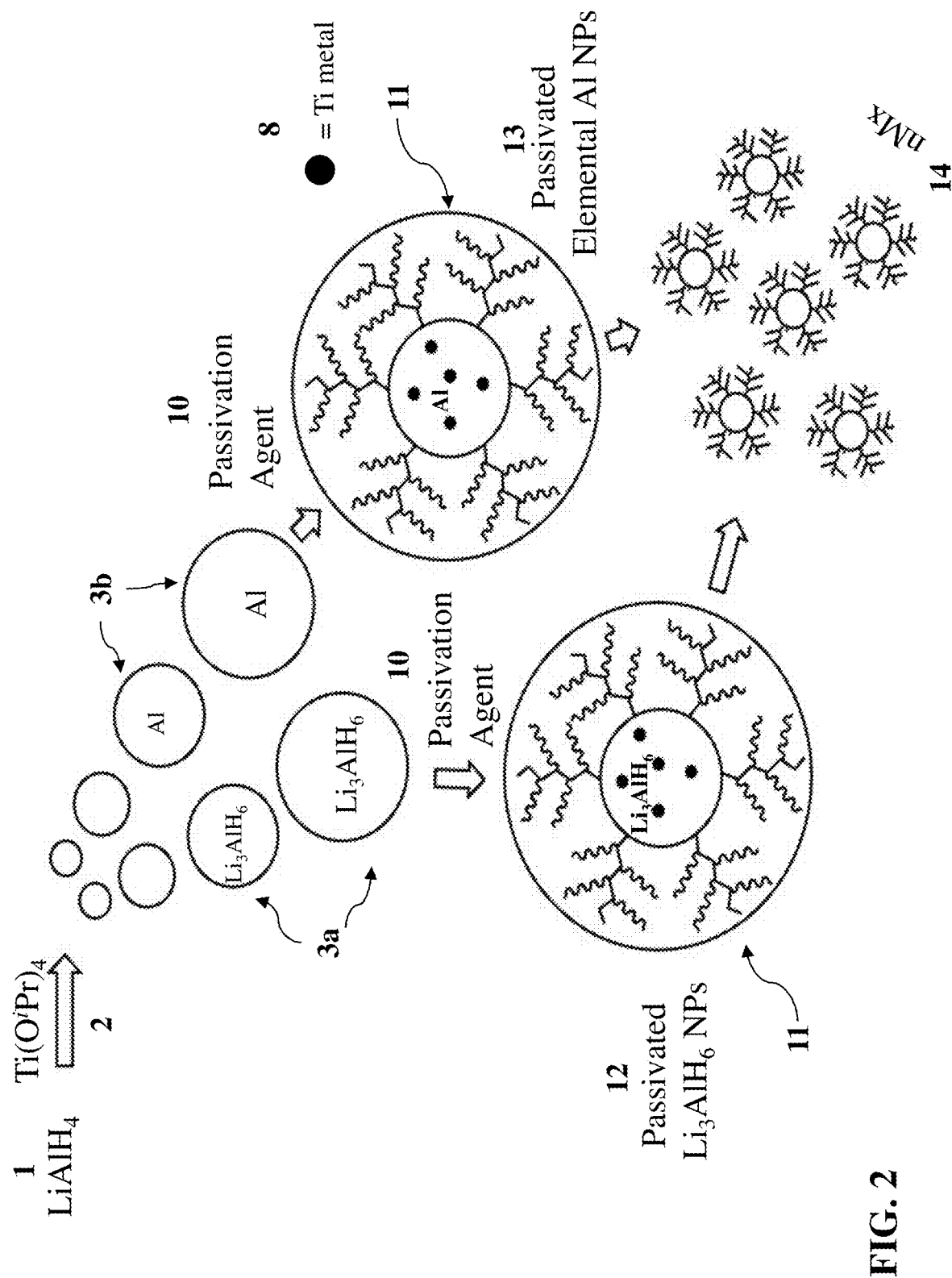
FIG. 2 depicts a bottom up synthesis for the nMx nanocomposite 14. Ti alkoxides 2 react to decompose LiAlH$_4$ 1 at 100° C. The alkoxide 2 acts as a nanoparticle initiator, where the decomposition of LiAlH$_4$ 1 creates molecular seeds of Li$_3$AlH$_6$ 3a and elemental Al 3b metals by which the nanoparticles grow. A passivation agent 10 is added to the reaction. Here, passivation occurs through polymerization of the passivation agent 10 about the surfaces of the Li$_3$AlH$_6$ nanoparticles 3a and elemental Al nanoparticles 3b using hydrophobic capping agents 10 with a polymerizable head group. The reaction is stopped when the passivated nanoparticles 12, 13 are roughly from about 8.5 nm to 100 nm in diameter, where Ti 8 remnants associate with both the $Li_3AlH_6$ nanoparticles and the elemental Al nanoparticles in the final nMx nanocomposite 14.
Figure 3:
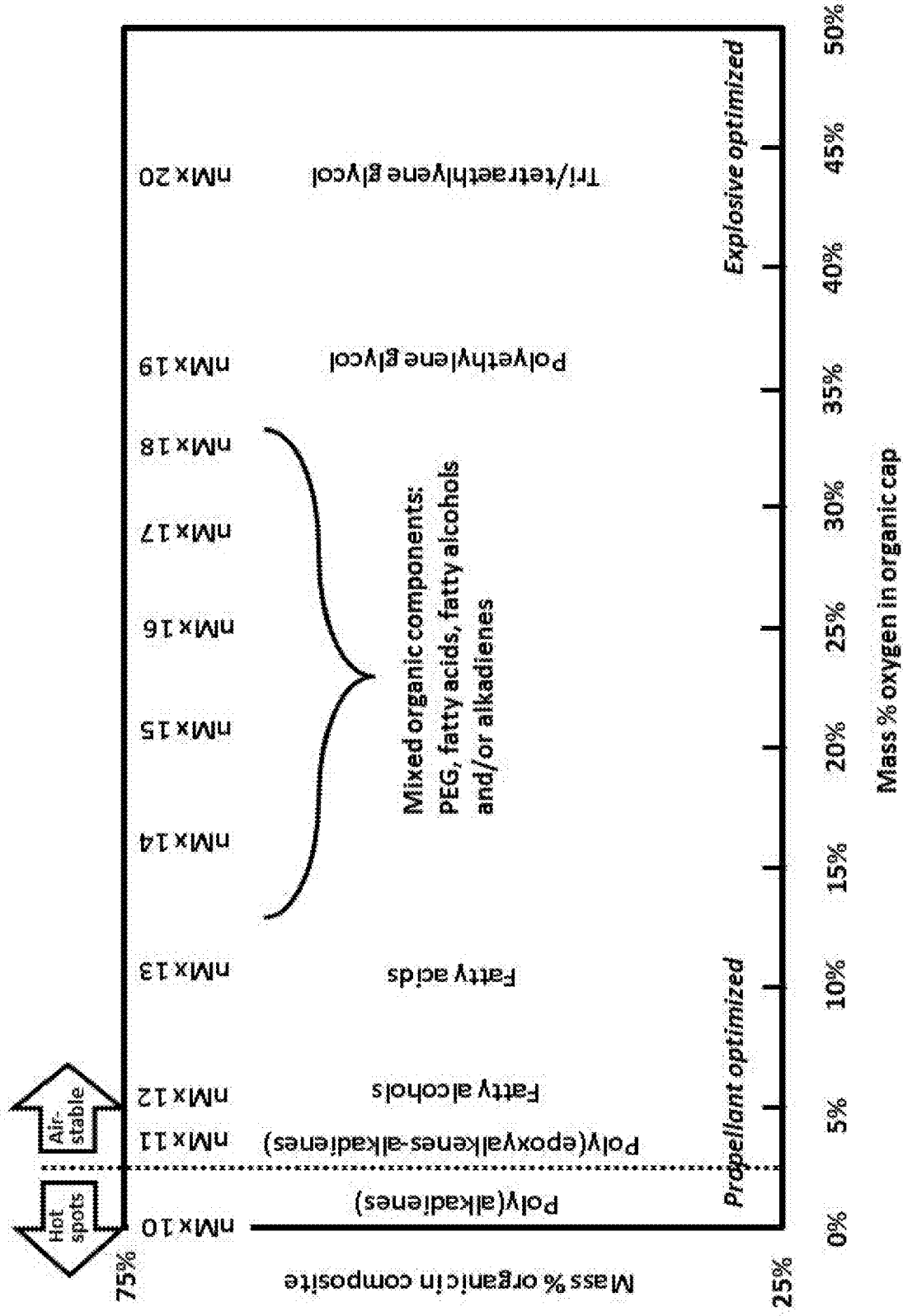

FIG. 3 depicts, in chart form, variations in the oxygen atom mass percentages for the nanoscale organic layer used between $nMx_{10}$ and $nMx_{20}$. The nMx nanocomposites between $nMx_{10}$ and $nMx_{20}$ has oxygen atom (O) mass percentages between 0% and 42% respectively. The x-axis of FIG. 3 shows the variation in passivation agents. The y-axis of FIG. 3 represents the total mass percentage of organic in the nanocomposite. At one end, $nMx_{10}$ has a polymerized organic hydrocarbon cap, where the O atom mass percentage is 0%, and, at the other end, $nMx_{20}$, having polyethylene oxide capping structure, has an O atom mass percentage of ~42%.

Figure 4:
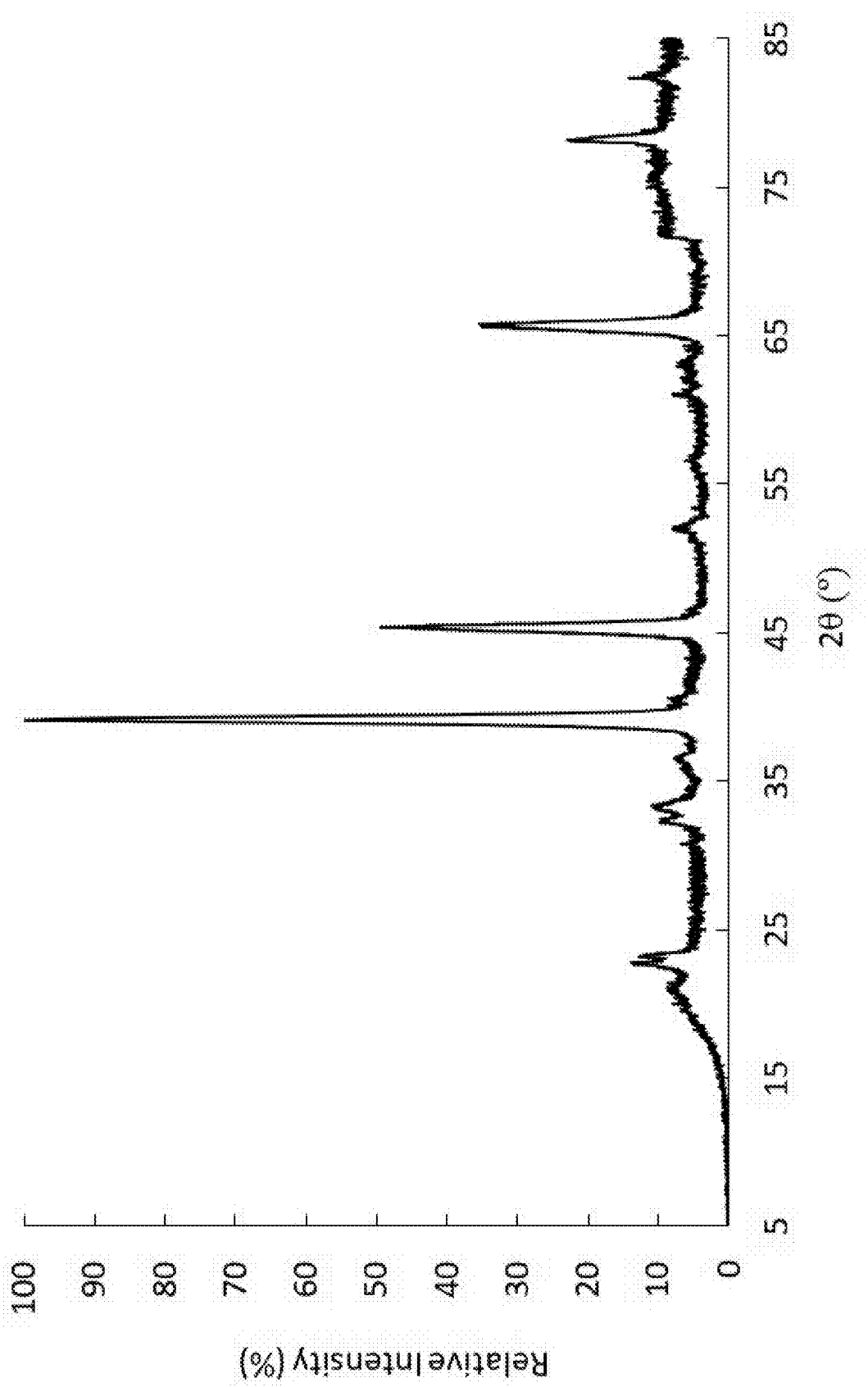

FIG. 4 depicts a PXRD diffraction pattern for $nMx_{11}$, having peaks about the x-axis rendered in degrees relative to 2Θ. For FIGS. 4-9, the y-axis is labeled as Relative Intensity from 0% to 100%. The highest peak (100%) is attributed to elemental Al NPs at 38.4° and $Li_3AlH_6$ gives double peaks throughout the diffraction pattern. All PXRD diffractograms give nearly identical information for the core crystalline nanoparticles.

Figure 5:
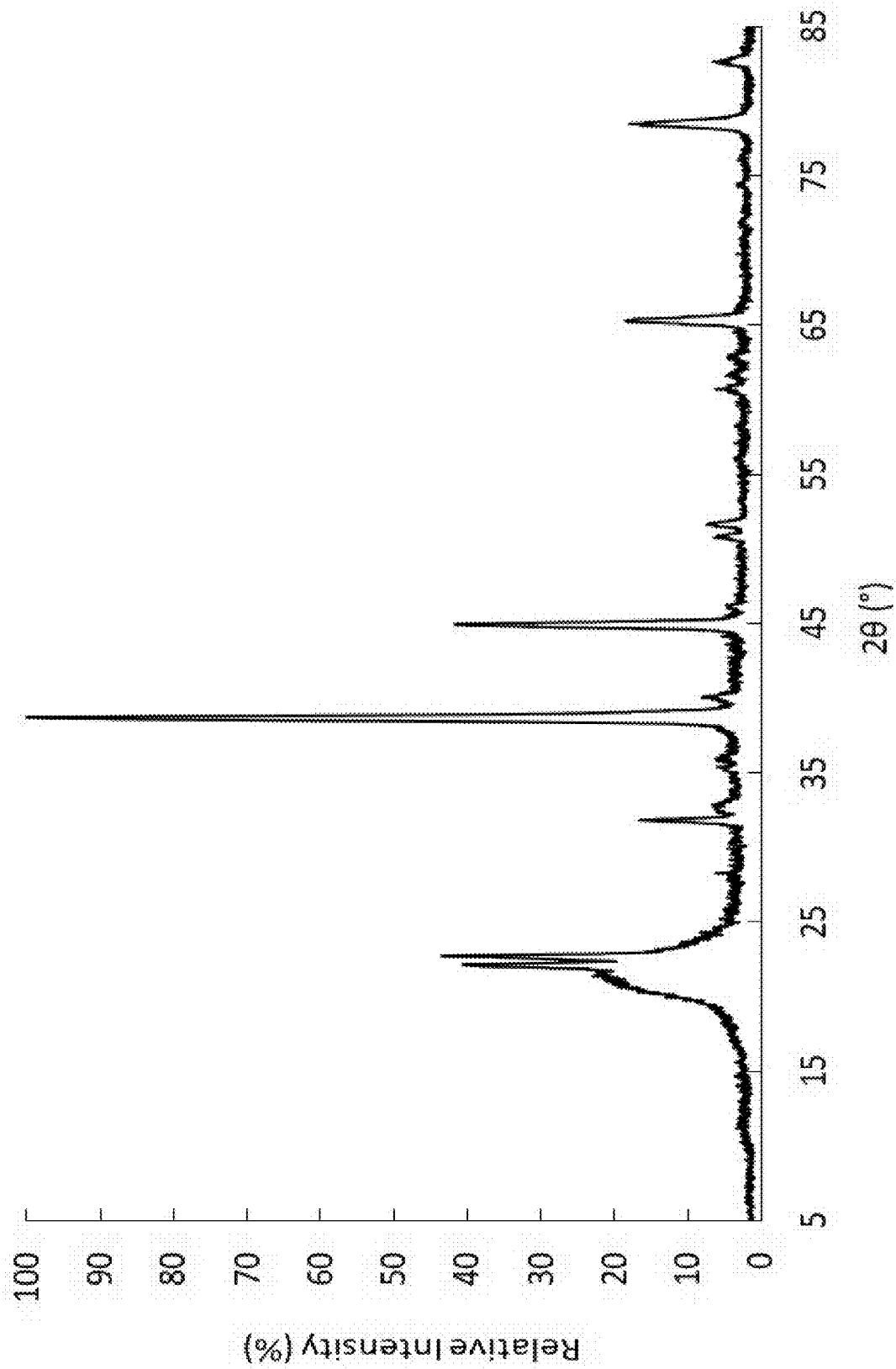

FIG. 5 depicts a PXRD diffraction pattern for $nMx_{12}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.

Figure 6:
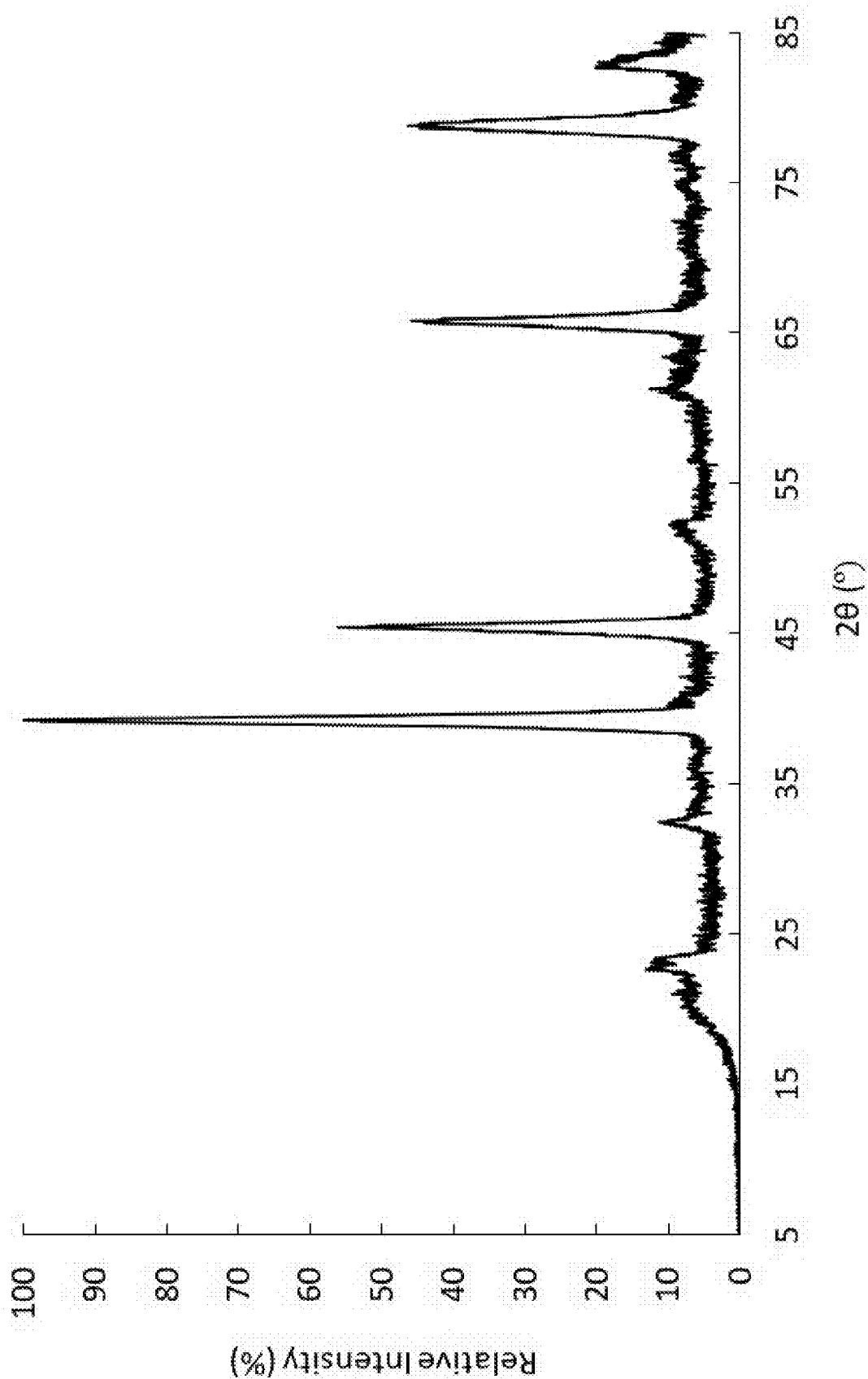

FIG. 6 depicts a PXRD diffraction pattern for $nMx_{13}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.

Figure 7:
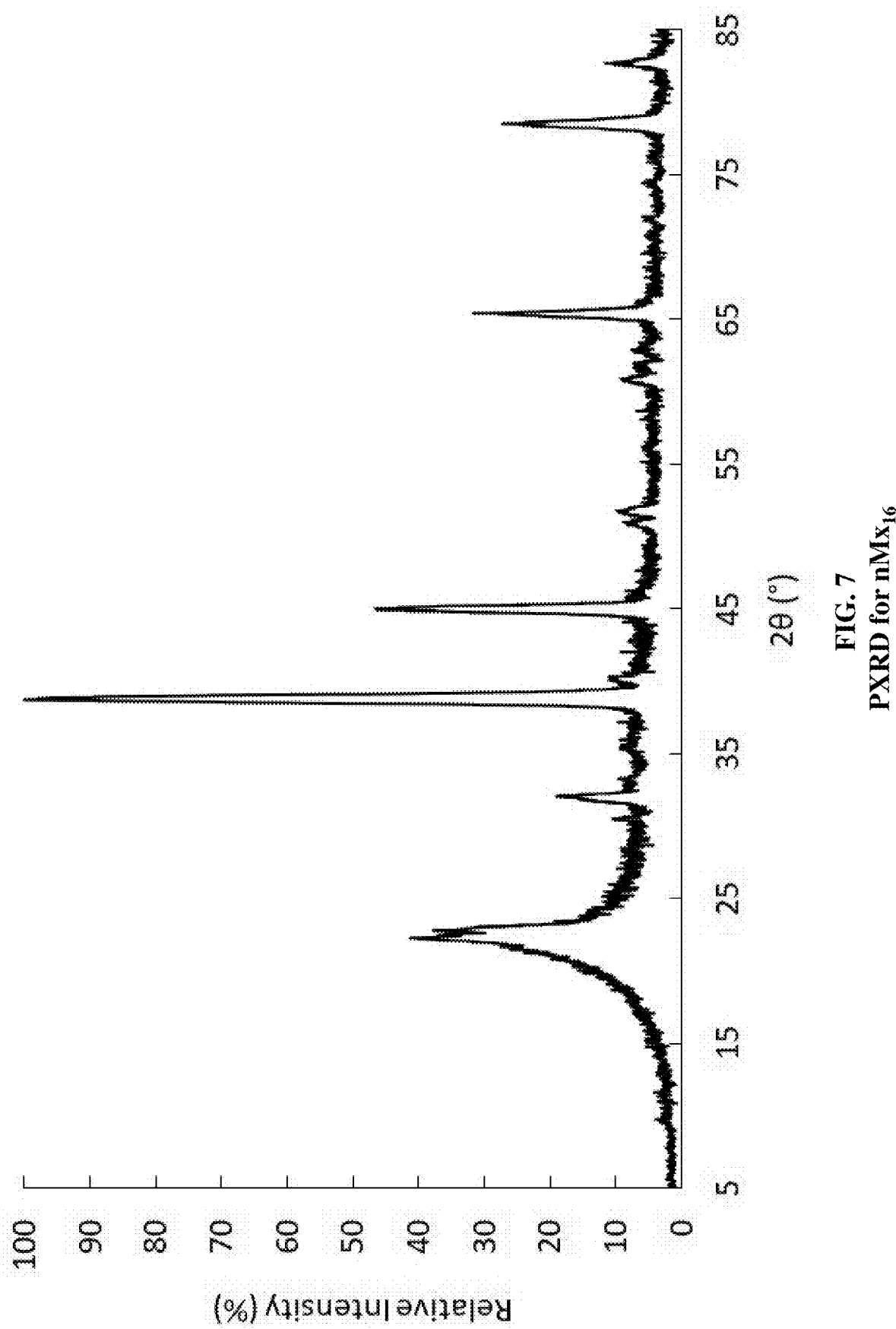

FIG. 7 depicts a PXRD diffraction pattern for $nMx_{16}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.

Figure 8:
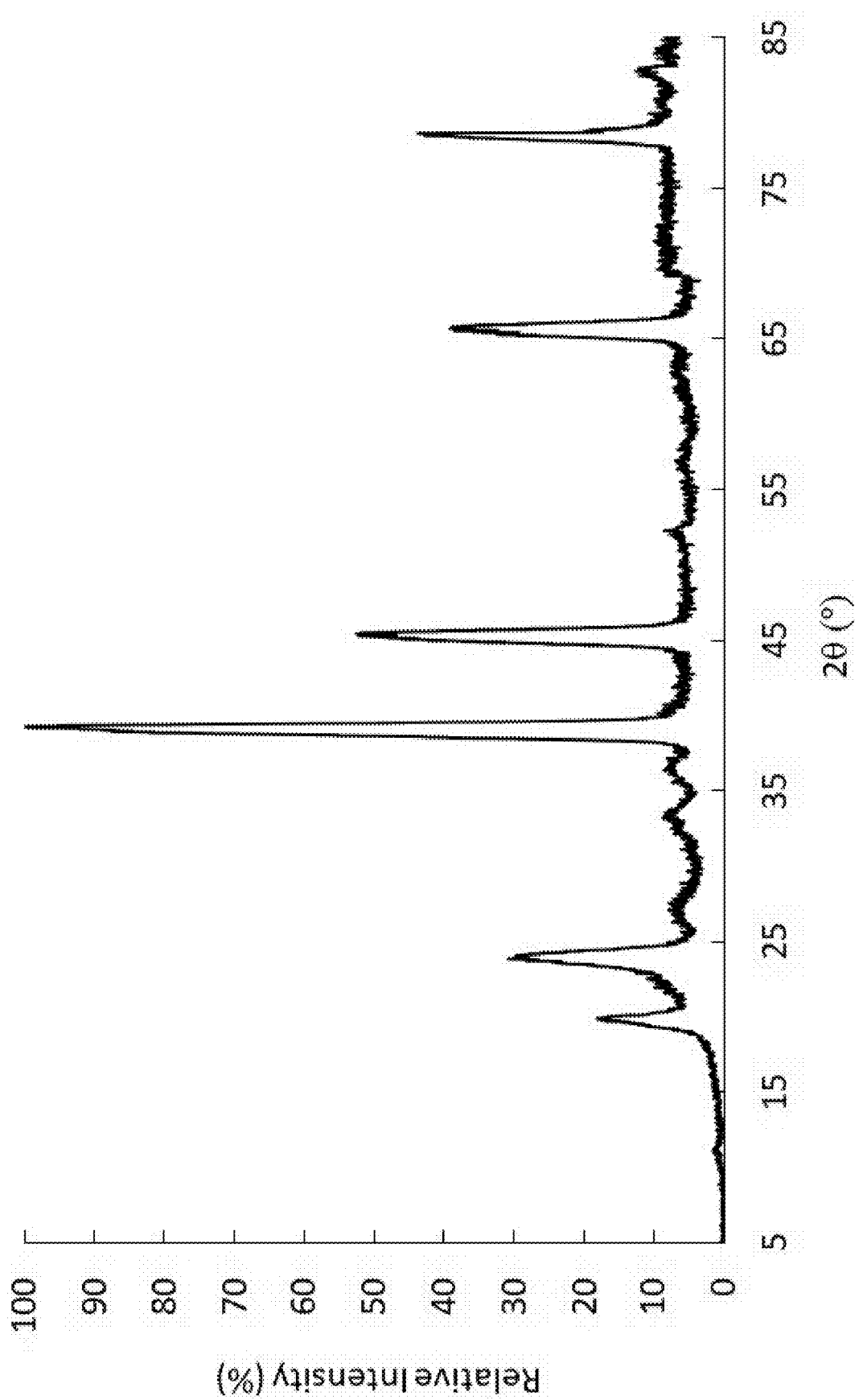

FIG. 8 depicts a PXRD diffraction pattern for $nMx_{19}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.

Figure 9:
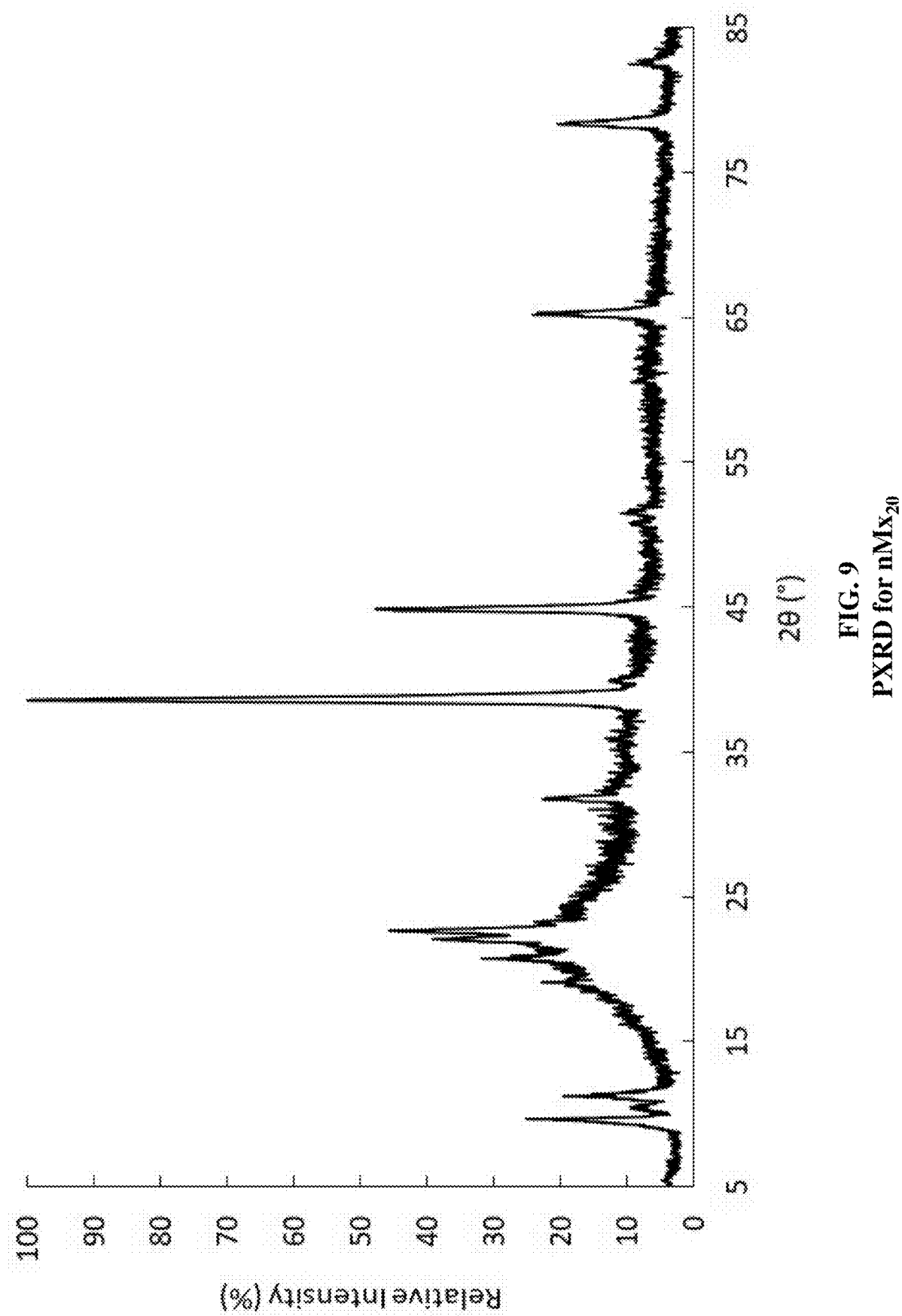

FIG. 9 depicts a PXRD diffraction pattern for $nMx_{20}$, having peaks about the x-axis rendered in degrees relative to 2Θ. The y-axis is labeled as Relative Intensity from 0% to 100%. The highest peak (100%) is attributed to elemental Al NPs at 38.4° and $Li_3AlH_6$ gives double peaks throughout the diffraction pattern.

Figure 10:
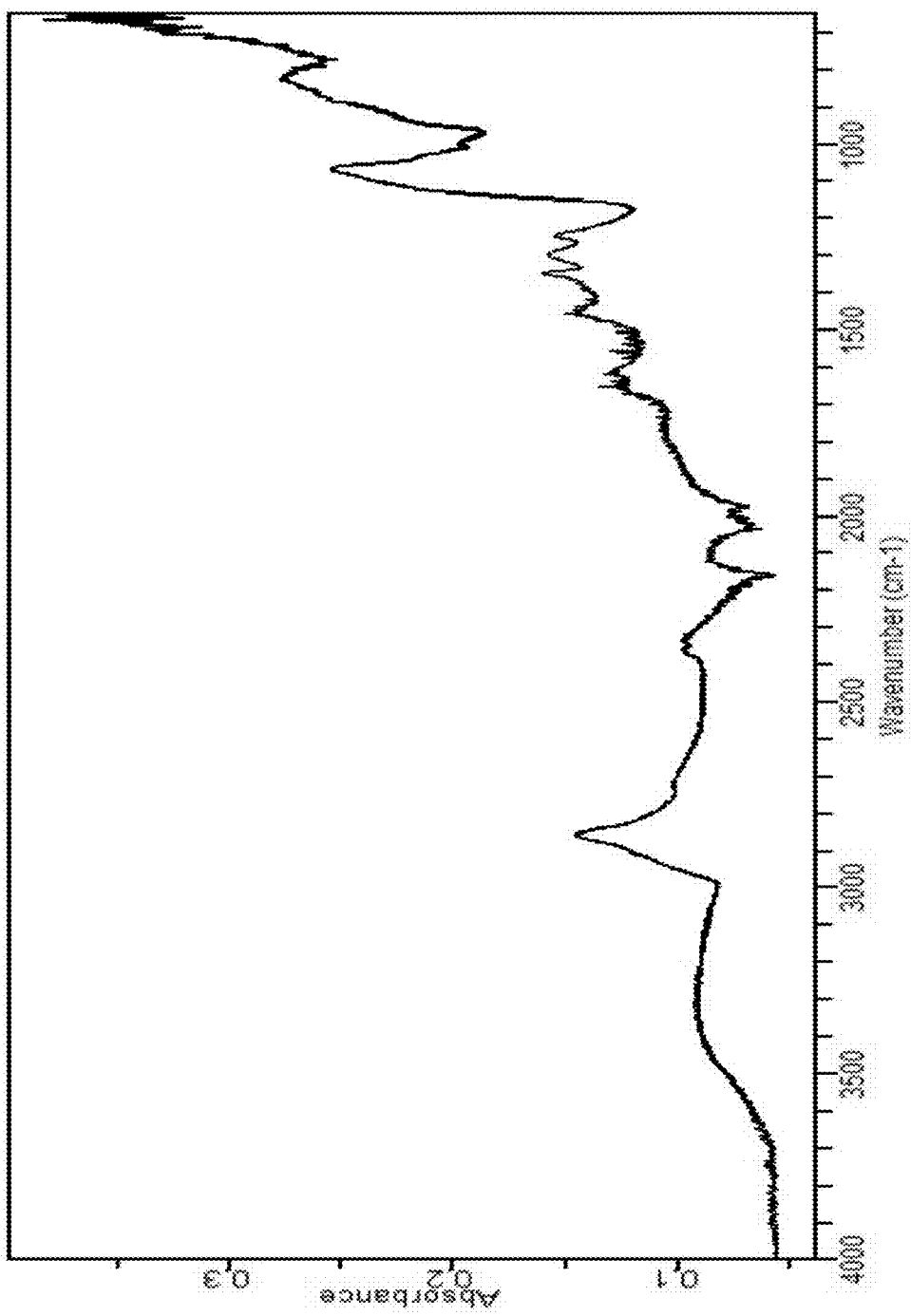

FIG. 10 depicts FTIR stretching frequencies of the nanoscale organic layer for $nMx_{20}$. The nanoscale organic layer is a glycol and shows a band at 1080 $cm^{-1}$ (C—O stretching in the glycol) and at 2850-2970 $cm^{-1}$ (C—H stretching in the glycol). This indicates that the there is an association with the glycol nanoscale organic layer and the two distinct core nanoparticles.

Figure 11:
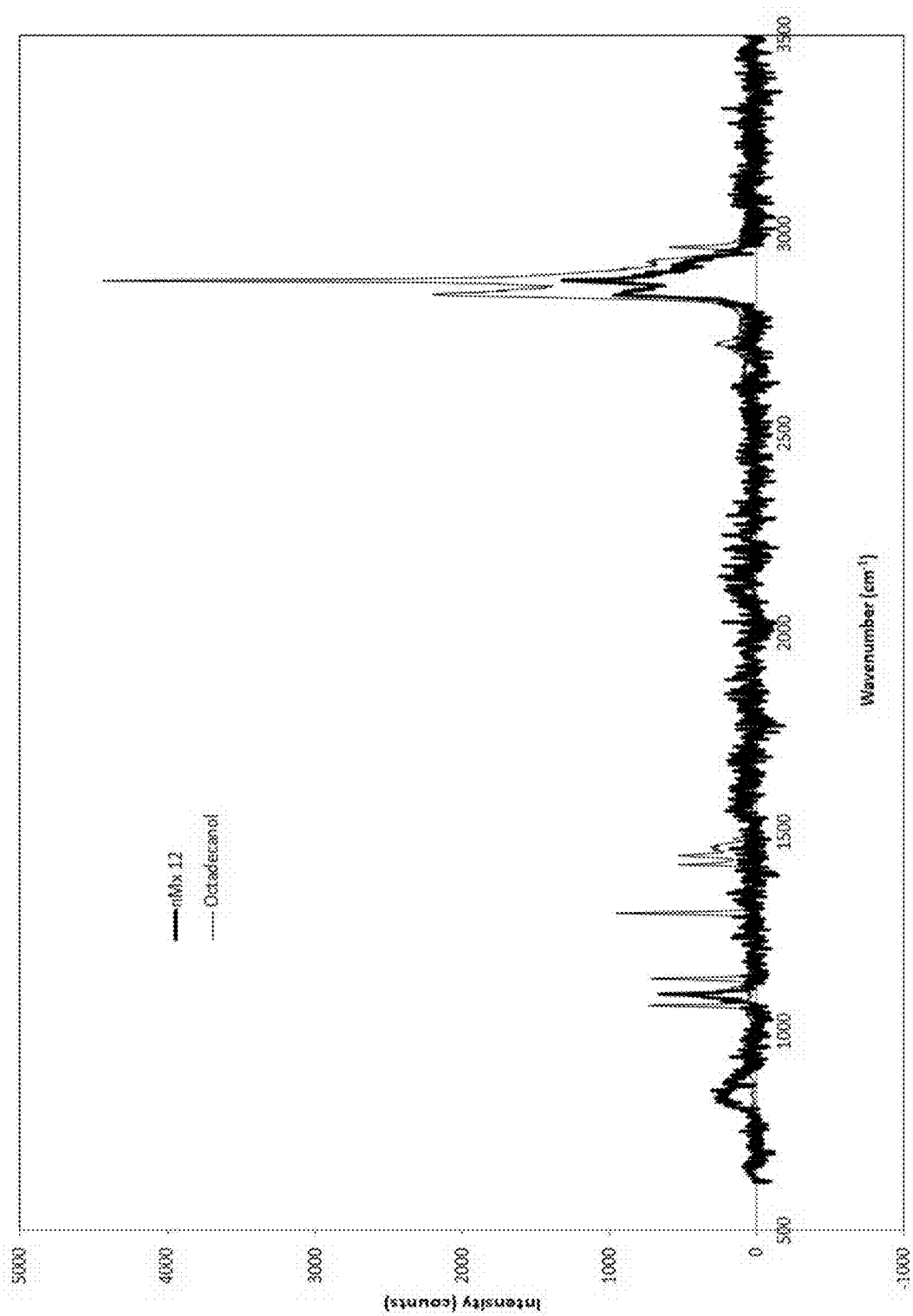

FIG. 11 depicts Raman scattering for $nMx_{12}$, where octadecanol is the nanoscale organic layer. The Raman scan is performed from 500 $cm^{-1}$ to 3500 $cm^{-1}$. Octadecanol gave Raman frequencies for $nMx_{12}$ at about 1092 $cm^{-1}$ (C—O stretch) and at about 2850-2920 $cm^{-1}$ (C—H stretch).

Figure 12:
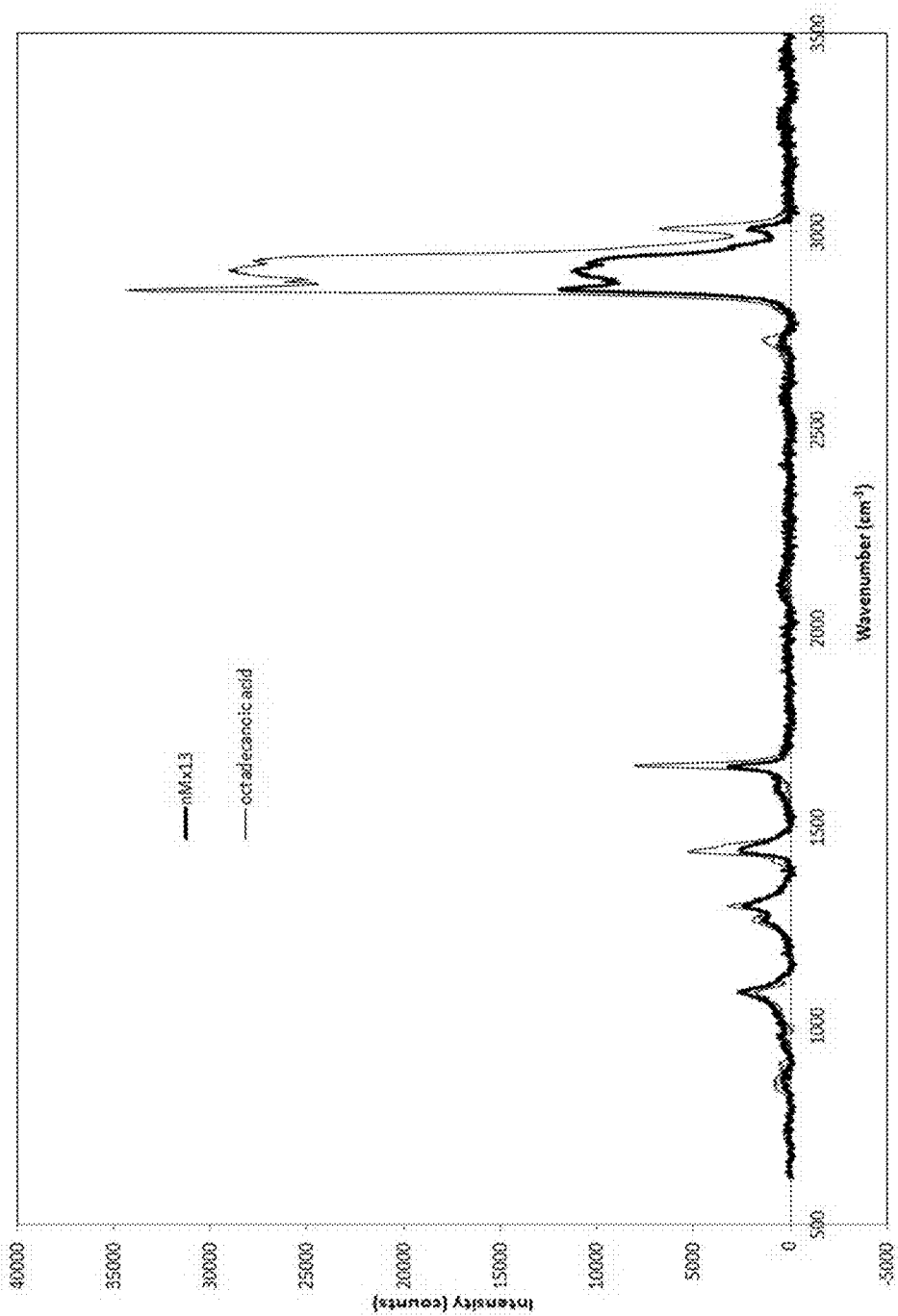

FIG. 12 depicts Raman scattering for $nMx_{13}$, where octadecanoic acid is the nanoscale organic layer. The Raman scan is performed from 500 $cm^{-1}$ to 3500 $cm^{-1}$. Octadecanoic acid gave Raman frequencies for $nMx_{13}$ at about 1294 $cm^{-1}$ (C—O stretch), at about 1645 $cm^{-1}$ (C=O stretch), and at about 2841-3024 cm' (C—H stretch).

Figure 13:
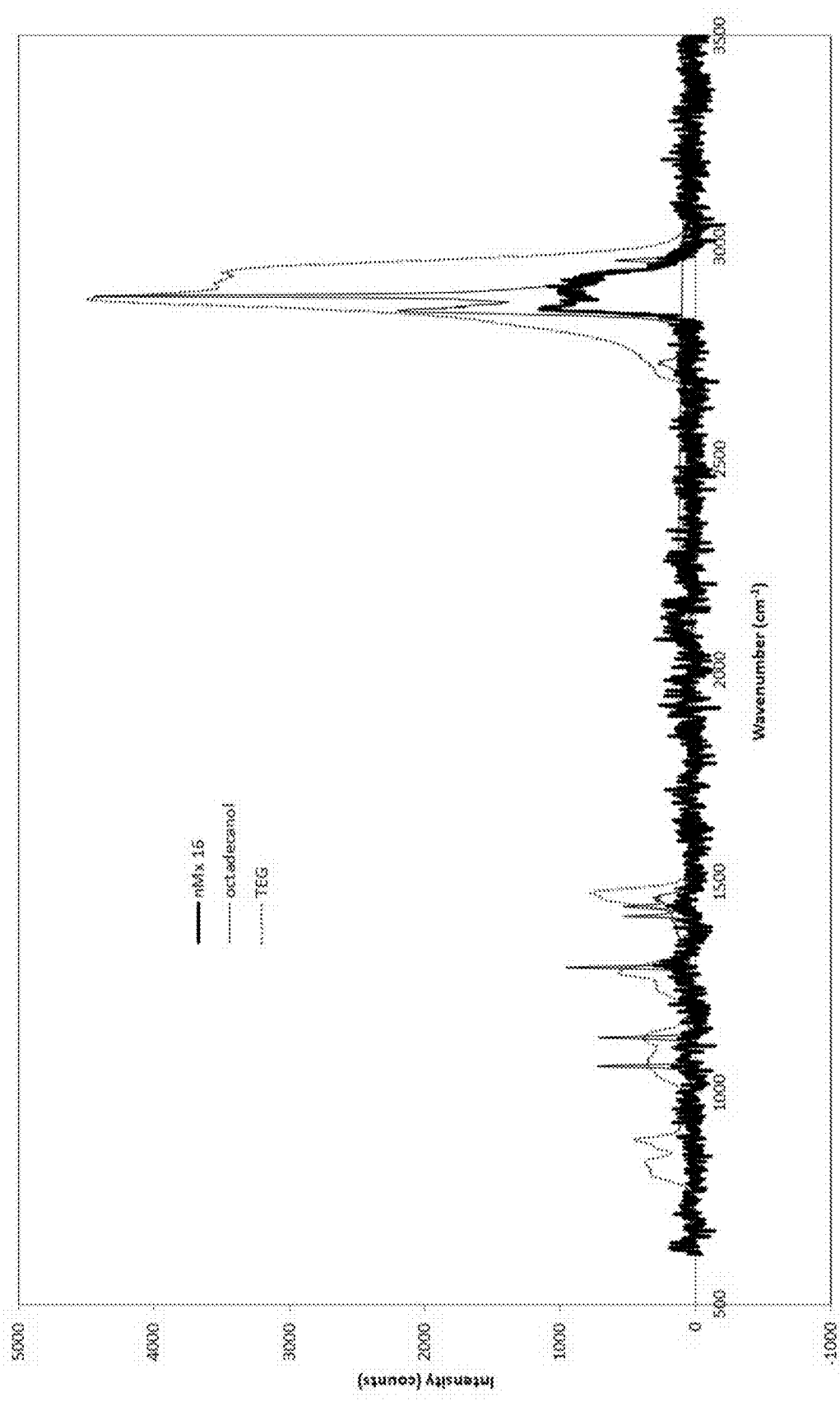

FIG. 13 depicts Raman scattering for $nMx_{16}$, where a mixture of octadecanol and TEG is the nanoscale organic layer. The Raman scan is performed from 500 $cm^{-1}$ to 3500 $cm^{-1}$. The mixture of octadecanol and TEG gave Raman frequencies for $nMx_{16}$ from about 2839 $cm^{-1}$ to about 2915 $cm^{-1}$ (C—H stretch). Note that the C—O stretch is too weak and not observable.

Figure 14:
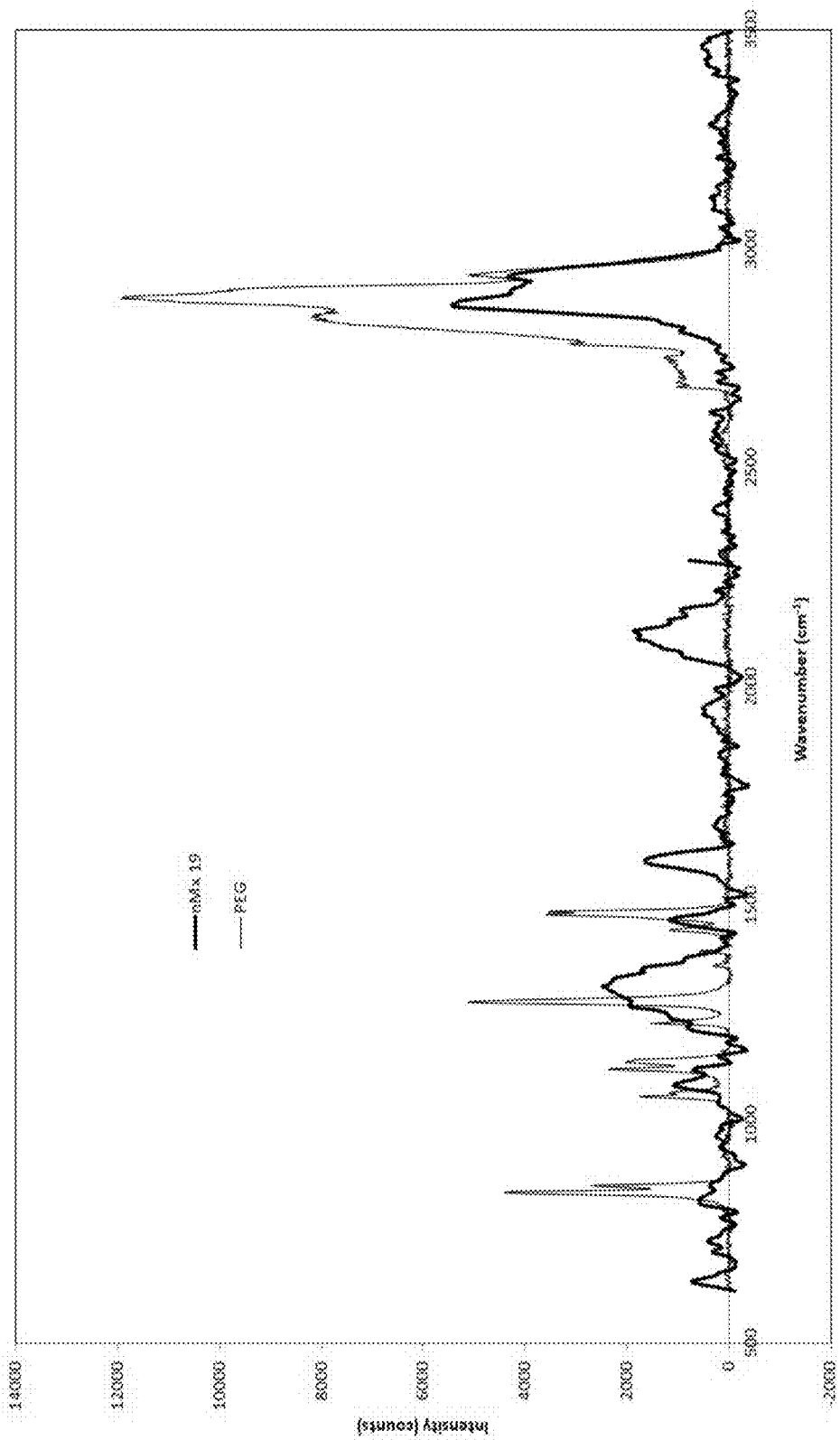

FIG. 14 depicts Raman scattering for $nMx_{19}$, where PEG is the nanoscale organic layer. The Raman scan is performed from 500 $cm^{-1}$ to 3500 $cm^{-1}$. PEG gave Raman frequencies for $nMx_{19}$ at about 1086 $cm^{-1}$ (C—O stretch) and at about 2868-2950 cm (C—H stretch).

Figure 15:
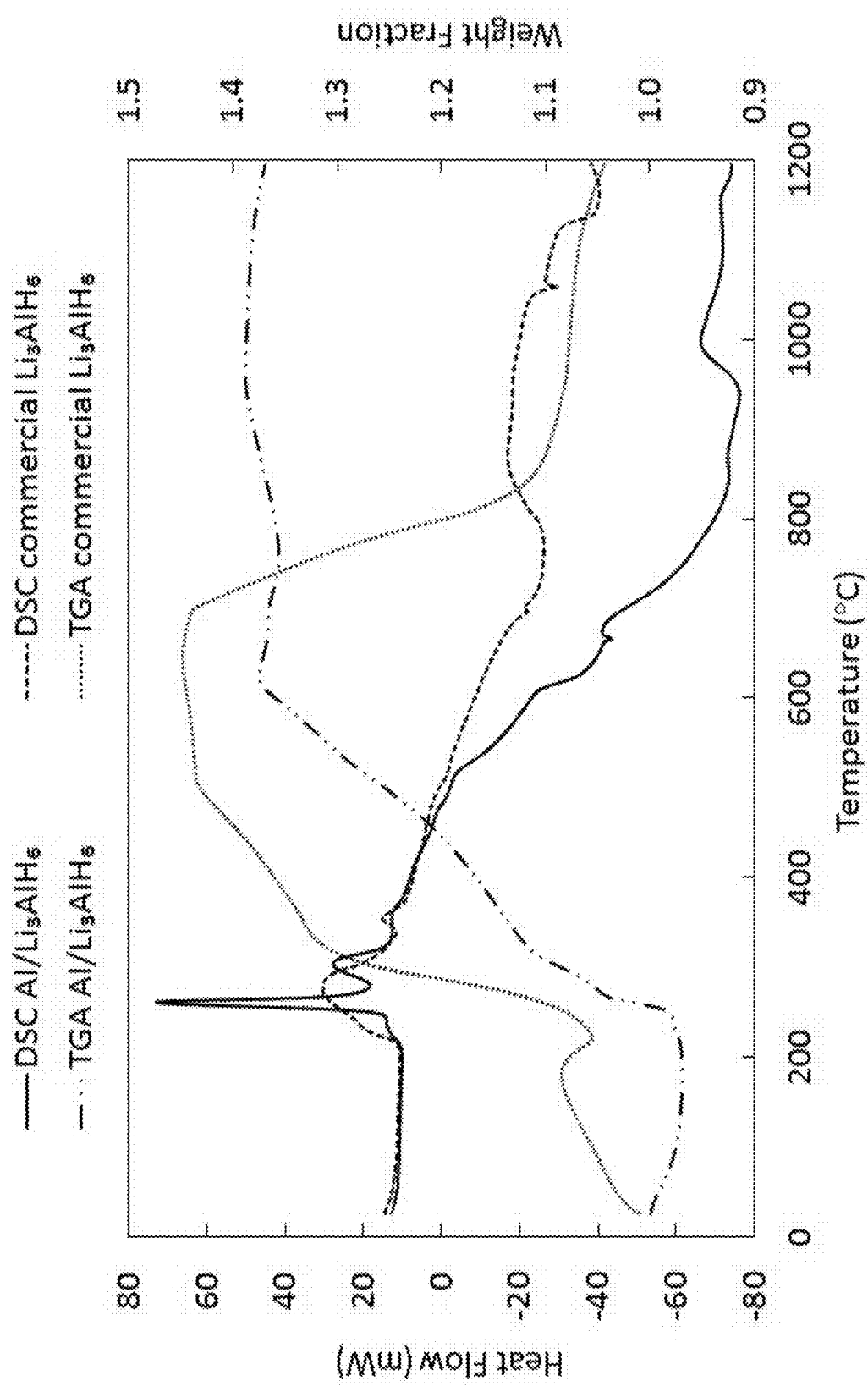

FIG. 15 displays DSC-TGA curves for $nMx_{10}$ and commercial $Li_3AlH_6$ under ambient air flow. The nanoscale organic layer is 1, 7-octadiene.

Figure 16:
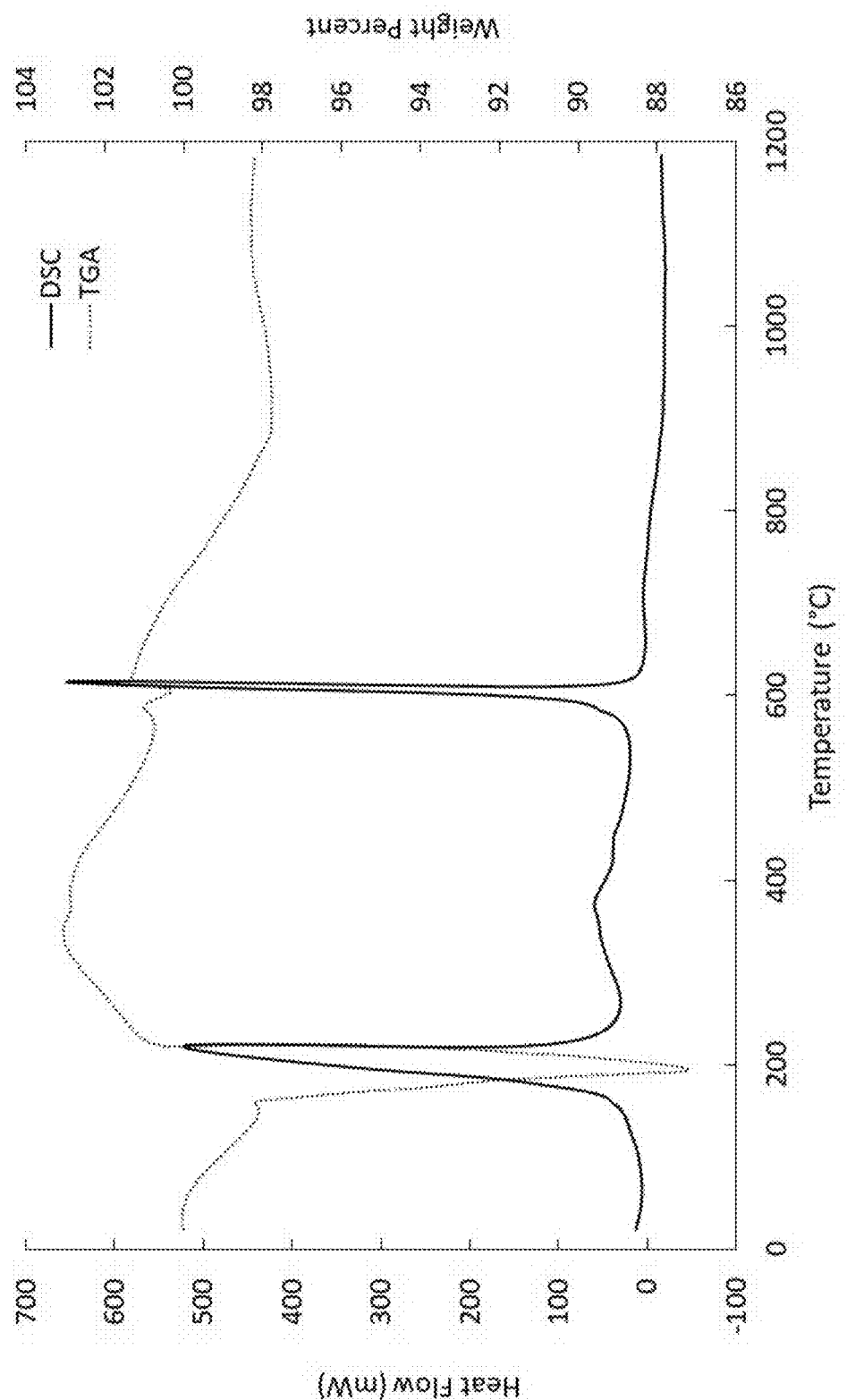

FIG. 16 displays DSC-TGA curves for $nMx_{11}$ under ambient air flow with a mixture of epoxydecene and alkadiene as the nanoscale organic layer, where the starting materials are mixed at a ratio of 10:1:2 of $LiAlH_4$:epoxydecene:octadiene respectively.

Figure 17:
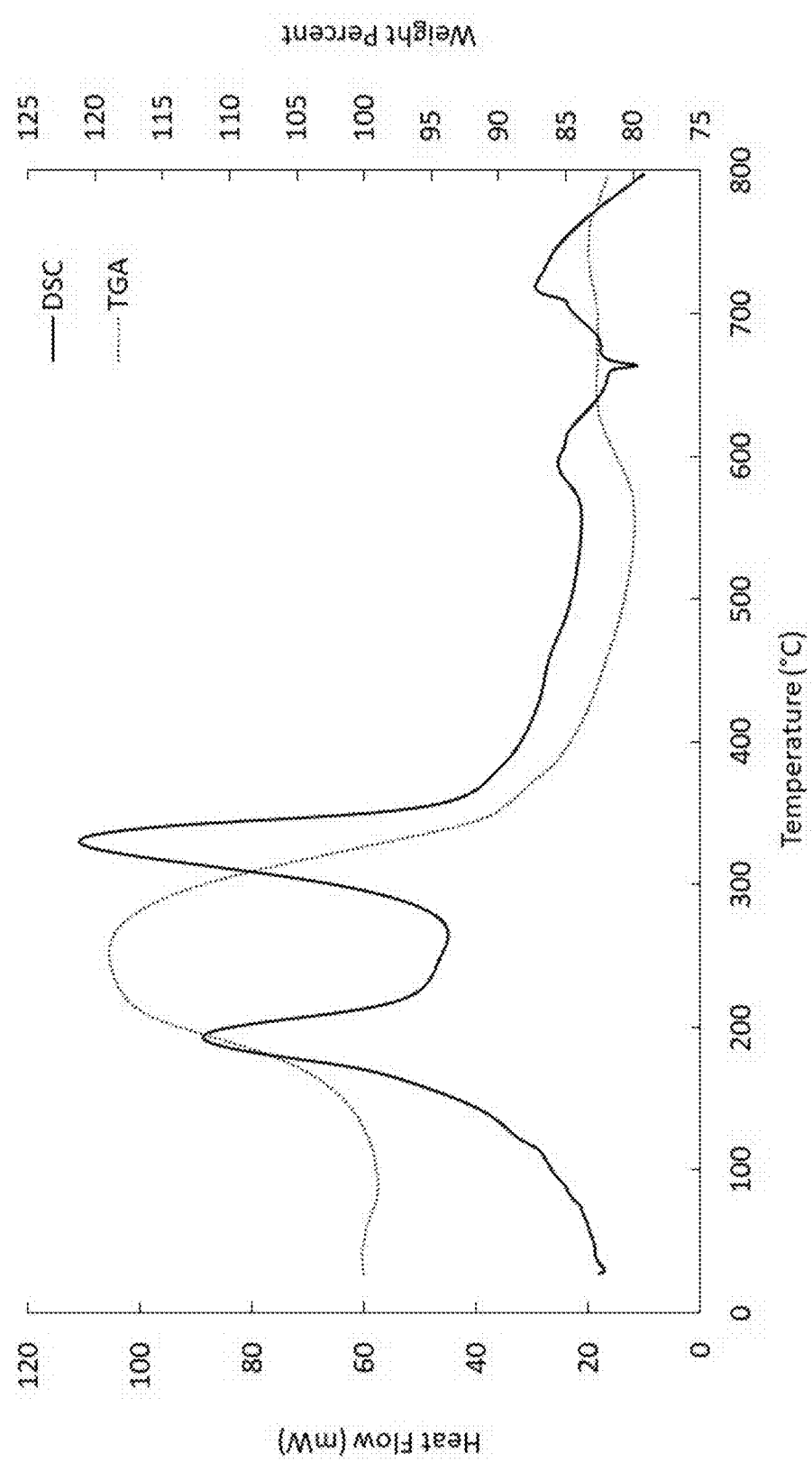

FIG. 17 displays DSC-TGA curves for $nMx_{12}$ under ambient air flow with 50% steryl-alcohol as the nanoscale organic layer.

Figure 18:
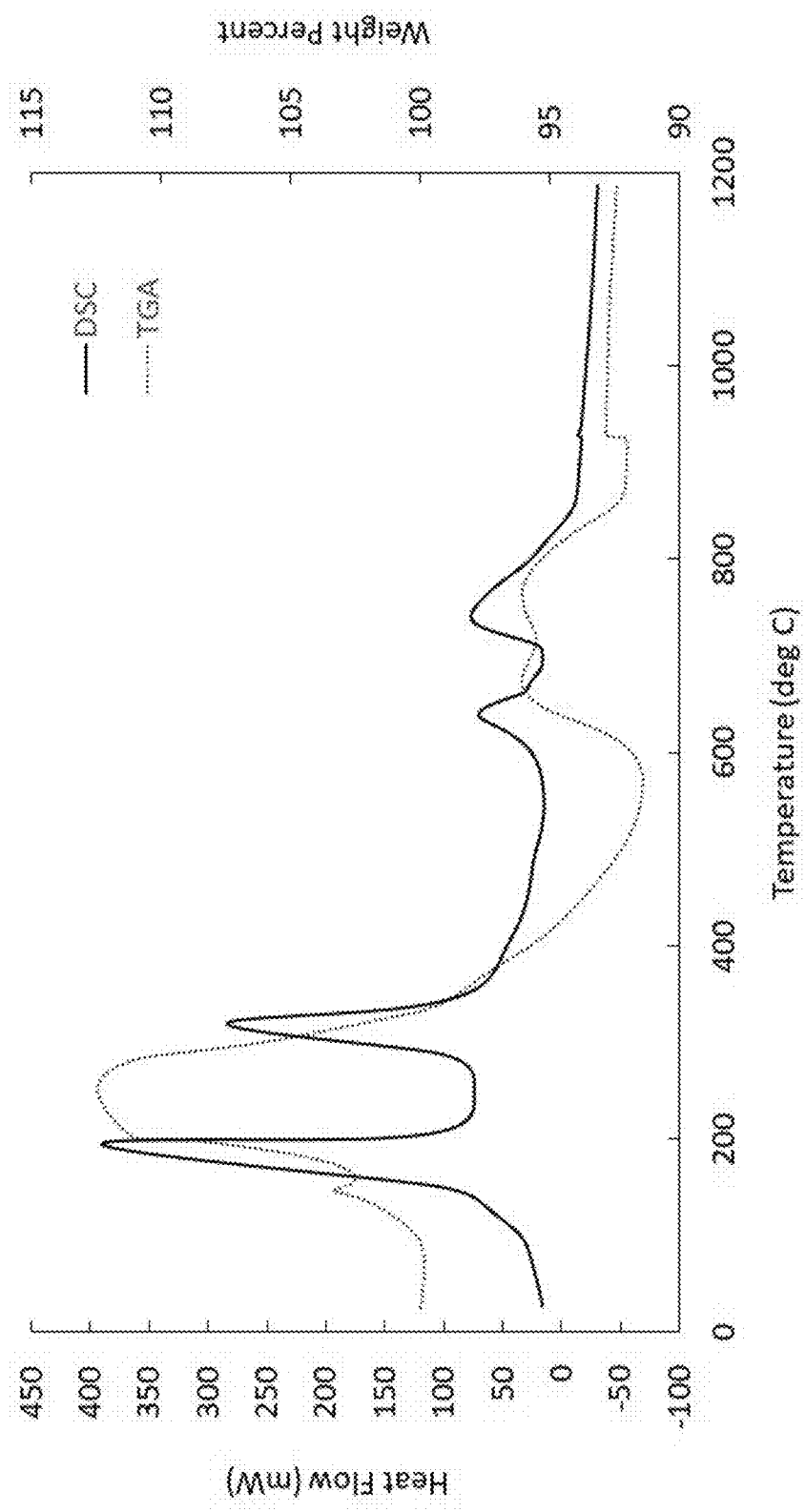

FIG. 18 displays DSC-TGA curves for $nMx_{13}$ under ambient air flow with 44% oleic acid as the nanoscale organic layer.

Figure 19:
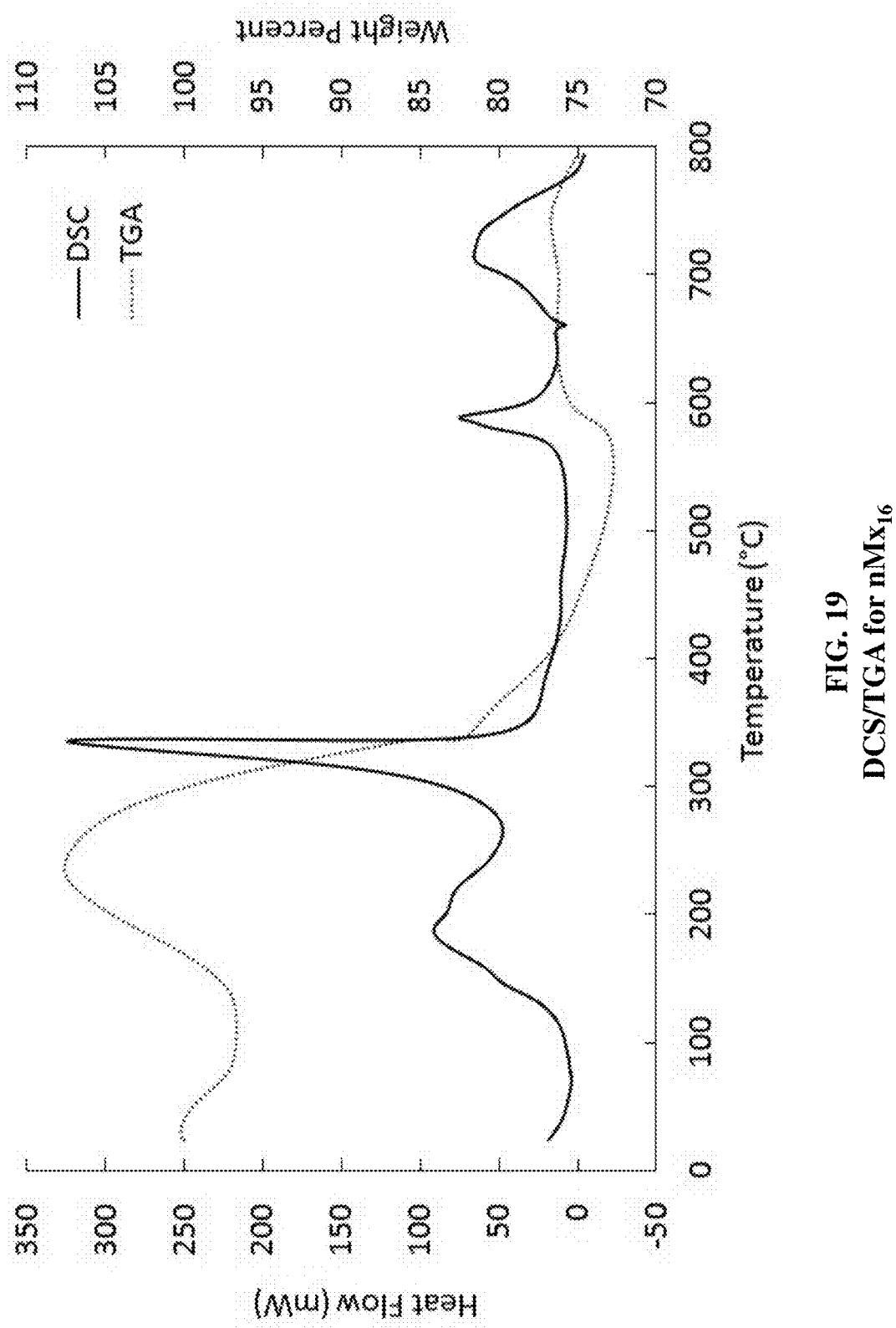

FIG. 19 displays DSC-TGA curves for $nMx_{16}$ under ambient air flow with a mixture of octadecanol/TEG as the nanoscale organic layer.

Figure 20:
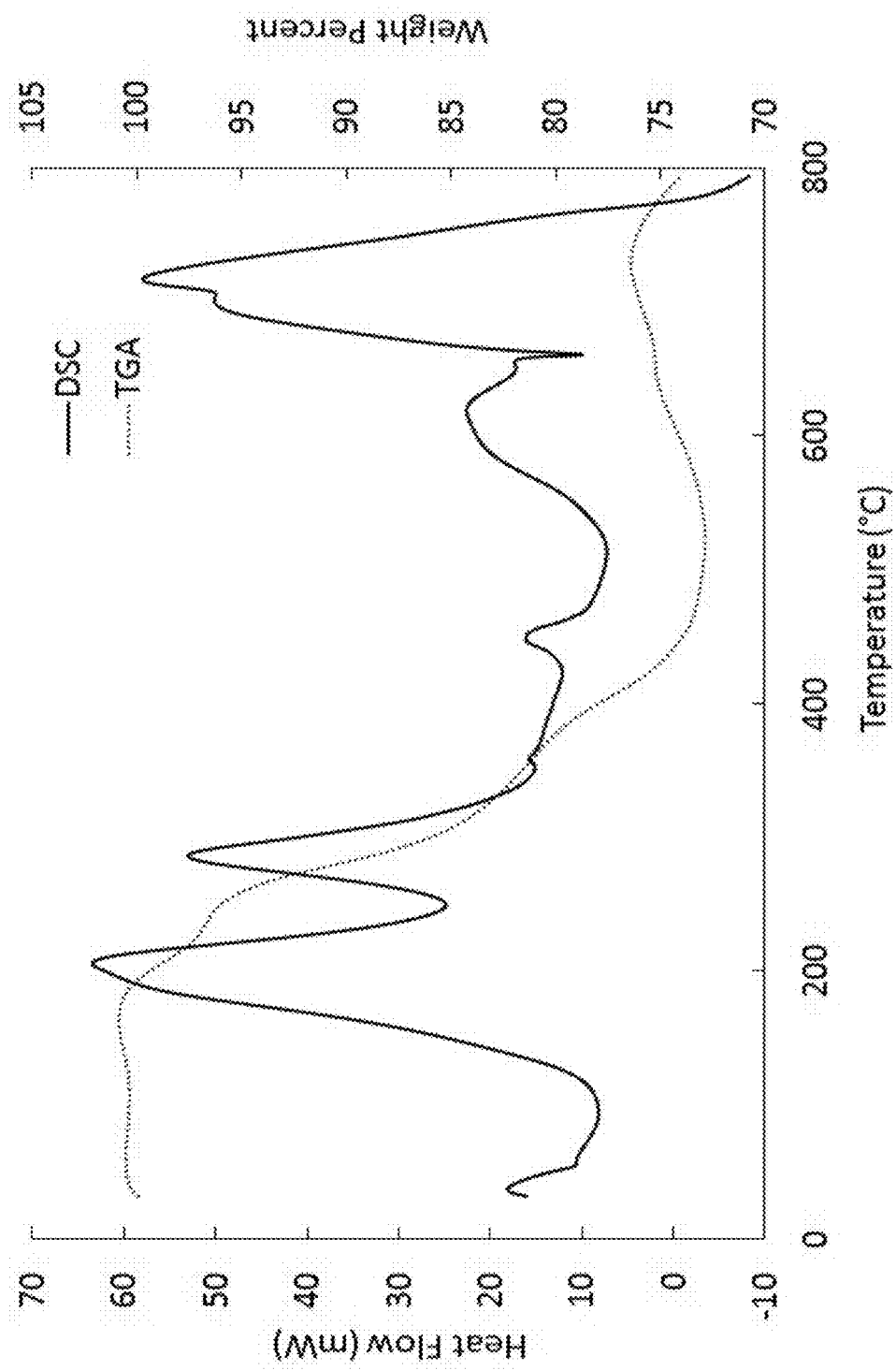

FIG. 20 displays DSC-TGA curves for $nMx_{19}$ under ambient air flow with PEG 600 as the nanoscale organic layer.

Figure 21:
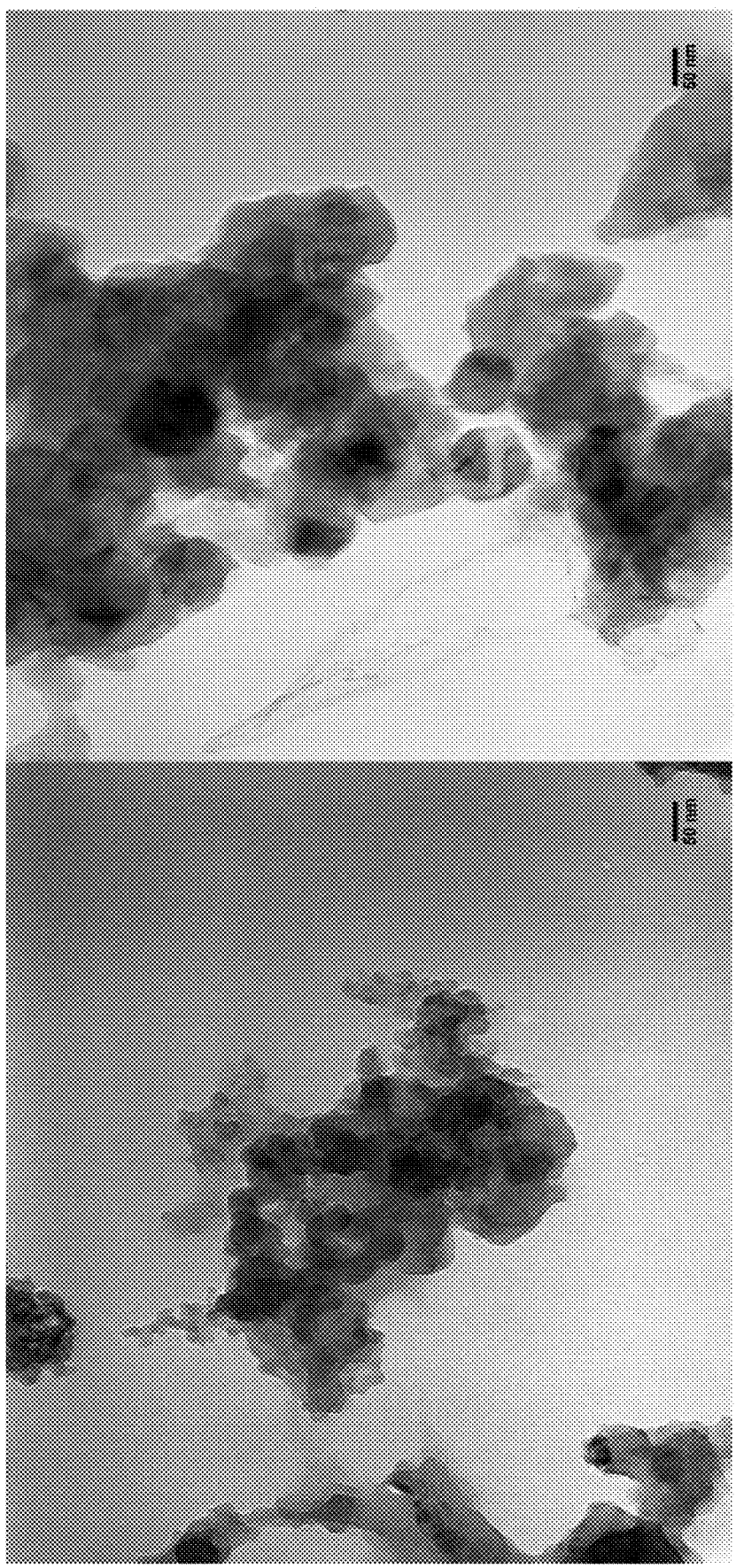

FIG. 21 depicts two separate TEM images of $nMx_{10}$, where core metal nanosurfaces are passivated by octa-diene as the nanoscale organic layer.

Figure 22:
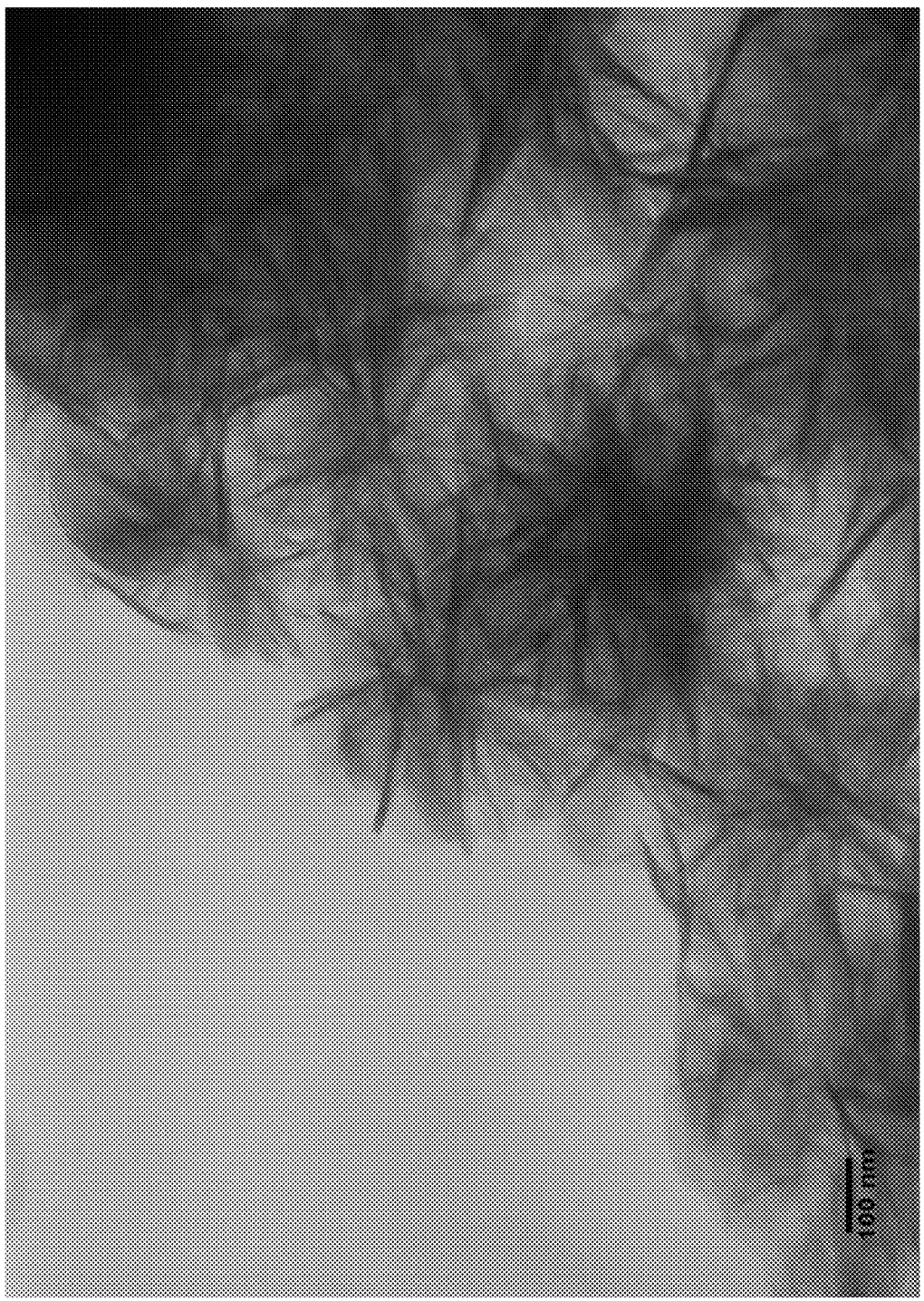

FIG. 22 depicts TEM imaging of $nMx_{12}$, where core metal surfaces are passivated by 50% steryl alcohol as the nanoscale organic layer.

Figure 23:
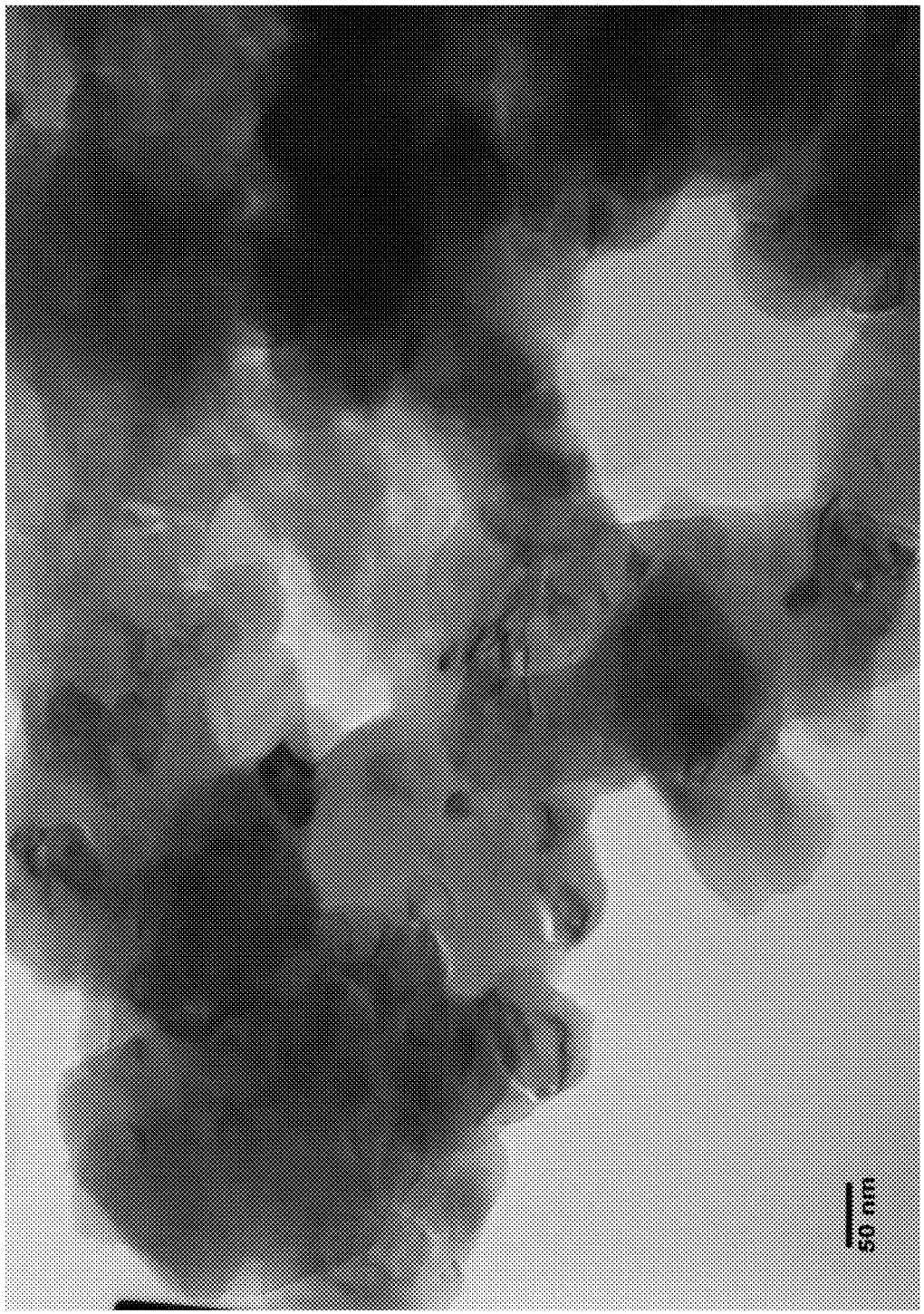

FIG. 23 depicts TEM imaging of $nMx_{13}$, where the surfaces of the core nanoparticles are passivated by 44% oleic acid as the nanoscale organic layer.

Figure 24:

FIG. 24 depicts TEM imaging $nMx_{16}$, where core metal nanosurfaces are passivated by a mixture of octadecanol/TEG as the nanoscale organic layer.

Figure 25:
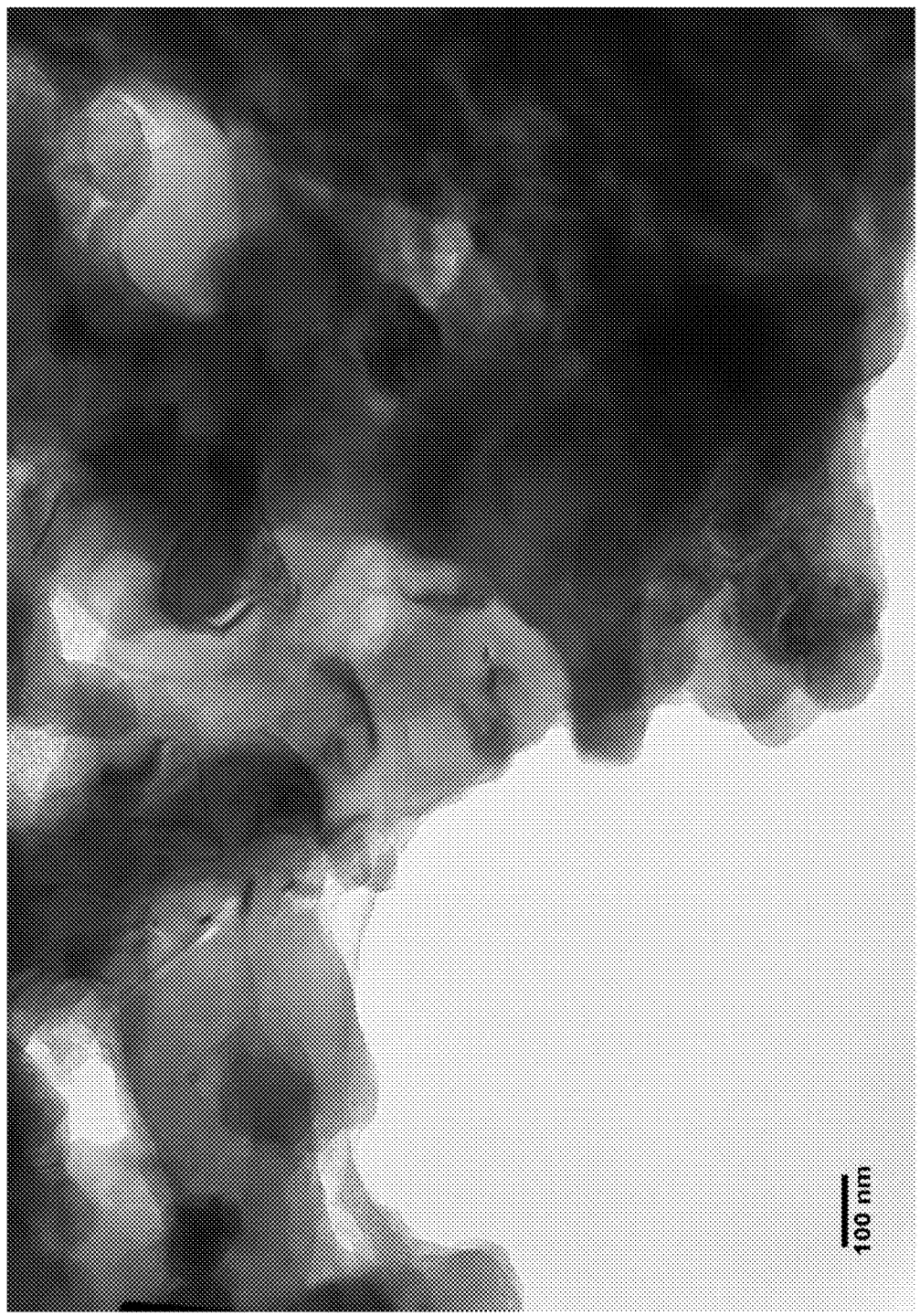

FIG. 25 depicts TEM imaging for $nMx_{19}$, where core metal nanosurfaces are passivated by PEG 600 as the nanoscale organic layer.

Figure 26:

FIG. 26 depicts TEM imaging for $nMx_{20}$, where core metal nanosurfaces are passivated by TEG as the nanoscale organic layer.

Figure 27B:
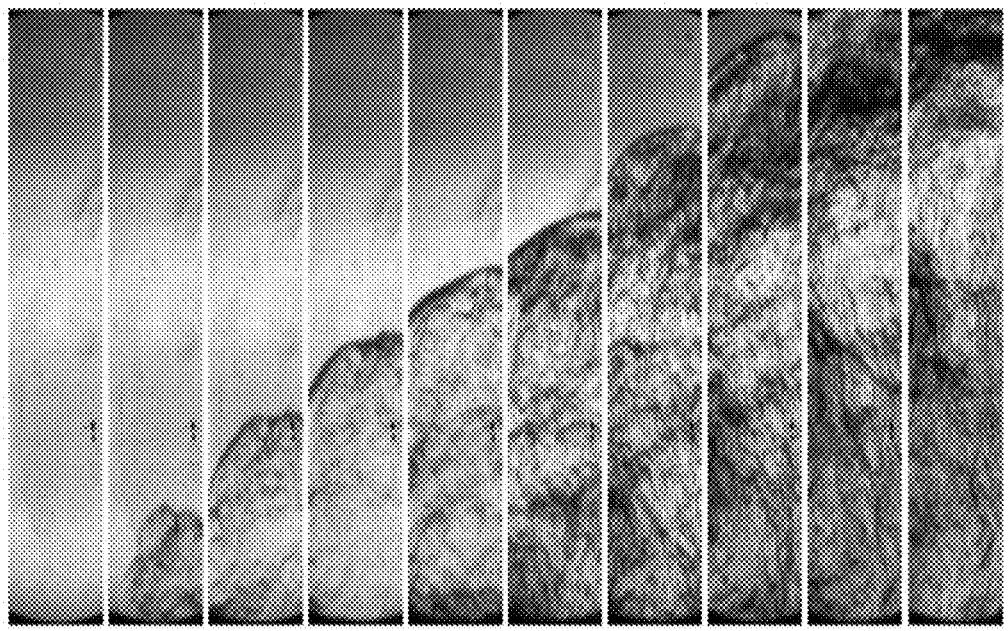
Figure 27A:
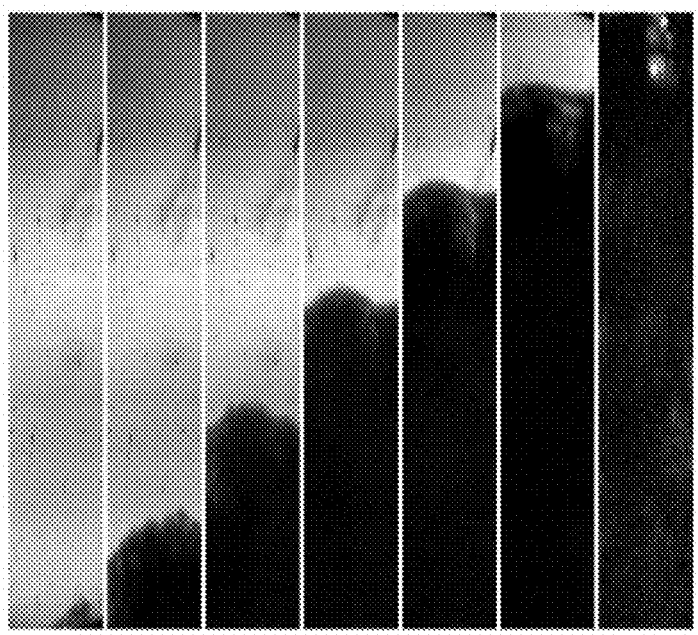

FIG. 27a and FIG. 27b display a relative comparison of shockwave velocities of secondary high explosive PETN with and without $nMx_{20}$.

Figure 28B:
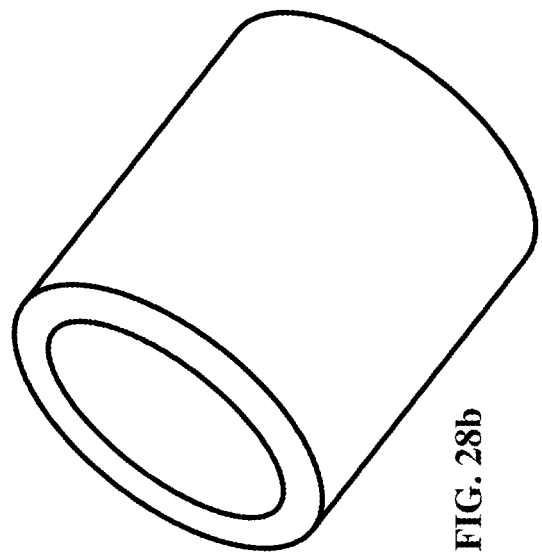
Figure 28C:
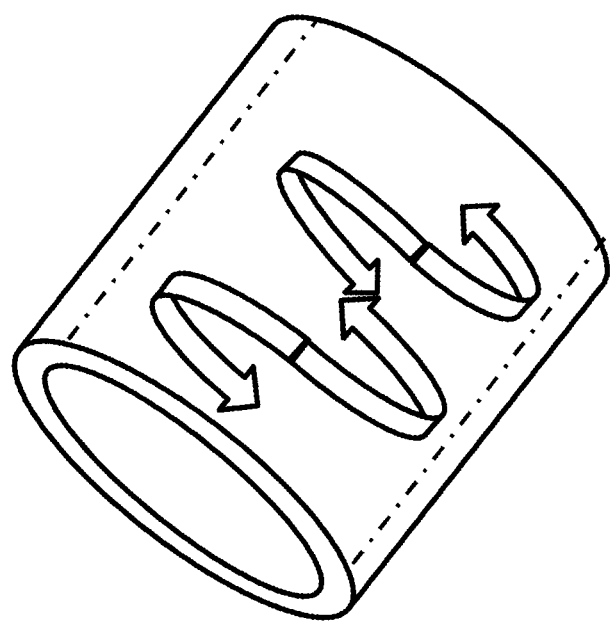
Figure 28A:
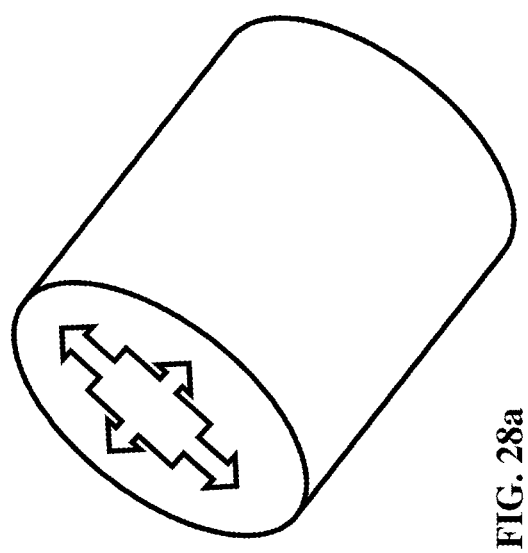

FIGS. 28a-28c depict three cylindrical fuel grains having ports with a cross type shape a, a simple circular port b, and a helical port with a circular opening c. Each solid fuel grain a-c may be a thermoset polymer or a thermoplastic polymer matrix that is pressed, cast, or 3D printed with at least one nMx nanocomposite within the matrix in addition to optional additives, including an oxidizer, to be used with SRMs or HRMs (less the oxidizer) known within the art.

Figure 29A:
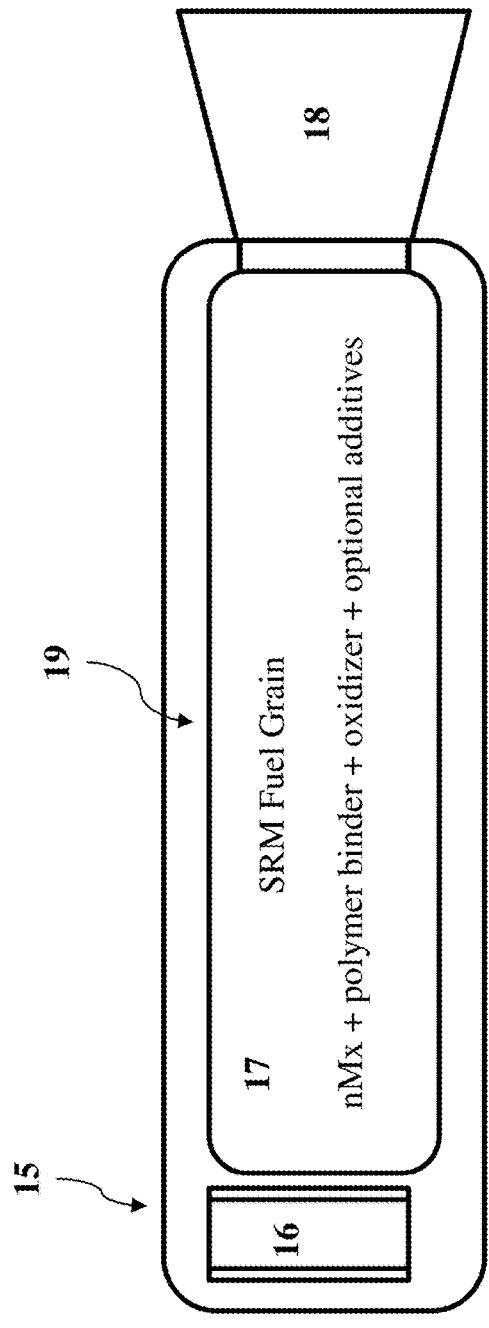

FIG. 29a is a diagram of a Solid Rocket Motor 15 having a fuel grain 17 of the present invention in a combustion chamber 19. A typical SRM 15 will at least include a combustion chamber 19 having an igniter 16, a head closure cap (not shown), and a nozzle 18. The fuel grain 17 is depicted as being cast, pressed, or 3D printed as a polymeric binder having an nMx nanocomposite as detailed above, an oxidizer, and other optional additives in its matrix. The igniter 16, having a pyrotechnic that releases and transfers heat about the inner surfaces of the fuel grain's 17 port, starts the thrusting event by igniting these surfaces to combustion and flames to form, and thereby expels hot gases from the nozzle 18.

Figure 29B:
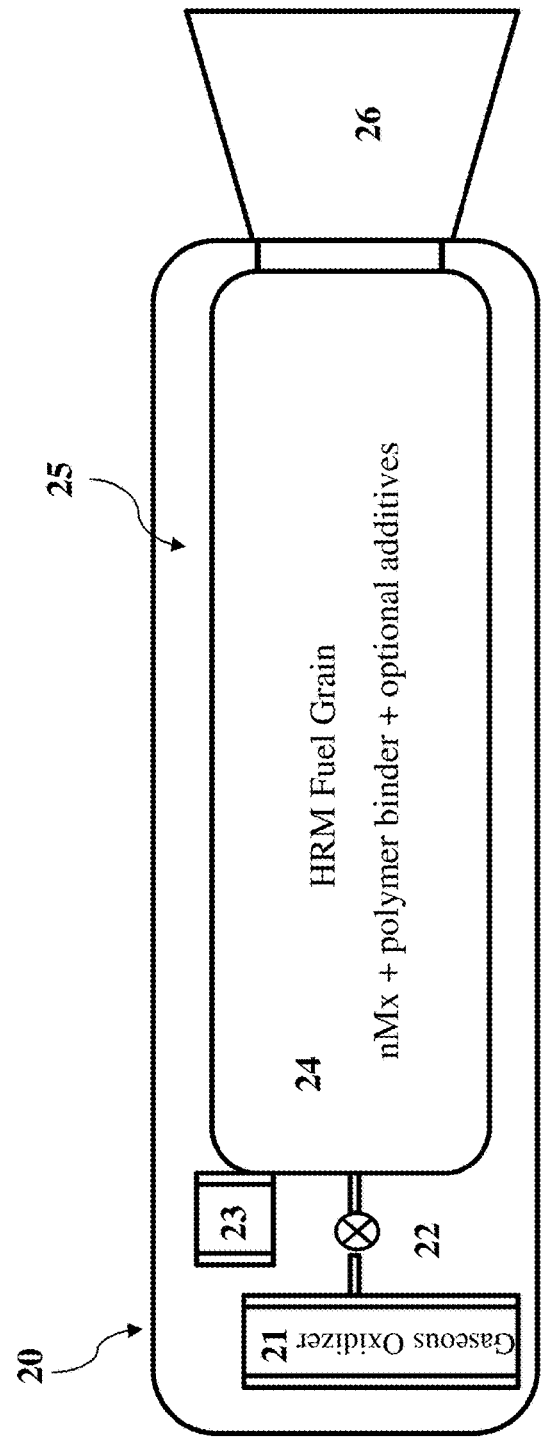

FIG. 29b is a diagram of a Hybrid Rocket Motor 20 having a fuel grain 24 of the present invention in a combustion chamber 25. A typical HRM 20 will at least include a combustion chamber 25 having an igniter 23, a head closure cap (not shown), a tank for holding a gaseous oxidizer 21, a valve and injector 22, and a nozzle 26. The fuel grain 24 is depicted as being cast, pressed, or 3D printed as a polymeric binder having an nMx nanocomposite as detailed above and other optional additives in its matrix. The oxidizer is a gas held in a separate tank 21. The igniter 23, having a pyrotechnic that releases and transfers heat about the inner surfaces of the fuel grain's 24 port, starts the thrusting event by igniting these surfaces to combustion and flames to form while the gaseous oxidizer 21 is released about the fuel grain 24, thereby expelling hot gases from the nozzle 26.

From this point forward, the following words disclose our nanocomposite, methods for creating them, and practical uses thereof. Our invention is a singular material having two distinct nanoparticles, an amount of Ti metal, and an organic nanoscale layer, i.e., lithium aluminum hexahydride ($Li_3AlH_6$) and elemental aluminum nanoparticles with an amount of Ti metal having passivated surfaces that display unique burning characteristics. Our process ensures that the nanocomposite is air stable and is safe to handle in air for use in applications. The present invention protects and preserves the enhanced combustion properties of the metal nanoparticles isolated during the reaction. Our reaction conditions are carefully designed to form passivated nanoparticles having a nanoscale organic layer. However, our words are not a limitation on the scope of the present invention but are written to detail certain embodiments thereof. After reading the detailed description, modifications will become apparent to those skilled in the art, and those modifications are intended to be covered by our disclosure.

Definitions

The terms "nanoparticle," "NP(s)," or "nanomaterial" generally refer to very small particles having all three dimensions from about 1 nm and to about 100 nm. Nanoparticles have a greater number of surface atoms relative to the same chemical species in bulk or microscale (µm) form. In contrast, for bulk materials larger than one micrometer, the percentage of atoms at the surface is minuscule relative to the total number of atoms within the material, which is why bulk materials generally have uniform physical properties throughout regardless of its size. Because the percentage of atoms at the surface of a nanomaterial are significantly higher than that of the bulk form, nanomaterials demonstrate chemical and physical properties that are not found in the bulk, even when that bulk material includes a dispersion of nanocrystalline domains [11, 12].

Nanoparticles are so small that their physical properties are not constant as a function of their size because the percentage of atoms at the surface of a material becomes significant, where these unique size dependent properties can be described using quantum physics. For nanospheres, size-dependent properties are observed, such as surface plasmon resonance in some metal particles, or increased magnetism for a metal that is significantly diminished as the metal moves into its bulk form.

Our invention examines and provides for air stable nanoparticles that exhibit unique burning characteristics synthesized via a controlled bottom up reaction. Due to the larger number of atoms at our nanoparticle surfaces, fundamentally new combustion and hydrogen evolution behaviors are observed when our material is kept at the nanoscale, while being air stable, i.e. the present invention stabilizes $Li_3AlH_6$ nanoparticles and elemental Al metal nanoparticles, which are more combustible than their bulk metal counterparts.

The term "nMx" generally refers to a singular material, being a nanocomposite of lithium aluminum hexahydride nanoparticles, $Li_3AlH_6$, elemental Al metal nanoparticles, an amount of Ti metal, and a nanoscale organic layer. nMx exists in various iterations according to the nanoscale organic layer used to passivate the surfaces of the core metals. Passivation makes nMx air-stable and protects and preserves the combustion properties of the singular material isolated from the decomposition of $LiAlH_4$.

The term "singular material" generally refers to the nanocomposite nature of nMx being a homogeneous mixture of two distinct nanoparticles, $Li_3AlH_6$ nanoparticles, elemental Al metal nanoparticles, and an amount of Ti metal. All aspects of both core metals are subjected to nanoscale organic passivation.

The term "passivation" generally refers to a process of covering or modifying the outer surfaces of a core material, being nanoparticles, to kinetically stabilize otherwise reactive molecules, where the stabilization substantially slows the ability of the underlying core material to react with oxidative or solvolytic agents.

The terms "nanoscale organic layer," "NSOL," "capping agents," or "passivation agents" generally refer to organic ligands or monomeric materials capable of polymerization or polymeric materials that cover the outer surfaces of two distinct core metals, being nanoparticles, to kinetically stabilize otherwise reactive molecules, where the stabilization substantially slows the ability of the underlying core material to react with oxidative or solvolytic agents.

The term "thermite" generally refers to a combustible material that intramolecularly coexists with its oxidant and does not require an external oxygen supply to sustain the ensuing redox reaction, e.g. the material exhibits self-sustaining combustion in an inert environment.

The term "nanothermite" generally refers to a thermite material composed of nanoparticles.

The term "organic ether" generally refers to an oxygen-containing hydrocarbon comprised of connecting ether C—O—C bonds, i.e. an oxygen atom connected to alkyl or aryl groups.

The term "amu" generally refers to atomic mass unit, a unit of molecular mass measurement relative to a carbon-12 standard.

The term "polymerization" generally refers to a chemical process of bonding together multiple repeating units of a monomer, or differing molecules, to form a larger chain-like matrix, or network type structure. The monomer molecules may be alike, or they may represent two, three, or more different compounds. Combined monomers make a product that has certain unique physical properties such as elasticity, high tensile strength, or the ability to form fibers that differentiate polymers from substances composed of smaller and simpler molecules; often, many thousands of monomer units are incorporated in a single molecule of a polymer. The formation of stable covalent chemical bonds between the monomers sets polymerization apart from other processes, such as crystallization, in which large numbers of molecules aggregate under the influence of weak intermolecular forces.

The term "copolymerization" generally refers to the process of two or more different monomers bonding together to polymerize.

The term "organic matrix" generally refers to a three-dimensional interwoven net of polymer molecules that encompass a core nanoparticle material, or the ability of non-polymeric materials being monolayers about the surfaces of the nanoparticles to self-assemble.

The term "isolated nanoparticles" generally refers to metal containing cores that are not in direct contact such that they do not form micron scale metal aggregates.

The term "initiator" generally refers to a chemical that speeds up a reaction and is consumed in the reaction. In the present invention Ti alkoxide initiates the decomposition of $LiAlH_4$, is consumed, and becomes part of the final nanocomposite.

The term "pyrophoric" generally refers to the ability of true nanoparticles to spontaneously burn in air.

The term "air stable or "air stability" generally refers to our observation that the metal nanoparticles of $nMx_{12}$-$nMx_{20}$ neither spontaneously ignite nor rapidly react within seconds with ambient oxygen in air, primarily from $H_2O$ and $O_2$. $nMx_{12}$ through $nMx_{20}$ are all air stable when using proper preparation methods as disclosed herein. $nMx_{10}$ is unstable in air, where larger amounts have pyrophoric hot spots that spontaneously ignite. $nMx_{11}$ is not as pyrophoric as $nMx_{10}$, but larger quantities have pyrophoric hot spots, also making the material slightly air unstable.

The term "air sensitive" or "air sensitivity" generally refers to a similar but different property than air stability of reactive materials. Air sensitivity is the tendency for an energetic material to slowly react in air (primarily with water and molecular oxygen) to lose energy density. This loss of energy density may take place over the timescale of fractions of an hour, days, weeks, or longer periods of time. The air sensitivity of nMx is at a minimum for $nMx_{12}$ and $nMx_{13}$.

The term "terminal O-H cleavage" generally refers to the severing of an oxygen-hydrogen bond in an alcohol or carboxylic acid with a hydroxyl functionality at the end of a hydrocarbon chain.

The term "dispersed" generally refers to a nonuniformed distribution of nanoparticles or nanocrystalline deposits within a micron sized bulk material.

The term "alkadiene" generally refers to a group of unsaturated hydrocarbons that have two carbon-carbon double bonds that can be polymerized anionically (i.e., in a reaction initiated by an organo-alkali metal), or via free radical polymerization, where the double bonds may be cumulated, isolated, or conjugated. An alkadiene may have the general formula of $C_nH_{2n-2}$. Examples of conjugated diene hydrocarbons may include, but are not limited to, 1,7-octadiene, 1,9-decadiene, myrcene, or 1,13-tetradecadiene, 1,3-butadiene, isoprene, 2-methyl-1,3-pentadiene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, or combinations thereof.

The terms "energy," "enthalpy," and "heat" are generally used interchangeably herein, where the important quantitative measurement of heat is via enthalpies. The amount of combustible energy, or heat, generated via a reaction is dictated by the chemical and energetic properties of the source material. Energy, (E), for combustion reactions may be defined as:

$$E=q+w,$$

where (E) is the sum of heat (q) plus work (w). Heat and work are typically path functions. Heat is the energy flow associated with changes in temperature of the source material. Work may take many forms, but it is typically associated with the ability of the heat energy to bring about mechanical or physical changes to its surroundings.

The term "work," as it relates to combustion processes, may be generally defined by the equation:

$$w=-P\Delta V,$$

where P=pressure against the system it is working upon, and $\Delta V$ is the system volume change.

The term Enthalpy (H) generally refers to the equation:

$$H=E+PV.$$

Energy and enthalpy are state functions that give enthalpy as equal to heat at constant pressure ($q_p$):

$$H=q_p.$$

Therefore, enthalpy is typically called "heat" and the "enthalpy of combustion" is called "heat of combustion," where the heat of combustion, $\Delta H°$, indicates the amount of heat energy created per mol of a burning source material [kJ/mol]. The heat of combustion, or the heat of reaction, is defined by the following equation:

$$\Delta H°_{reaction}=\Sigma\Delta H°_f(products)-\Delta H°_f(reactants),$$

$\Delta H°$ reaction of a chemical reaction is the net difference for the amount of heat gained or lost between the products and reactants under constant pressure in relation to the amount of work being done by the reaction, given as $\Delta H°_f$(products)–$\Delta H°_f$(reactants). More importantly, enthalpy is the heat per unit amount of substance. It is most often expressed as kJ/mol (molar heat), kJ/g (gravimetric energy density), or kJ/cm³ (volumetric energy density).

The term "thermoplastic" generally refers to thermoplastic polyurethane, styrene block-copolymers, thermoplastic silicone elastomer, aliphatic or semi-aromatic polyamides, thermoplastic vulcanisate, acrylonitrile butadiene styrene (ABS), polylactic acid, polyvinyl alcohol, polycarbonate, polymethylmethacrylate, polyethylene, polypropylene, polystyrene, nylon, polycarbonate, polyvinyl chloride, Teflon, or any combination thereof.

The term "base material" generally refers to a feed stock for a 3D printer being a mixture of a thermoplastic polymer suitable for 3D printing, an amount of at least one nMx nanocomposite, and other fuels or additives.

The term "Ti" generally refers to the chemical element titanium. It is a transition metal with atomic no. 22. In the current invention, it is associated with the nanoparticles surfaces of $Li_3AlH_6$ and elemental Al and is generated from a titanium(IV) compound, a titanium(IV) tetraalkoxylate, titanium(IV) isopropoxide ($Ti(O^iPr_4$, 97%), or a titanium (IV) tetraaryloxylate.

$LiAlH_4$ Decomposition Via a Bottom Up Reaction

The present invention harnesses the high energy densities of $Li_3AlH_6$ nanoparticles and elemental Al nanoparticles by exploiting the thermal catalytic decomposition of $LiAlH_4$. A bottom up reaction gives a final composite that has a greater number of surface atoms resulting in increased energy densities for each nanoparticle. The precise reaction method uses a catalyst to ensure that a significant number of both nanoparticles are generated and the nanoscale organic layer successfully air stabilizes and preserves the much-desired energetic potential of the final nMx nanocomposite.

Our precise reaction uses a co-solvent system of tetrahydrofuran (THF) and toluene. We dissolve $LiAlH_4$ in THF. The toluene co-solvent is not capable of dissolving the $LiAlH_4$ but serves as a solvent and heat sink for the reaction mixture when the reaction temperature is increased to 85° C. The high boiling point of toluene (110° C.) is much larger than the boiling point of THF (66° C.), which is expected to boil off partially even under reflux at 85° C. It is an embodiment of the present invention where the co-solvents volume to volume ratio of toluene to THF is between 6 to 1 and 1 to 1, respectively, within the reaction vessel.

The passivation agent is added 10 minutes after the addition of the titanium isopropoxide solution is completed. It is an embodiment of the present invention wherein the full reaction time is about 40 minutes to about 2 hours. The reaction starts when the nanoscale organic layer is added to the reaction mixture, and the reaction ends when the reaction mixture is put under vacuum boil.

Although nanocrystals of $Li_3AlH_6$ and Al metal are observed via a top down synthesis, i.e. decomposing $LiAlH_4$ by high energy ball milling, using force to create our composite is problematic. Ball milling is a mechanical process, where chemical reactions are carried out by striking powder reactants with fast moving heavy balls. Strikes from the balls grind down reactants forcing a chemical change.

Surface and interface contamination is a major concern for nanocrystalline materials made by high-energy ball milling. The force from the striking balls causes surface interactions of nascent nanoparticles to cold weld the particles together, which makes an aggregate that is difficult or impossible to disrupt. The milling balls themselves can contribute to contamination as well in the reactant materials. Ambient gases (trace impurities such as $O_2$, $N_2$ in rare gases) are also problems. One can take precautions in reducing these contaminations, but, because there is no true control over the reaction or reaction species, other than controlling milling time, there is no control on nanoparticle morphology, agglomerates, and residual strain on the crystalline structures formed through force.

Cold welding reduces the surface area of the final ball milled material, thereby reducing the observed energy output of the same. Cold welding is an unavoidable side effect of ball milling Cold welding not only creates a distribution of unwanted chemical species in the reaction vessel, but also contributes to a large distribution size of the final products, where one can observe nanoparticles, microparticles, and species that are essentially bulk metals [13].

Ball milling removes our ability to properly isolate true $Li_3AlH_6$ nanoparticles and elemental Al metal nanoparticles without impurities during the decomposition of $LiAlH_4$. Ball milling would also remove our ability to control the particle size of our composite. Strikes from the balls would inevitably crack and damage our nanoscale organic layer used to protect and preserve the composite. This would result in a pyrophoric material that is unsafe for handling. It could also affect the combustion properties of the composite material and if an oxide layer forms about the core metal surfaces, this could result in a noticeable reduction in the unique burning properties of our invention. Therefore, it is a preferred embodiment of the present invention for the decomposition of $LiAlH_4$ to be carried out via the bottom up reactions as detailed below.

Catalytic Decomposition of $LiAlH_4$ to Create Nanoparticles

It is an embodiment of the present invention to add an alkoxide catalyst to the reaction vessel to facilitate $LiAlH_4$ decomposition, which ensures that a sufficient number of both nanoparticles are created. We precisely push and pull between reaction temperature, reaction time, and catalyst amount to create a system that holds $LiAlH_4$ decomposition at the first reaction step, where the resulting invention includes the two distinct nanoparticles, an amount of Ti metal, and a nanoscale organic layer for passivation. The alkoxide or Ti catalyst for the present invention may include, without limitation, a titanium(IV) compound, a titanium(IV) tetraalkoxylate, such as titanium(IV) isopropoxide, or a titanium(IV) tetraaryloxylate, or any combination thereof. However, it is an embodiment of the present invention where the alkoxide catalyst is titanium isopropoxide ($Ti(O^iPr_4$, 97%).

Although ball milling will not give the high energy nanoparticles of the present invention, the technique lends insight into: 1.) the stability of $LiAlH_4$, 2.) the difficulty of using alkoxide catalysts with ball milling, 3.) the sensitivity of $Li_3AlH_6$, and 4.) a possible explanation as to why there are trace amounts of Ti metal in our final composite absent cold welding and traditional alloying methods at the nanoscale level brought on by ball milling [6, 14, 15].

Ball milling studies indicate that, without a catalyst, $LiAlH_4$ decomposition is difficult to achieve. The preferred catalyst for $LiAlH_4$ decomposition via ball milling is a Ti halide. When an alkoxide is used as a catalyst for this decomposition, impurities are observed [6]. In comparison, the present invention cannot use Ti halide catalysts such as $TiCl_4$ due to the formation of chloride impurities during the reaction.

Catalytic decomposition of $LiAlH_4$ via ball milling shows that short grind times are necessary to ensure that newly formed $Li_3AlH_6$ does not further decompose into the second and third decomposition reactions and that Ti alkoxide catalysts are detrimental to ball milling $LiAlH_4$, and, as such, Ti halides are the preferred catalysts for the ball milling experiments [14].

Without the use of a catalyst, the decomposition of $LiAlH_4$ is a relatively slow reaction [14]. The method of making the present invention is a delicate push and pull between reaction temperature, reaction time, and catalyst amount used to create a system that holds the decomposition of $LiAlH_4$ to its first reaction step, where we create nanoparticles of both $Li_3AlH_6$ and elemental Al metal. The reaction is performed below 100° C. to stop $Li_3AlH_6$ from further decomposition.

Not to be bound by theory, but, the true nature of Ti's catalytic effect on metal hydride decomposition is open for debate. For the present invention, Ti alkoxides are more like nanoparticle initiators, where the alkoxide reacts with $LiAlH_4$ to form molecular seeds by which the nanoparticles grow and where there are Ti remnants associated with the metals surfaces of both $Li_3AlH_6$ and elemental Al nanoparticles.

With the catalytic decomposition of $NaAlH_4$ with $TiCl_4$ by ball milling, Balema et al. observed a nascent Ti-Alloy phase form between Ti and Al [15]. If this true, then it is possible that unbound Ti from our alkoxide catalyst could readily bind to the highly reactive surfaces of our core nanoparticles before passivation with the nanoscale organic layer. We propose that Ti—Al and Ti—$Li_3AlH_6$ bonds form in our nanocomposite at about 0.5% wt to about 1.0% wt of Ti metal in our final composite.

nMx and the Importance of Passivation

The present invention discloses a singular material that is a nanocomposite made of elemental aluminum nanoparticles, lithium aluminum hexahydride nanoparticles, an amount of Ti metal, and a nanoscale organic layer. We named this composite material nMx, which is air stable and protects and preserves the combustion properties of the composite isolated from the first reaction step of $LiAlH_4$ decomposition. We created a range of composites, $nMx_{10}$-$nMx_{20}$, based on the capping agents used to passivate their surfaces.

In our reactions, when we passivate the core nanoparticles, we can either use monomeric organic materials that self-assemble about the surfaces of the nanoparticles or organic polymers that form a matrix about the same. Monomers passivate the outer surfaces of the core nanoparticles and then polymerize on nascent nanoparticle surfaces. Passivating with monomers may (in the case of dienes) or may not (in the case of fatty acids or alcohols) polymerize. If polymerization ensues, then the resulting polymer caps protect the underlying core material. However, the actual act of passivation can still be done by either a monomer type material or a polymeric type material. Nanoscale organic layers that are epoxyalkenes and alkadienes form monolayers around the nanoparticles (molecules that are tethered to the nanoparticle surface, but are only weakly interacting with each other through intermolecular forces).

Passivation of our nanoparticle surfaces serves multiple purposes. It controls particle size and distribution, prevents aggregation to keep the core metals as isolated nanoparticles, passivation blocks impurities that may form on particle surfaces, controls morphology and shape of the nanoparticles, and gives air stability, thereby getting rid of unwanted burning in ambient conditions. It is an embodiment of the present invention where the shape of the nanoparticles are a function of the passivation agent used and the nanometer scale. The shapes range from equant to 1 dimensional structures and may be spheroidal to rod shaped as well.

The mass percentage of the organic in the composite (100×the mass of nanoscale organic layer divided the sum of the mass of nanoscale organic layer plus the mass of elemental Al nanoparticles plus the mass of $Li_3AlH_6$ nanoparticles) is tunable across all nMx iterations. The nMx metal cores are composed of 50% [±20%] by mass of elemental Al nanoparticles and 50% [±20%] by mass of $Li_3AlH_6$ nanoparticles, being a mass ratio of 1:1 [±40%]. It is an embodiment of the present invention wherein a mass percentage for any of the passivation agents about the two distinct core metal nanoparticles in the final composite can vary from 25% to 75% by mass. A non-limiting example being, the mass percentage of the nanoscale organic layer for $nMx_{12}$, being stearyl alcohol, varying from 25% to 75% by mass relative to sum of the mass for both core metal nanoparticles and the nanoscale organic layer. To reiterate, the tunability of the mass percentage for the nanoscale organic layer is possible throughout all nMx iterations, $nMx_{10}$-$nMx_2$.

Elemental Al and $Li_3AlH_6$ nanoparticles are very sensitive and dangerous to work with. In their unpassivated states, these particles are highly reactive and will spontaneously ignite and burn in ambient conditions. Because of the danger related to the core metals' high reactivity, our nanoparticle surfaces are altered to ensure air stability and removes the possibility of flammability and pyrophoricity in air over a period of time. This makes nMx safe to handle in air and to transport for use in applications.

Many passivation strategies have been reported. For micron-sized particles, simple oxide passivation may be useful since an oxide coating of tens of nanometers up to hundreds of nanometers thick can account for only a few percent or less of the total particle mass. For larger particles, alternatives to oxide passivation of aluminum that provide increased energy content include graphite, polymer, or transition metal coatings.

For nanoscale particles, Jouet and coworkers reported nano-Al stabilization with perfluorocarboxylic acid monolayer coatings while Foley and coworkers reported effective transition metal capping of nano-aluminum [16, 17]. Additional metal coating and passivation techniques would be a great advantage. However, most passivation techniques for Al nanoparticles are very expensive, are not scalable for mass production levels, and lack the chemistry needed to keep the passivated particles stable in air for more than a few hours.

nMx Air Stability & Air Sensitivity

It is an embodiment of the present invention where the highly reactive $Li_3AlH_6$ nanoparticles and the elemental Al nanoparticles are safe to handle in air without the concern of immediate combustion with ambient moisture or oxygen while transporting them for use in other applications. However, as we measure the energetic properties of our invention with different passivating agents, we observe that air stability and sensitivity strongly correlate with the oxygen atom content of the nanoscale organic layer. nMx's air stability fluctuates as the oxygen atom content increases in the same.

FIG. 3 represents a range of stable nanocomposites for nMx based on two variables, the mass percentage of organic material in the nanocomposite (y axis) and the mass percentage of O atoms in the passivation agent (x axis). FIG. 3 depicts a chart showing a relationship between the oxygen atom content of the nanoscale organic layer and air stability for $nMx_{10}$-$nMx_{20}$, where the increasing nMx subscripts correspond to increased oxygen content in the nanoscale organic layer about the core metals. The chart's y axis shows a range of stable and useful organic mass percentages for $nMx_{10}$ through $nMx_{20}$. The x axis of FIG. 3 shows the variation in passivation agents.

The minimum organic percentage that produces a stable material is 25%, with a corresponding 75% mass percentage for the Al NPs and $Li_3AlH_6$ NPs cores in the composite. At the high end of the y axis are passivation agents with 75% organic mass percentage, with a corresponding 25% mass percentage relative to the mass of the final composite containing both core metal nanoparticles. At the high organic mass percentage end of the y axis, the burn rate for the nanocomposite generally will become significantly lower, particularly for the $nMx_{10}$ to $nMx_{16}$ iterations. At one end, $nMx_{10}$ has a polymerized organic hydrocarbon cap. The O atom mass percentage is 0%, and, at the other end, $nMx_{20}$, has a polyethylene oxide capping structure, with an O atom mass percentage of ~42%.

From FIG. 3, variations between $nMx_{10}$ and $nMx_{20}$ have intermediate O atom mass percentages within the passivation agent between 0% and 42%. The maximum oxygen atom content we observe for a stable composite is for $nMx_{20}$, with 42% by mass oxygen content in the passivating agent. In contrast, the oxygen mass percentages for $nMx_{12}$ and $nMx_{13}$ (approximately 6% and 12%, respectively) lead to the formation of surface aluminum oxygen bonds throughout the composite that renders the material fully air stable.

It is an embodiment of the present invention wherein the O atom mass percentage within the passivation agent in the final nanocomposite is between 0% and 42% and the mass percentage of the passivation agent relative to the mass of the final nanocomposite is between 25% and 75%. One mass fraction of organic can vary down to 25% for air stability of the nanocomposite. Hot spots are not observed with $nMx_{12}$ that would lead to spontaneous burning and the energy density of the material is at a maximum (38 kJ/g for $nMx_{12}$).

The metal nanoparticles of $nMx_{12}$ through $nMx_{20}$ neither spontaneously ignite nor rapidly react with ambient oxygen in air, primarily from $H_2O$ and $O_2$. $nMx_{12}$ through $nMx_{20}$ are all air stable when using the methods of making disclosed herein. $nMx_{10}$ to $nMx_{20}$ vary in both air stability and air sensitivity. $nMx_{10}$ is unstable in air, where large quantities of $nMx_{10}$ have pyrophoric hot spots that spontaneously ignite. $nMx_{11}$ is not as reactive as $nMx_{10}$, but, in large quantities, $nMx_{11}$ displays pyrophoric behavior, making large quantities of the material air unstable. $nMx_{10}$ and $nMx_{11}$ are generally unsafe to handle in any humid environment. In summary, nMx nanocomposites below $nMx_{12}$ are not air stable. The reactivity of nMx with air is very high with $nMx_{10}$, decreases to a minimum at $nMx_{12}$ and $nMx_{13}$, and slowly increases as one moves left from $nMx_{13}$ across FIG. 3 to $nMx_{19}$ and $nMx_{20}$.

For the present invention, air sensitivity is a similar but different property than air stability. Air sensitivity is the tendency for an energetic material to slowly react in air (primarily with water and molecular oxygen) to lose energy density. This loss of energy density may take place over the timescale of fractions of an hour, days, weeks, or longer periods of time.

The air sensitivity of nMx is at a minimum for $nMx_{12}$ and $nMx_{13}$. These materials are air stable and have low air sensitivity, losing energy density over longer periods of time, depending on air humidity. The air sensitivity increases moving from $nMx_{12}$ and $nMx_{13}$ to $nMx_{19}$ and $nMx_{20}$. The nanoscale organic layer for both $nMx_{19}$ and $nMx_{20}$, for example PEG capping groups, are more hydrophilic. This hydrophilicity results in more atmospheric water accessing the metal cores of $nMx_{19}$ and $nMx_{20}$, thus reducing the energy density more rapidly in air and indicating that they are more air sensitive.

The combination of the elemental Al nanoparticles and the $Li_3AlH_6$ nanoparticles are in an approximately equal amount by mass to the entire nanocomposite. However, when the composite's aluminum nanoparticles have dimensions less than 50 nm, the singular composite with organic capping content <25% is not air stable, i.e. the composite of $Li_3AlH_6$ nanoparticles and elemental aluminum nanoparticles with the capping agent is less stable when the aluminum nanoparticles are smaller than about 50 nm and where the capping agent is less than 25% of the total mass.

As the oxygen atom content for the capping agent increases, the air stability of the nMx continue to evolve. Due to increased air sensitivity, the air stability of $nMx_{19}$ and $nMx_{20}$ decrease. The increase in 0-atom content of the organic cap increases the accessibility of atmospheric water to the Al-containing nanoparticles. This accessibility limits the long-term air stability. The less oxygen in the organic layer the higher the nMx combustion enthalpy, which proceeds by way of the following combustion reaction:

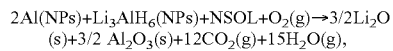
$2Al(NPs)+Li_3AlH_6(NPs)+NSOL+O_2(g) \rightarrow 3/2Li_2O(s)+3/2\ Al_2O_3(s)+12CO_2(g)+15H_2O(g)$, where the NSOL may include, without limitation, a poly (alkadiene), a poly(epoxyalkene-co-alkadiene), a fatty alcohol, a fatty acid, a polyethylene glycol (either with or without substitution and having a molecular weight from about 200 g/mol to about 6000 g/mol).

Air stability is measured for both $nMx_{12}$ and $nMx_{20}$. Each sample is a powder form and left exposed to the ambient air in a pan, where the humidity was greater than or equal to 55% relative humidity. Table 1 shows air stability for $nMx_{12}$ and $nMx_{20}$. After exposure to ambient air, energy densities are measured against time, where all bomb calorimetry data is acquired with a Parr1341 Plain Jacket calorimeter.

All nMx samples are ignited under 20 atm of oxygen gas within the Parr 1108 Oxygen Bomb. The sample is placed into a stainless steel capsule (Parr 43AS), and the sample is ignited with a ~10 cm nickel alloy fuse wire (Parr 45C10). The electric current used to ignite the sample is provided by a Parr 2901EB Ignition Unit. The temperature is monitored with a digital thermometer (Parr 6775). The assembled bomb calorimeter containing the sample is brought to thermal equilibrium with the aid of mechanical stirring. Once the calorimeter reaches thermal equilibrium, the sample is ignited to raise the temperature, and the calorimeter is left to stir until thermal equilibrium is established.

The heat of combustion is acquired from the rise in temperature, the weight of the sample, and the premeasured calorimeter constant value. For the air stability measurements, the sample is placed on a 102 mm diameter Al dish and rests in the air for ~20-30 minutes with a relative humidity of ~55%. It is an embodiment of the present invention where the nanocomposite air stability is measured by an 10% decrease in measured energy density for a period of 8 hours when the nanocomposite is exposed to ambient air and remains non-pyrophoric.

TABLE 1

The change in energy density against time as a measure of air stability for $nMx_{12}$ and $nMx_{20}$ over a duration of 8 hours.

| $nMx_{12}$ Energy Density (kJ/g) | $nMx_{20}$ Energy Density (kJ/g) | Time (Hours) |
|---|---|---|
| −38 | −28 | 0 |
| −37 | −26 | 0.5 |
| −35 | −25 | 2 |
| −35 | −24 | 4 |
| −34 | −21 | 8 |

$nMx_{19}$ and $nMx_{20}$ as a Thermite

Another significant change that occurs with the increase in oxygen atoms for the nanoscale organic layer at $nMx_{19}$ and $nMx_{20}$, as made by Reaction No. 6 below, is that both nanoparticles display thermite behavior. We observe that both $nMx_{19}$ and $nMx_{20}$ carry out self-sustaining combustion in an inert gas environment, such as argon, and even carries out self-sustaining combustion in vacuo, where our composite burns in the absence of any other oxidizer. Not to be bound by theory, but we believe that the unexpected behavior for both nanothermites is due to the PEG organic matrix serving as an effective oxidizer for the elemental aluminum nanoparticles and the $Li_3AlH_6$ nanoparticles.

Both nanothermites may combust via the following reactions. We list the primary thermite reaction in the absence of $O_2$ for $nMx_{20}$ (and $nMx_{19}$) as:

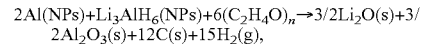
$2Al(NPs)+Li_3AlH_6(NPs)+6(C_2H_4O)_n \rightarrow 3/2Li_2O(s)+3/2\ Al_2O_3(s)+12C(s)+15H_2(g)$, where $\Delta H°_{reaction} = -8.03$ kJ/g for $nMx_{20}$. Further energy release can occur when the released hydrogen gas oxidizes, which we have observed during oxidation of these systems in air:

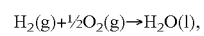
$H_2(g)+\frac{1}{2}O_2(g) \rightarrow H_2O(l)$, where $\Delta H°_{reaction} = -143$ kJ/g H2.

The other possible pathway includes:

$$2Al(NPs) + Li_3AlH_6(NPs) + 6(C_2H_4O)_n \rightarrow 3LiAlO_2(s) + 12C(s) + 15H_2(g),$$

where $\Delta H°_{reaction} = -642.5$ kJ/mol $= -1.73$ kJ/g for $nMx_{20}$.

Based on the thermodynamic date taken from Table 2, we calculate the enthalpy of reaction as $\Delta H°_f = -2988$ kJ/mol for the reaction stoichiometry as written. This large reaction enthalpy is driven by the highly reducing and reactive natures of the composite reactants working in tandem to facilitate unique burning. We observe copious amounts of soot and hydrogen gas released in this reaction, verifying the products of $nMx_{20}$ thermite reaction. The combination of the aluminum nanoparticles and $Li_3AlH_6$ nanoparticles gives a high energy density material with an extremely high burn rate. The close interfacial contact between the oxygen atoms of PEG and the aluminum and lithium aluminum hexahydride cores is present, allowing for a fast-kinetic redox reaction. In this material, the ether becomes a significant oxidizer.

TABLE 2

Thermodynamic data relevant to the $nMx_{20}$ nanothermite reaction.

| Component | Enthalpy of formation ($\Delta H°_f$ kJ/mol) |
|---|---|
| $Li_3AlH_6$ | -332.2 |
| $Li_2O$ | -131.7 |
| $Al_2O_3$ | -1669.8 |
| PEG (per monomer unit $\{C_2H_4O\}$) | 103 |
| Elemental Al, C, & $H_2$ | 0 |

Table 3 lists the % oxygen by mass for various nMx iterations $nMx_{12}$-$nMx_{20}$ and their corresponding combustion enthalpies as measured by bomb calorimetry. For simplicity $nMx_{14}$, $nMx_{15}$, $nMx_{17}$, and $nMx_{18}$ are not listed. As the extent of oxidation of the organic capping layer increases, the enthalpy of combustion of the system decreases, as expected. However, as not to be bound by theory, $nMx_{20}$ includes pure PEG (no carbon side chains) and derives its large energy density from the nanoparticle cores. The range of physical parameters that provide nanothermite behavior for $nMx_{20}$ includes, but are not limited to, the elemental Al nanoparticles having particle diameters in the range of about 7 nm to about 100 nm, the $Li_3AlH_6$ nanoparticles having particle diameters in the range of about 15 nm to about 100 nm, the PEG capping agent having a molecular weight range from about 150 amu to about 10,000 amu, the composite to PEG mass ratio being from about 1:10 to about 4:1, and the elemental aluminum nanoparticles and the $Li_3AlH_6$ nanoparticles having a mass ratio from about 10:1 to about 1:3. It is a preferred embodiment of the invention wherein the PEG capping agent has a molecular weight of about 194 amu for the passivation of $nMx_{20}$.

TABLE 3 lists iterations $nMx_{12}$-$nMx_{20}$, where the % oxygen by mass is given for various nMx iterations according to the capping agent along with the corresponding combustion enthalpies, $\Delta H°_{combustion}$, as measured by bomb calorimetry.

| Formulation | $nMx_{12}$ | $nMx_{13}$ | $nMx_{16}$ | $nMx_{19}$ | $nMx_{20}$ |
|---|---|---|---|---|---|
| % O cap by mass | 8% | 12% | 25% | 37% | 41% |
| $\Delta H°_{combustion}$ | -38 kJ/g | -35 kJ/g | -32 kJ/g | -27 kJ/g | -28 kJ/g |

Reaction No. 6 below represents the first aluminum-based nanothermite with an organic ether as the oxidizing agent. Organic explosives (typically ring strained organic compounds with covalently bonded nitro groups) are known to combust in vacuum. Aluminum nanoparticles containing nanothermites that are known in the literature typically contain a metal oxide (such as copper (I) oxide or molybdenum (VI) oxide) that serves as the oxygen source.

Our prior work on polyether-coated aluminum nanoparticles, see US Pat. Pub. No. 2012/0009424 as filed by Jelliss et al. does not display thermite behavior, where this publication does not disclose nMx as claimed herein [18]. We did not see thermite behavior with the polyether-coated aluminum nanoparticles due to: (1) the absence of $Li_3AlH_6$ nanoparticles from the composite and (2) the extra organic side chains that were present on the prior materials that were produced, greatly reducing the oxygen content in the organic cap. Those extra carbon atoms on the side chain are known to significantly slow or inhibit these types of reactions—hence the thermite behavior is not observed when the PEG cap has an organic side chain. Therefore, prior produced materials were not thermites.

The reaction for $nMx_{20}$ uses an organic ether as the thermite oxidant. Ethers are generally considered to be relatively unreactive and they are not considered to be oxidizing agents under normal chemical conditions. This is one reason organic ethers have not been investigated as nanothermite oxidizers. nMx iterations with capping agents having lower oxygen atom content are better suited to applications as a propellant due to their increased air stability, better compatibility with binders, and higher overall energy density. Our composite has shown unique burning characteristics and energy outputs that could lead to improved specific impulses for engines needing a high-energy output with a higher velocity of released gases and improved mass flow.

The energetic properties of each nMx composite depend on the percentage of oxygen available in the organic nanoscale layer used when passivating our nanoparticles. More specifically, the combustion properties of the material track to the oxygen atom content in the organic matrix. As the oxygen atom content increases in the capping agent, nMx's air stability changes.

For $nMx_{10}$ and $nMx_{11}$, the less or non-air stable iterations of nMx, the capping agents are selected from alkadienes ($nMx_{10}$) or a mixture of an epoxyalkene and an alkadiene ($nMx_{11}$), including but not limited to 1,7-octadiene, 1,9-decadiene, myrcene, or 1,13-tetradecadiene, epoxyhexene, epoxyheptene, epoxyoctene, epoxynonene, epoxydecene, epoxyundecene, epoxydodecene, 1,3-butadiene, isoprene, 2-methyl-1,3-pentadiene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, and combinations thereof. Not to be bound by theory, but these particular capping agents, which have oxygen mass percentages that range from about 0% to about 7% and only forms minimal aluminum oxygen, Al—O, bonds during the passivation process by reaction with epoxide.

Instead, passivation of $nMx_{10}$ and $nMx_{11}$ occurs via polymerization or co-polymerization of the alkadienes or a mixture of an epoxyalkene and an alkadiene to form a matrix about the Al nanoparticles and $Li_3AlH_6$ nanoparticles. It is believed that the reductive nature of the elemental aluminum nanoparticles causes the carbon carbon double bonds of the alkadiene or the epoxyalkene to cleave, which promotes polymerization or copolymerization about our composite core material. In some embodiments, the polyolefin polymerization is thermally promoted. In addition, we believe that surface hydrides are not able to initiate polymerization of certain capping agents, leaving those areas on the surface unpassivated. Because of the low oxygen content and lack of substantial aluminum oxygen bonding at the surfaces of our composite, this polymerization scheme leaves portions of the $Li_3AlH_6$ nanoparticles exposed to ambient reactions, which can induce unwanted burning across the entire mixture.

In some embodiments, these organic polymers form a hydrophobic layer around the nanomaterial such that the polymer hinders the reactivity of the same. In some respects, capping the nanoparticles with an organic polymer hinders the formation of aluminum oxide leading to a more reactive nanomaterial. Without being bound by theory, the hydrophobic polymer may delay reactive molecules such as water and oxygen from reaching the surface of the nanomaterial. In some embodiments, the nanoparticles are capped with alkyl-substituted epoxides. In some embodiments, these polymers are formed from the polymerization of the alkadienes.

It is an aspect of the present invention wherein our singular material, being a composite of both $Li_3AlH_6$ nanoparticles and elemental Al nanoparticles, are both passivated with a variety of organic or inorganic compounds. In some embodiments, capping is achieved using transition metal ions or the use of perfluoroalkylcarboxylic acids as shown by Foley, et al., 2005 and Jouet, et al., 2005, both of which are incorporated herein by reference [16, 17]. The use of polymers to act as a capping agent is also considered. Other capping agents include without limitation fatty acids, fatty alcohols, poly(alka-dienes), poly(epoxyalkene-co-alkadiene), polyethylene glycol (PEG), or any combinations thereof.

For $nMx_{12}$, capping agents for passivation may include, but are not limited to, fatty alcohols being tert-butyl alcohol, tert-amyl alcohol, 3-methyl-3-pentanol, ethchlorvynol, 1-octanol (capryl alcohol), (1-nonanol), 1-decanol (decyl alcohol, capric alcohol), undecyl alcohol (1-undecanol, undecanol, hendecanol), HTPB, lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol), heptadecyl alcohol (1-n-heptadecanol, heptadecanol), stearyl alcohol (1-octadecanol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), ceryl alcohol (1-hexacosanol), 1-heptacosanol, montanyl alcohol, cluytyl alcohol, or 1-octacosanol, 1-nonacosanol, myricyl alcohol, melissyl alcohol, or 1-triacontanol, 1-dotriacontanol (lacceryl alcohol), geddyl alcohol (1-tetratriacontanol), cetearyl alcohol or any combinations thereof, or using enols for crosslinking with aladienes enols, or enoic acids.

For $nMx_{13}$, capping agents for passivation may include, but are not limited to, carboxylic (fatty) acids being butyric acid $[CH_3(CH_2)_2COOH]$, valeric acid $[CH_3(CH_2)_3COOH]$, caproic acid $[CH_3(CH_2)_4COOH]$, enanthic acid $[CH_3(CH_2)_5COOH]$, caprylic acid $[CH_3(CH_2)_6COOH]$, pelargonic acid $[CH_3(CH_2)_7COOH]$, capric acid $[CH_3(CH_2)_8COOH]$, undecylic acid $[CH_3(CH_2)_9COOH]$, lauric acid $[CH_3(CH_2)_{10}COOH]$, tridecylic acid $[CH_3(CH_2)_{11}COOH]$, myristic acid $[CH_3(CH_2)_{12}COOH]$, pentadecylic acid $[CH_3(CH_2)_{13}COOH]$, palmitic acid $[CH_3(CH_2)_{14}COOH]$, margaric acid $[CH_3(CH_2)_{15}COOH]$, stearic acid $[CH_3(CH_2)_{16}COOH]$, 10-undecenoic acid $[CH_2CH(CH_2)_8COOH]$, nonadecylic acid $[CH_3(CH_2)_{17}COOH]$, arachidic acid $[CH_3(CH_2)_{18}COOH]$ or any combinations thereof, or using enols for crosslinking with aladienes enols, or enoic acids.

For $nMx_{14}$-$nMx_{18}$, capping agents for passivation include, but are not limited to, a mixture of a fatty acid, fatty alcohol, polyethylene alcohol (PEG), and an alkadiene. Fatty acids include the list of acids used to passivate $nMx_{13}$ or any combinations thereof. The fatty alcohols include the list of alcohols used to passivate $nMx_{12}$ or any combinations thereof. The alkadienes include the list of alkadienes used to passivate $nMx_{10}$ and $nMx_{11}$ or any combinations thereof.

For $nMx_{19}$ and $nMx_{20}$, capping agents for passivation include, but are not limited to, PEG, PEO, tetraethylene glycol, or triethylene glycol all having various molecular weights.

Reagents & Materials for nMx Reactions

This is a list of the chemicals used to make any of $nMx_{11}$-$nMx_{20}$: Lithium aluminum hydride ($LiAlH_4$, powder, reagent grade, 95%), titanium (IV) isopropoxide (99.999% trace metals basis), 1,7-octadiene (98%), 1,9-decadiene (98%), 1,13-tetradecadiene (90%), toluene (anhydrous, 99.8%), tetrahydrofuran (THF, anhydrous, 99.9%, inhibitor-free), polyethylene glycol (PEG), tetraethylene glycol, triethylene glycol, stearyl alcohol, and stearic acid were all purchased from Sigma Aldrich. Anhydrous diethyl ether was purchased from J. T. Baker. Toluene and THF were distilled over sodium metal and potassium metal, respectively, to remove any trace oxygen and water. Diethyl ether and methanol were distilled over 4 Å molecular sieves. All alkenes were subjected to numerous freeze-pump-thaw cycles to remove any oxygen present. Generally, titanium (IV) alkoxide was dissolved in toluene to create a dilute (millimolar range) solution. Both $LiAlH_4$ and the titanium catalyst were stored under argon atmosphere to prevent oxygen/water exposure.

Reaction No. 1: Creating $nMx_{10}$

Reaction No. 1 begins by adding $LiAlH_4$ (0.246 g, 6.48 mmol) to a round-bottom Schlenk flask and dissolving the ternary metal hydride in either THF or diethyl ether to create a 1.0 M solution. Following the addition of 20 mL toluene, the reaction mixture is heated to 85° C. using a J-KEM Model Apollo dual channel temperature controller. Upon reaching 85° C., 16 μL $Ti(O^iPr)_4$ is added followed by the immediate addition of the capping agent (octadiene, decadiene, or tetradecadiene; 10:1 Al:capping agent molar ratio). The reaction mixture can stir under reflux for 30 minutes, and all solvents are then removed in vacuo.

The nanocomposite is formed from the decomposition of $LiAlH_4$ in the presence of $Ti(O^iPr)_4$ at 85° C. in either THF or diethyl ether. However, the reaction temperature can be from about 75° C. to about 150° C. The temperature is selected to stop the decomposition of $LiAlH_4$ at the first reaction step to produce Al NPs, $Li_3AlH_6$ NPs, and H2 gas. Note that the composite material is co-formed (~50 weight % aluminum:lithium alanate NPs) in the $LiAlH_4$ decomposition reaction. In some embodiments, the method further comprises heating the solution for a time of about 1 minute to about 3 hours. In some embodiments, the time is about 30 minutes. Dienes, such as 1,7-octadiene, 1,9-decadiene, and 1,13-tetradecadiene, were used as passivating agents since the uncapped particles were pyrophoric in air. All reactions were performed on a Schlenk line under argon atmosphere.

In some embodiments of the present invention, the composite has a ratio of Al nanoparticles to $Li_3AlH_6$ nanoparticles from about 5:1 to about 1:5, and in some cases, the ratio is about 1:1. Also note that the composite material, being a mixture of Al nanoparticles and $Li_3AlH_6$ nanoparticles, comprise a core diameter from about 15 nm to about 60 nm. However, the optimal diameter for all formed nanospheres should have a core diameter from about 35 nm to about 55 nm.

It is an aspect of the present invention where the method includes adding 0.1 equivalents of capping agent per equivalent of aluminum. The capping agents for the above reaction may include without limitation an alkene (C≤30), substituted alkene (C≤30), an alkene (C≤18), an alkene (C≤14), an epoxide (C≤30), or a substituted epoxide (C≤30), where the capping agent may undergo polymerization to form a matrix like coating across all nanoparticle surfaces. In other embodiments of the present invention, the alkene contains two or more carbon carbon double bonds. In some embodiments, the capping agent is 1,7-octadiene, 1,9-decadiene, myrcene, or 1,13-tetradecadiene.

In some embodiments, the solvent is heated to reflux. In some embodiments, the titanium compound is added after the solution has reached the temperature from about 70° C. to about 100° C. In some embodiments, the method is performed under an inert atmosphere. In some embodiments, the inert atmosphere is nitrogen gas or a noble gas. In some embodiments, the inert atmosphere is argon. In some embodiments, the method further comprises adding a capping agent to the reaction.

In some aspects of the present invention, the solvent is an organic solvent, non-limiting examples being ether (C≤12), tetrahydrofuran or diethyl ether, arene (C≤12), toluene, a mixture of toluene and tetrahydrofuran, a mixture of toluene and diethyl ether, or any combinations thereof.

In some aspects of the present invention the catalyst may be, without limitation, a titanium(IV) compound, a titanium(IV) tetraalkoxylate, such as titanium(IV) isopropoxide, or a titanium(IV) tetraaryloxylate or any combinations thereof.

In addition, atoms making up aluminum nanoparticles, the $Li_3AlH_6$ nanocomposites, and aluminum nanocomposite materials are intended to include all isotopic forms of such atoms. Isotopes, as used herein, include those atoms having the same atomic number but different mass numbers. By way of general example and without limitation, isotopes of hydrogen include tritium and deuterium, and isotopes of carbon include $^{13}C$ and $^{14}C$. Isotopes of lithium and aluminum are also contemplated in the compounds so long as the isotopes are stable.

Reaction No. 1 and its corresponding data is our first attempt to make the present invention. This reaction is disclosed in U.S. patent application Ser. No. 14/259,859, to which the current application claims priority. $nMx_{10}$, although passivated, displays unwanted burning in ambient conditions. Those in the art that wish to practice $nMx_{10}$ please take precautions against unpredictable burning events, as the cores are not as air stable as the subsequent iterations $nMx_{11}$-$nMx_{20}$. Not to be bound by theory, but the instability of $nMx_{10}$ in ambient conditions may be due to the type of capping agents used in passivation. The method of making $nMx_{10}$ has organic capping agents, including but not limited to, an alkadiene such as myrcene or other alkadienes from $C_6$ to any higher alkadiene, which results in polymerization and only partial stabilization of the core metal nanoparticles.

$nMx_{10}$ capping agents may include without limitation: dienes, such as 1,7-octadiene, 1,9-decadiene, and 1,13-tetradecadiene, myrcene, any alkene containing at least two carbon-carbon double bonds greater than 4 carbons and less than 30 carbons, an alkene (C≤30), substituted alkene (C≤30), an alkene (C≤18), an alkene (C≤14), an epoxide (C≤30), or a substituted epoxide (C≤30), where the capping agent may undergo polymerization to form a matrix like coating across all nanoparticle surfaces.

Powder X-Ray Diffraction for $nMx_{10}$

All PXRD measurements were made using a Rigaku Miniflex 600 equipped with a Cu source operated at 40 kV and a scintillation counter detector. All assignments were made via comparison with the appropriate patterns from the ICDD Crystallographic Database. Powder X-ray diffraction (PXRD) of the resulting grey powder shows the presence of 2 different phases in the resulting sample: face-centered cubic aluminum (fcc Al) and monoclinic lithium hexahydride ($Li_3AlH_6$).

Estimated NP core sizes and d-spacings from PXRD analysis are presented in Table 4. The crystalline Al NP cores were ~29 nm in diameter as determined from Scherrer analysis of the (111), (200), (220), and (331) diffraction peaks. The $Li_3AlH_6$ nanoparticles also appear to be nanocrystalline with NP core diameters between ~23-36 nm. The estimated d-spacings are also in agreement with those reported for $Li_3AlH_6$ by Bastide et al., which is incorporated herein by reference [23].

Elemental analysis of the nanocomposite using PDXL software provided by Rigaku indicates 51% by mass of the crystalline nanocomposite material is comprised of Al whereas the remaining 49% is comprised of $Li_3AlH_6$. These mass percentages are expected based on the stoichiometry presented in Reaction 1. These mass percentage values do not account for the presence of organic cap at the NP surface however. We can vary the particle diameters by (a) allowing the reaction to proceed for a longer time prior to addition of capping agent and (b) addition of polymers to the solution during reaction to increase viscosity. Our Al nanoparticle sizes can be varied from 10 nm to around 75 nm by adjusting these parameters.

TABLE 4

PXRD data for $nMx_{10}$, where estimated crystalline core sizes and d-spacing values for various lattice planes of fcc Al nanoparticles and monoclinic $Li_3AlH_6$ nanoparticles are presented.

| 2θ(°) | Material (Lattice Plane) | Crystalline Size (nm) | d-spacing |
|---|---|---|---|
| 21.9 | $Li_3AlH_6$ (110) | 36 | 0.406 |
| 22.5 | $Li_3AlH_6$ (012) | 35 | 0.395 |
| 31.7 | $Li_3AlH_6$ (202) | 32 | 0.282 |
| 38.4 | Al (111) | 20 | 0.234 |
| 39.8 | $Li_3AlH_6$ (104) | 33 | 0.226 |
| 44.7 | Al (200) | 28 | 0.202 |
| 50.6 | $Li_3AlH_6$ (13-2) | 28 | 0.180 |
| 51.5 | $Li_3AlH_6$ (12-4) | 28 | 0.177 |
| 60.5 | $Li_3AlH_6$ (21-5) | 23 | 0.153 |
| 61.4 | $Li_3AlH_6$ (32-2) | 36 | 0.151 |
| 62.6 | $Li_3AlH_6$ (11-6) | 28 | 0.148 |
| 65.1 | Al (220) | 28 | 0.143 |
| 66.1 | $Li_3AlH_6$ (404) | 34 | 0.141 |
| 78.2 | Al (311) | 32 | 0.122 |
| 82.4 | Al (222) | 35 | 0.117 |

Although lithium hydride (LiH) is a byproduct of the proposed breakdown of $LiAlH_4$, no LiH is observed via PXRD. While LiH is expected to have a fcc crystal lattice similar to that of the fcc Al, the diffraction pattern that can be observed closely aligns with that expected for fcc Al rather than LiH including exact d-space values corresponding to fcc Al and a strong (111) diffraction peak that is weak for LiH. Furthermore, $LiAlH_4$ is not observed in the diffraction pattern either, indicating complete conversion to the nanocomposite product.

Fourier-Transform Infrared Spectroscopy for $nMx_{10}$

A Shimadzu model FTIR-8400S spectrometer equipped with an attenuated total reflectance (ATR) attachment was used to collect all infrared spectroscopic data. All samples were dispersed in toluene prior to analysis. Using Fourier-transform infrared spectroscopy (FTIR), the presence of organic materials on the Al NP surface is noted by the C—H stretching vibrations at ~2970 $cm^{-1}$ and ~2850 $cm^{-1}$. Since alkenes were chosen as the capping monomers for this material, C—H stretching vibrations are expected. The IR spectrum shows no evidence of stretching supporting the conclusion that the reaction produced C=C polymerization thereby reducing the double bonds. PIERMEN (polymerization initiation by electron rich metal nanoparticles) when using alkenes as capping monomers for Al NPs prepared by alane decomposition has been observed [19].

Transmission Electron Microscopy (TEM) of $nMx_{10}$

FIG. 21 depicts TEM images and electron diffraction patterns for $nMx_{10}$ as acquired using a Philips EM430ST operated at 300 kV. Samples are cast on Formvar grids. Image J software is used to estimate d-spacing values from the electron diffraction pattern. The TEM images indicate the nanoparticles are ~50 nm in diameter. The nanoparticles also appear to be enveloped within a polymer matrix, which is a result of the capping monomer, 1,7-octadiene. The cross-linked polymer layer well protects the crystalline NP cores, with no visible evidence of an amorphous Al oxide layer. The TEM images also reveal a homogenous mixture of Al NPs and $Li_3AlH_6$ NPs. The less dense spherical particles observed in the TEM are most likely $Li_3AlH_6$ NPs. Spectroscopic data (FTIR) supports the presence of polymeric hydrocarbons on the alanate NP surface as well.

TABLE 5

$nMx_{10}$ estimated d-spacing values for the rings resulting from fcc Al nanoparticles.

| Ring | d-spacing (nm) | Material (Lattice Plane) |
|---|---|---|
| 1 | 0.362 | $Li_3AlH_6$ (012) |
| 2 | 0.254 | Al (111) |
| 3 | 0.218 | Al (200) |
| 4 | 0.155 | Al (220) |
| 5 | 0.132 | Al (331) |

Similar observation was also noted in the obtained electron diffraction pattern (not shown). Table 5 presents aggregates data for defined rings with d-spacings corresponding to those for fcc Al that were clearly denoted. Our data showed more diffuse rings being visible; however, proper identification of those rings were difficult in that instance. Presumably, the diffuse rings were the result of monoclinic $Li_3AlH_6$. An estimated d-spacing value of 0.362 nm was calculated for the inner diffuse ring located closest to the electron beam (Ring 1). Without being bound by theory, the inner ring could be assigned to the (111) lattice plane of $Li_3AlH_6$; presumably, electron diffraction resulting from the (111) plane would be strongest. Although the diffuse rings cannot be positively be identified, the extreme homogeneity of the nanocomposite is evident based on both the noticeable presence of multiple phases in both the electron diffraction patterns and in the TEM images (FIG. 21).

Reaction No. 2: Creating $nMx_{11}$

Reaction No. 2 and its corresponding data relates to our process for making and identifying $nMx_{11}$. It is an aspect of the present invention wherein $nMx_{11}$ is produced by a bottom up synthesis that creates nanoparticles of both $Li_3AlH_6$ and elemental Al metal that are carefully sized and passivated at the controlled first reaction step of $LiAlH_4$ decomposition, where the capping agent is a mixture of epoxydecene and an alkadiene. The combination of an epoxide and an alkadiene (1,7-octadiene has been demonstrated, but other alkadienes from $C_6$ to any higher alkadiene can also be used) results in polymerization and partial stabilization of the metal cores that can be stated simply as:

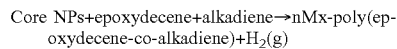
Core NPs+epoxydecene+alkadiene→nMx-poly(epoxydecene-co-alkadiene)+$H_2$(g)

where the mixture of capping agents copolymerize to form a slightly hydrophobic nanolayer about both core nanoparticles.

The following chemicals for making $nMx_{11}$ are purchased from Sigma-Aldrich and are as follows: Lithium aluminum hydride ($LiAlH_4$ (95%)), titanium isopropoxide ($Ti(O^iPr_4)$, 97%), toluene (anhydrous grade, 99.8%), tetrahydrofuran (THF, anhydrous grade, ≥99.9%, inhibitor-free), epoxydecene, and 1,7-octadiene.

The solvents toluene and THF are not distilled and are kept in a glovebox, since they are anhydrous. Before reaction, both the toluene and the THF are deoxygenated by simply pumping their containers for 3 cycles on a Schlenk line. The $Ti(O^iPr)_4$ is placed in an air-free storage flask and then freeze-pumped-thawed. All liquid reagents are transferred to separate pre-heat dried, air-free flask inside the glovebox. The capping agents epoxydecene and 1,7-octadiene are degassed using either freeze-pump-thaw cycles or by purging with an inert gas such as Ar or $N_2$.

The entirety of Reaction No. 2 is performed on a Schlenk line under argon atmosphere. The co-solvent system of toluene and THF can heat for at time at 85° C. The co-solvents are then added to a round bottom air free flask having $LiAlH_4$, where the metal hydride is dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the $LiAlH_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of $LiAlH_4$.

The decomposition reaction is left heating and stirring for ~10 minutes until the epoxydecene and 1,7-octadiene are added. Typical ratios of the capping molecules are from 1:1 to about 2:1 for the alkadiene:epoxyalkene.

Once the epoxydecene and the 1,7-octadiene are added, the reaction mixture can react for a duration from about 0.5 hours to about 2 or more hours. After about a 2-hour reaction time, the solvent is removed by boiling in vacuo or can be removed by filtration or other methods. The organic content of the final $nMx_{11}$ is about 50 w/w. A theoretical yield of 6 g of $nMx_{11}$ is produced.

Reaction No. 3: Creating $nMx_{12}$

Reaction No. 3 and its corresponding data relates to our process for making and identifying $nMx_{12}$. It is an aspect of the present invention wherein $nMx_{12}$ is produced by a bottom up synthesis that creates nanoparticles of both $Li_3AlH_6$ and elemental Al metal that are carefully sized and passivated at the controlled first reaction step of $LiAlH_4$ decomposition, where the passivation agent is a fatty alcohol. It is an embodiment of the present invention wherein the capping agent is stearyl alcohol and passivation is by way of aluminum oxygen bonding between the oxygen atoms available on the passivation agent and the surfaces of the aluminum nanoparticles and can be stated simply as:

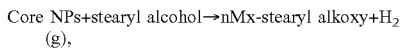

Core NPs+stearyl alcohol→nMx-stearyl alkoxy+$H_2$(g), wherein the organic layer binds to the composite through aluminum oxygen bonds thereby forming stearyl alkoxy at the composite's aluminum surfaces.

The following chemicals for making $nMx_{12}$ are purchased from Sigma-Aldrich and are as follows: Lithium aluminum hydride ($LiAlH_4$ (95%)), titanium isopropoxide ($Ti(O^iPr)_4$, 97%), toluene (anhydrous grade, 99.8%), tetrahydrofuran (THF, anhydrous grade, ≥99.9%, inhibitor-free), and stearyl alcohol.

The solvents toluene and THF are not distilled and are kept in a glovebox, since they are anhydrous. Before reaction, both the toluene and the THF are deoxygenated by simply pumping their containers for 3 cycles on a Schlenk line. The $Ti(O^iPr)_4$ is placed in an air-free storage flask and then freeze-pumped-thawed. All liquid reagents are transferred to separate pre-heat dried, air-free flasks inside the glovebox. Stearyl alcohol is used as supplied without further purification.

The entirety of Reaction No. 3 is performed on a Schlenk line under argon atmosphere. The co-solvent system of toluene and THF can heat for at time at 85° C. The co-solvents are then added to a round bottom air free flask having $LiAlH_4$, where the metal hydride is dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the $LiAlH_4$ is added to the hydrocarbon-ether co-solvent system, the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of $LiAlH_4$.

The decomposition reaction is left heating and stirring for ~10 minutes until the stearyl alcohol is added. The stearyl alcohol is used directly as supplied and dissolved in THF prior to addition to the reaction mixture. The concentration of the stearyl alcohol is on the 0.5-2 M range.

Once the stearyl alcohol is added, the reaction mixture can react for a duration from about 0.5 hours to about 2 or more hours. After about a 2-hour reaction time, the solvent is removed by boiling in vacuo or can be removed by filtration or other methods. A theoretical yield of 6 g of $nMx_{12}$ is produced.

Reaction No. 4: Creating $nMx_{13}$

Reaction No. 4 and its corresponding data relates to our process for making and identifying $nMx_{13}$. It is an aspect of the present invention wherein $nMx_{13}$ is produced by a bottom up synthesis that creates nanoparticles of both $Li_3AlH_6$ and elemental Al metal that are carefully sized and passivated at the controlled first reaction step of $LiAlH_4$ decomposition, where the capping agent is a long chain carboxylic (fatty) acid. It is an embodiment of the present invention wherein the capping agent is stearic acid, where passivation is by way of aluminum oxygen bonding between the oxygen atoms available on the capping agent and the surfaces of the aluminum nanoparticle and can be stated simply as:

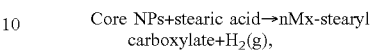

Core NPs+stearic acid→nMx-stearyl carboxylate+$H_2$(g), wherein the organic layer binds to the composite through aluminum oxygen bonds thereby forming stearyl carboxylate at the composite's aluminum surfaces.

The following chemicals for making $nMx_{13}$ are purchased from Sigma-Aldrich and are as follows: Lithium aluminum hydride ($LiAlH_4$ (95%)), titanium isopropoxide ($Ti(O^iPr)_4$, 97%), toluene (anhydrous grade, 99.8%), tetrahydrofuran (THF, anhydrous grade, ≥99.9%, inhibitor-free), and stearic acid.

The solvents toluene and THF are not distilled and are kept in a glovebox, since they are anhydrous. Before reaction, both the toluene and the THF are deoxygenated by simply pumping their containers for 3 cycles on a Schlenk line. The $Ti(O^iPr)_4$ is placed in an air-free storage flask and then freeze-pumped-thawed. All liquid reagents are transferred to separate pre-heat dried, air-free flasks inside the glovebox. The stearic acid is placed in an air-free flask and heated with a heat gun under vacuum with a Schlenk line. The stearic acid is melted and some degassing is observed. The stearic acid can return to room temperature, in which the stearic acid solidified. The stearic acid is purged with argon gas. This cycle is done twice to further reduce the water content.

The entirety of Reaction No. 4 is performed on a Schlenk line under argon atmosphere. The co-solvent system of toluene and THF can heat for at time at 85° C. $LiAlH_4$ is then added to a round bottom, air-free flask and dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the $LiAlH_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of $LiAlH_4$.

The decomposition reaction is left heating and stirring for ~10 minutes until the stearic acid is added. The stearic acid is used directly as supplied and dissolved in THF prior to addition to the reaction mixture. The concentration of the stearic acid is in the 0.5-2 M range.

Once the stearic acid is added, the reaction mixture can react for a duration from about 0.5 hours to about 2 or more hours. After about a 2 hour reaction time, the solvent is removed by boiling in vacuo or can be removed by filtration or other methods. The organic content of the final $nMx_{13}$ is about 50% w/w. A theoretical yield of 6 g of $nMx_{13}$ is produced.

Reaction No. 5: Creating $nMx_{14}$-$nMx_{18}$

Reaction No. 5 is exemplary for each of $nMx_{14}$-$nMx_{18}$ and its corresponding data relates to our process for making the same. It is an aspect of the present invention wherein these iterations of nMx are produced individually via a bottom up synthesis that creates nanoparticles of both $Li_3AlH_6$ and elemental Al metal that are carefully sized and passivated at the controlled first reaction step of $LiAlH_4$ decomposition. However, the capping agent is a combination of a fatty acid, a fatty alcohol, PEG with an alkadiene, tetraethylene glycol or triethylene glycol (an oligomer of ethylene glycol), or any combinations thereof. The combinations and ratios for each of these organics are given in Table 6.

TABLE 6

$nMx_{14}$-$nMx_{18}$ and the ratios for capping agent combinations.

| nMx Iteration | octadecanol % w/cap | tetraethylene glycol % w/cap |
|---|---|---|
| $nMx_{14}$ | 70.1% | 29.9% |
| $nMx_{15}$ | 58.4% | 41.6% |
| $nMx_{16}$ | 44.3% | 55.7% |
| $nMx_{17}$ | 35.0% | 65.0% |
| $nMx_{18}$ | 23.4% | 76.6% |

It is an embodiment of the present invention wherein the combination of capping agents facilitates passivation of the composite by way of aluminum oxygen bonding between the oxygen atoms available for each capping agent and the surfaces of the aluminum nanoparticle and can be stated simply as:

Core NPs+fatty acid/alcohol or PEG+alkadiene→organic-O-nMx+$H_2$(g), wherein the organic layer binds to the composite through aluminum oxygen bonds thereby forming a complex organic oxygen interface at the composite's aluminum surfaces. In addition, the reaction will release $H_{2(g)}$ and, in cases where the fatty alcohol or acid is unsaturated, may result in copolymerization of the complex organic layer bound via the aluminum oxygen bonding.

The following chemicals for making $nMx_{14}$-$nMx_{18}$ are purchased from Sigma-Aldrich and are as follows: Lithium aluminum hydride ($LiAlH_4$ (95%)), titanium isopropoxide (Ti(O$^i$Pr)4, 97%), toluene (anhydrous grade, 99.8%), tetrahydrofuran (THF, anhydrous grade, ≥99.9%, inhibitor-free), stearic acid, stearyl alcohol, 1, 7-octadiene, and Polyethylene glycol (PEG) (average molecular weight ($M_n$) of 6000 amu and having water content of ≤1% w/w).

For simplicity, the following details the method for making $nMx_{16}$, where the co-capping agents tetraethylene glycol (an oligomer of ethyelene glycol) and stearyl alcohol are used to passivate the core nanoparticles. The solvents toluene and THF are not distilled and are kept in a glovebox, since they are anhydrous. Before reaction, both the toluene and the THF are deoxygenated by simply pumping their containers for 3 cycles on a Schlenk line. The Ti(O$^i$Pr)$_4$ is placed in an air-free storage flask and then freeze-pumped-thawed. All liquid reagents are transferred to separate pre-heat dried, air-free flasks inside the glovebox. The PEG is placed in an air-free flask and heated with a heat gun in vacuo on a Schlenk line. The PEG is melted and some degassing is observed. The PEG is allowed to return to room temperature and re-solidify. The PEG is purged with argon gas. This cycle is done twice to further reduce the water content.

The entirety of Reaction No. 5 is performed on a Schlenk line under argon atmosphere. The co-solvent system of toluene and THF can heat for at time at 85° C. $LiAlH_4$ is then added to a round bottom, air-free flask and dissolved in the stirring toluene and tetrahydrofuran mixture. Other ethers beside tetrahydrofuran can be used such as diethyl ether or 1,4-dioxane. A thermocouple is inserted into the reaction mixture to monitor the temperature of the reaction.

Once the $LiAlH_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium isopropoxide is dissolved in toluene to create a solution with a concentration of ~10% v/v. Once the reaction mixture reaches from 85° C. to about 110° C., the titanium isopropoxide solution is added to catalyze the decomposition of $LiAlH_4$.

The decomposition reaction is left heating and stirring for ~10 minutes until the combination of capping agents is added. Note that adding the combination of capping agents according to Table 3 will form the desired iteration of $nMx_{14}$-$nMx_{18}$. The PEG is prepared by dissolving it in ~85 mL of toluene in a separate air-free flask, and some heat is applied to the solution to aid in dissolving the capping agent. The reaction uses 3 g of PEG to produce a 50 w/w of organic content of a 6 g yield of $nMx_{16}$. The PEG may consist of one number average molecular weight ($M_n$) or a mixture of $M_n$.

Once the combination of capping agents is added, the reaction mixture is allowed to react for a duration from about 0.5 hours to about 2 or more hours. After about a 2-hour reaction time, the solvent is removed by boiling in vacuo or can be removed by filtration or other methods. For a typical synthesis, $nMx_{16}$ is capped with polyethylene glycol (PEG, $M_n$=6000 amu). The organic content of the final $nMx_{16}$ is about 50 w/w. A theoretical yield of 6 g of $nMx_{16}$ is produced.

Reaction No. 6: $nMx_{19}$ & $nMx_{20}$

Reaction No. 6 and its corresponding data relates to our process for making and identifying $nMx_{19}$ and $nMx_{20}$. It is an aspect of the present invention wherein both $nMx_{19}$ and $nMx_{20}$ are produced by a bottom up synthesis that creates nanoparticles of both $Li_3AlH_6$ and elemental Al metal that are carefully sized and passivated at the controlled first reaction step of $LiAlH_4$ decomposition, where the capping agents various PEGs, PEO, or TEG of varying molecular weights.

For $nMx_{19}$, larger molecular weight PEG systems (from about 500 amu to about 6000 amu) are used as the capping agent, where the percent oxygen by mass of the PEG cap varies from about 36.4% to about 39%. For $nMx_{20}$, triethylene glycol (PEG with 3 monomer units) and/or tetraethylene glycol are used as capping agents, with 42.6% and 41.2% by mass oxygen mass of the capping agent, respectively.

It is an embodiment of the present invention wherein passivation of either $nMx_{19}$ or $nMx_{20}$ is by way of aluminum oxygen bonding between the oxygen atoms available on the capping agent and the surfaces of the aluminum nanoparticle and can be stated simply as:

Core NPs+PEG→nMx-PEG+$H_2$(g), wherein the organic layer binds to the composite through aluminum oxygen bonds thereby forming an nMx-PEG complex.

The following chemicals for making $nMx_{19}$ and $nMx_{20}$ are purchased from Sigma-Aldrich and are as follows: Lithium aluminum hydride ($LiAlH_4$ (95%)), titanium (IV) isopropoxide (Ti(OiPr)$_4$, 97%), toluene (anhydrous grade, 99.8%), tetrahydrofuran (THF, anhydrous grade, ≥99.9%, inhibitor-free), PEO, Polyethylene glycol (PEG) (average molecular weight (Mn) of 6000 amu and having water content of ≤1% w/w) [$nMx_{19}$], triethylene glycol (PEG with 3 monomer units), and tetraethylene glycol (TEG) [$nMx_{20}$].

The solvents toluene and THF are distilled and kept in a glovebox. Before reaction, both the toluene and the THF are deoxygenated by simply pumping their containers for 3 cycles on a Schlenk line. The $Ti(OiPr)_4$ is placed in an air-free storage flask and then freeze-pumped-thawed. All liquid reagents are transferred to separate pre-heat dried, air-free flasks inside the glovebox. The PEG is placed in an air-free flask and heated with a heat gun in vacuo on a Schlenk line. The PEG is melted and some degassing is observed. The PEG can return to room temperature and resolidify. The PEG is purged with argon gas. This cycle is done twice to further reduce the water content.

The entirety of the reaction is performed on a Schlenk line under argon atmosphere. $LiAlH_4$ is introduced into a round bottom, air-free flask within a glovebox. Under a Schlenk line, the co-solvent system of toluene and THF are added to the flask containing $LiAlH_4$. The reaction mixture can heat for a time at 85° C. Other ethers beside tetrahydrofuran can be used such as diethyl ether or 1,4-dioxane. A thermocouple is inserted into the reaction mixture to monitor the temperature of the reaction.

Once the $LiAlH_4$ is added to the hydrocarbon-ether co-solvent system the reaction temperature is increased from about 100° C. to about 110° C., or the reaction mixture can remain at about 85° C. with a heating mantle while stirring with a stir bar. In a separate air-free flask, the titanium (IV) isopropoxide is dissolved in toluene to create a solution with a concentration of ~10% v/v. Once the reaction mixture reaches from 85° C. to about 110° C., the titanium (IV) isopropoxide solution is added to catalyze the decomposition of $LiAlH_4$.

The decomposition reaction is left heating and stirring for ~10 minutes until the PEG is added. The PEG is prepared by dissolving in ~85 mL of toluene or THF in a separate air-free flask, and some heat is applied to the solution to aid in dissolving the capping agent. The reaction uses 3 g of PEG to produce a 50% w/w of organic content of a 6 g yield of $nMx_{20}$. The PEG may consist of one number average molecular weight (MO or a mixture of $M_n$.

Once the PEG is added, the reaction mixture can react for a duration from about 0.5 hours to about 2 or more hours. After about a 2-hour reaction time, the solvent is removed by boiling in vacuo or can be removed by filtration or other methods. For a typical synthesis, $nMx_{20}$ is capped with tetraethylene glycol (PEG with four monomer units and Mn=6000 amu). The organic content of the final $nMx_{20}$ is about 50 w/w to about 55% w/w. A theoretical yield of 6 g of $nMx_{20}$ is produced. For $nMx_{19}$, the nanoscale organic layer is a blend of polyethylene glycol having Mn=600 amu and Mn=6000 amu, where the blend may range from 1:1 to about 35:1.

nMx can be incorporated with a secondary high explosive by any traditional means, including slurry casting (with an appropriate solvent such as an ether or a hydrocarbon) of nMx and a secondary high explosive, or by directly pressing a pellet of nMx with the secondary high explosive, or by using an epoxide binder (or other appropriate binder) to combine the nMx and the secondary high explosive into a formable composite. nMx can be included into a secondary high explosive composite in concentrations ranging from about 0.1% w/w up to about 50% w/w.

Powder X-Ray Diffraction—nMx Structural Analysis

Powder X-Ray Diffraction (PXRD) is an analytical technique known in the art to categorize samples having crystalline phases. With PXRD, X-rays wavelengths relative to a diffraction angle can give insight into the lattice spacing of a nanocomposite's crystalline structure. nMx is finely ground into a powder and irradiated with X-rays to extract characteristic peaks from scattered waves. Only $Li_3AlH_6$ and elemental Al are in detectable amounts in crystal form and thus render PXRD peaks, indicating the lack of byproducts in our nanocomposite.

The PXRD scans for nMx samples are performed on a Rigaku XRD MiniFlex 600 diffractometer that has a Cu source operated at 40 kV/15 mA and a scintillation counter detector. Conversion of the diffraction peaks to d-spacings allows for further identification of nMx's core metals, as given for $nMx_{20}$. In addition, a Scherrer analysis is performed to discern the particle sizes from the peak widths of the diffractogram. The analysis uses an equation that relates the size of nanoparticles in a solid to the broadening of a peak in the diffractogram. The equation is as follows:

$$\tau = K\lambda/\beta \cos \Theta,$$

where $\tau$ is the mean size of the ordered (crystalline) domains, K is a dimensionless shape factor, $\lambda$ is the wavelength of the X-ray, ß is line broadening in radians. and $\Theta$ is the Bragg angle. Because the nanoscale organic layer is not a crystalline material, the nanocomposite's passivation layer cannot be examined by constructive interference of diffracted X-rays as defined by Bragg's Law ($n\lambda = 2d \sin \theta$), meaning the fundamental stretching frequencies of the nanoscale organic layer will be qualified via Raman and FTIR spectroscopy.

FIGS. 4-9 depict PXRD diffractograms for $nMx_{11}$, $nMx_{12}$, $nMx_{13}$, $nMx_{16}$, $nMx_{19}$, and $nMx_{20}$ respectively. Each iteration of nMx gives, on the average, very similar peaks at 20, where the average peak positions for FIGS. 4-9 that characterize the two distinct nanoparticles are given in Table 7 along with their corresponding Miller indices and Scherrer nanoparticle sizes. The diffractograms depicted in FIGS. 4-9 show the y-axis labeled as Relative Intensity from 0% to 100%. The x-axis is rendered in degrees relative to $2\Theta$. For all nMx PXRD scans, the Al (111) plane located at about 38.4° has the highest peak intensity. All other peak intensities corresponding to crystalline Al and $Li_3AlH_6$ are measured relative to the intensity of the Al (111) peak.

The average relative intensities for the other peaks corresponding to crystalline Al nanoparticles, across the as mentioned nMx sample selection, are as follows: the Al (200) peak at 44.7° has a relative intensity of 49%; the Al (220) peak at 65.1° has a relative intensity of 32%; the Al (311) peak at 78.2° has a relative intensity of 30%; and the Al (222) peak at 82.4° has a relative intensity of 12%.

The crystalline Al nanoparticles peaks are larger in intensity and more pronounced than the peaks belonging to $Li_3AlH_6$ nanoparticles. $Li_3AlH_6$ nanoparticles have a lower scattering cross section for the X-rays due to 90% of the atoms in $Li_3AlH_6$ having a low atomic weight (Li and H), which renders peak intensities that are lower in magnitude relative to the heavier Al atomic core.

$Li_3AlH_6$ nanoparticles render PXRD double, or unresolved peaks, at 20. The average relative intensities for the peaks corresponding to crystalline $Li_3AlH_6$ nanoparticles, across the as mentioned nMx sample selection, are as follows: $Li_3AlH_6$ (110) peak at 21.9° has a relative intensity of 29%; $Li_3AlH_6$ (012) peak at 22.5° has a relative intensity of 30%; $Li_3AlH_6$ (202) peak at 31.7° has a relative intensity of 16%.

The average Scherrer width of the Al (111) peak at 38.4° relative to 2Θ for the various types of nMx is 18 nm. The average Scherrer width of the $Li_3AlH_6$ (202) peak at 37.1° relative to 2Θ for the various types of nMx is 23 nm. PXRD scans confirm that our method produces elemental Al nanoparticles and $Li_3AlH_6$ nanoparticles that are below 50 nm. Therefore, it is an aspect of the present invention wherein the lower limit of nMx's nanoparticle size distribution for elemental Al core metals is about 18 nm and the lower limit for nanoparticle size distribution for $Li_3AlH_6$ core metals is about 23 nm.

TABLE 7

PXRD data for various nMx iterations at 2Θ, Relative Intensity, Lattice spacing, and Scherrer size.

| Core Metal NPs | $Li_3ALH_6$ NPs | | | Elemental Al NPs | | | |
|---|---|---|---|---|---|---|---|
| 2Θ Diffraction | 21.9° | 22.5° | 31.7° | 38.4° | 44.7° | 65.1° | 78.2° | 82.4° |
| Relative Intensity | 29% | 30% | 16% | 100% | 49% | 32% | 30% | 12% |
| Lattice spacing | (110) | (012) | (202) | (111) | (200) | (220) | (311) | (222) |
| NPs Scherrer Size | | 23 nm | | 18 nm | | | | |

FTIR & Raman Data—nMx Spectroscopic Analysis

Because the nanoscale organic layer is not a crystalline material, the passivation agent for the core nanoparticles cannot be examined by constructive interference of diffracted X-rays as defined by Bragg's Law ($n\lambda=2d \sin \theta$). nMx's nanoscale organic layer is analyszed via traditional FTIR and Raman spectroscopy, which are well known in the art. Raman spectroscopy measures scattered laser light based on the fundamental stretching frequencies of the nanoscale organic layer to observe vibrational, rotational, and other low-frequency modes in organics, giving a finger print for each passivation agent about the core nanoparticles.

FIG. 10 depicts FTIR stretching frequencies of the nanoscale organic layer for $nMx_{20}$. The nanoscale organic layer is a glycol and shows a band at 1080 $cm^{-1}$ (C—O stretching in the glycol) and at 2850-2970 $cm^{-1}$ (C—H stretching in the glycol). This indicates that the there is an association with the glycol nanoscale organic layer and the two distinct core nanoparticles.

FIG. 11-FIG. 14 are Raman spectra for $nMx_{12}$, $nMx_{13}$, $nMx_{16}$, and $nMx_{19}$ respectively. FIG. 11 depicts Raman scattering for $nMx_{12}$, where the scan is performed from 500 $cm^{-1}$ to 3500 $cm^{-1}$ for octadecanol as the nanoscale organic layer. Octadecanol gave Raman frequencies for $nMx_{12}$ at about 1092 $cm^{-1}$ (C—O stretch) and at about 2850-2920 $cm^{-1}$ (C—H stretch).

FIG. 12 depicts Raman scattering for $nMx_{13}$, where the scan is performed from 500 $cm^{-1}$ to 3500 $cm^{-1}$ for octadecanoic acid as the nanoscale organic layer. Octadecanoic acid gave Raman frequencies for $nMx_{13}$ at about 1294 $cm^{-1}$ (C—O stretch), at about 1645 $cm^{-1}$ (C=O stretch), and at about 2841-3024 $cm^{-1}$ (C—H stretch).

FIG. 13 depicts Raman scattering for $nMx_{16}$, where the scan is performed from 500 $cm^{-1}$ to 3500 $cm^{-1}$ for a mixture of octadecanol and TEG as the nanoscale organic layer. The mixture of octadecanol and TEG gave Raman frequencies for $nMx_{16}$ from about 2839 $cm^{-1}$ to about 2915 $cm^{-1}$ (C—H stretch). Note that the C—O stretch is too weak and not observable.

FIG. 14 depicts Raman scattering for $nMx_{19}$, where the scan is performed from 500 $cm^{-1}$ to 3500 $cm^{-1}$ for PEG as the nanoscale organic layer. PEG gave Raman frequencies for $nMx_{19}$ at about 1086 $cm^{-1}$ (C—O stretch) and at about 2868-2950 $cm^{-1}$ (C—H stretch).

It is an aspect of the present invention wherein $nMx_{11}$ through $nMx_{20}$ may be identified as a nanometallic organic hybrid that is best described by the combination of PXRD peaks for both core nanoparticles and the Raman fundamental stretching frequencies of the agents used for the nanoscale organic layer as follows: $Li_3AlH_6$ nanoparticles giving PXRD double peaks at 2Θ at about 21.9°, at about 22.5°, and about 31.7°, elemental Al nanoparticles giving PXRD peaks at 2Θ at about 38.4° [highest peak], about 44.7°, at about 65.1°, at about 78.2°, and about 82.4°, and the nanoscale organic layer giving C—O stretching frequencies from about 1086 cm-1 to about 1294 $cm^{-1}$, C=O stretching frequencies of about 1645 $cm^{-1}$, C—H stretching frequencies from about 2841 $cm^{-1}$ to about 3024 $cm^{-1}$.

DSC/TGA—nMx Thermal Analysis

Because nMx can be used as an advanced fuel in various applications, DSC/TGA data examines the thermal behavior of the present invention. Differential Scanning calorimetry/Thermo Gravimetric Analysis (DSC-TGA) are combined thermal analysis techniques that find combustion events of a sample relative to time and increased heat (DSC) and mass change of a substance relative to the same (TGA). The DSC-TGA analysis is done on TA Instruments DSC/TGA SDT Q600. The exotherms for various nMx iterations give ignition and combustion events for the Li3AlH6 nanoparticles, the elemental Al nanoparticles, and the nanoscale organic layer in air. The DSC scanning rate for all nMx scans are either 5° C. per minute ($nMx_{12}$), 10° C. per minute ($nMx_{10, 11, 16, 19, and 20}$), or ~20° C. per minute ($nMx_{13}$).

FIG. 15 depicts DSC-TGA curves for $nMx_{10}$ and commercial $Li_3AlH_6$ under ambient air flow. The nanoscale organic layer is octadiene for $nMx_{10}$. The DSC-TGA scan of $nMx_{10}$ is compared with the DSC-TGA scan of commercial $Li_3AlH_6$. The DSC onset temperature of the exotherm on $nMx_{10}$ is at 252° C., which is like the onset of the exotherm (218° C.) located on the commercial $Li_3AlH_6$. The slight bump at 600° C. is attributed to the ignition and combustion of elemental Al nanoparticles. The TGA shows mass gains for these exotherms on the $nMx_{10}$ and commercial $Li_3AlH_6$ are due to the combustion with oxygen gas to produce the solid combustion products of $Li_2O$ and $Al_2O_3$.

FIG. 16 displays DSC-TGA curves for $nMx_{11}$ under ambient air flow with epoxydecene and an alkadiene as the nanoscale organic layer. The starting materials for $nMx_{11}$ are mixed at ratios of 10:1:2 of $LiAlH_4$:epoxydecene:octadiene respectively, and where the nanoscale organic layer is a mixture of epoxydecene and octadiene. The DSC exotherm for $nMx_{11}$, being the solid black line, exhibits an $Li_3AlH_6$ exotherm with an onset of 160° C. $nMx_{11}$ also exhibits an exotherm related to elemental Al nanoparticle combustion, in which the onset is at 586° C. Also note that there is a small exothermic peak at about 380° C. This peak can be attributed to the combustion of the nanoscale organic layer. We believe the decrease from 450° C. onward is due to other chemical species such as $Li_2O$ and $Al_2O_3$ and the like.

FIG. 17 displays DSC-TGA curves for $nMx_{12}$ under ambient air flow with 50% steryl-alcohol as the nanoscale organic layer. For $nMx_{12}$, two exothermic peaks correspond to the combustion of $Li_3AlH_6$. The first exothermic peak is accompanied with a mass gain and its onset is at 110° C., in which the mass gain is due to the association with molecular oxygen during the combustion of $Li_3AlH_6$. The second exothermic peak is accompanied with a mass loss and its onset is at 265° C. This mass loss is due to the combustion of the organic cap into gaseous combustion products, which is offset with the mass gain of the oxidation of $Li_3AlH_6$. Another exotherm related to the combustion of the Al nanoparticles occur with an onset of 568° C. In addition, another exotherm is observed with an onset of 690° C., which is related to the reaction of $Li_2O$ and $Al_2O_3$ associates together to produce $LiAlO_2$.

FIG. 18 displays DSC-TGA curves for $nMx_{13}$ under ambient air flow with 44% oleic acid as the nanoscale organic layer. $nMx_{13}$ has a similar DSC-TGA profile as $nMx_{12}$. It also exhibits two exotherms related to the combustion of $Li_3AlH_6$ at 90° C. and 270° C., in which the first exotherm experiences a mass gain and the second exotherm experiences a mass loss. The intense peak at about 325° C. is attributed to the ignition and combustion of the nanoscale organic layer. It also has two exotherms related to the combustion of Al and the appearance of $LiAlO_2$ at the respective onset temperatures of 570° C. and 700° C.

FIG. 19 displays DSC-TGA curves for $nMx_{16}$ under ambient air flow with a mixture of octadecanol/TEG as the nanoscale organic layer. $nMx_{16}$ has a similar DSC-TGA profile with $nMx_{12/13}$. The exotherm onsets of $Li_3AlH_6$ are at 125° C. and 270° C. The onsets of exotherms of elemental Al nanoparticle combustion and $LiAlO_2$ association are located respectively at 560° C. and 670° C.

FIG. 20 displays DSC-TGA curves for $nMx_{19}$ under ambient air flow with PEG 600 as the nanoscale organic layer. $nMx_{19}$ gives three exotherms with a mass loss that are related to the combustion of $Li_3AlH_6$, in which the onsets are located at 110° C., 250° C., and 430° C. Three exothermic peaks due to the combustion of $Li_3AlH_6$ rather than two peaks like the nMx12/13/16 may occur since there is a trimodal size distribution of $Li_3AlH_6$ nanoparticles in $nMx_{19}$. The exothermic onset for elemental Al nanoparticle combustion is at 550° C., and the exothermic onset of $LiAlO_2$ association is located at 675° C. The relative amount of exothermic heat (integral of peak) relating to production of $LiAlO_2$ is much larger than the same peak in the formulations of $nMx_{10-16}$ possibly because the diol of a PEG molecule covalently links an Al and $Li_3AlH_6$ nanoparticle, which reduces their interfacial distance.

Although DSC-TGA scans for $nMx_{20}$ are not shown, the scans disclose five exothermic peaks related to the $Li_3AlH_6$ nanoparticles located with an onset of 90° C., 200° C., 280° C., 340° C., 470° C. The modes of size distribution have increased with $nMx_{20}$ over the $nMx_{19}$ perhaps due to the smaller size of the tetraethylene glycol over the PEG molecules, in which smaller molecules may provide a greater number of size distributions. The exothermic peak for elemental Al nanoparticle combustion has an onset of 525° C. Like $nMx_{19}$, a relatively large amount of exothermic heat is produced from the association of $LiAlO_2$, in which the onset is at 665° C.

In total, the DSC data shows that a few exotherms are located at about 200° C.-400° C., which are due to the combustion of $Li_3AlH_6$ nanoparticles with oxygen to produce $Li_2O$ and $Al_2O_3$ and the unexpected combustion event of the nanoscale organic layer immediately after the same. Another important exotherm is located at about 600° C., which is due to the combustion of elemental Al nanoparticles to produce $Al_2O_3$. In addition, an exotherm at about 700° C. is due to the reaction between the $Li_2O$ and $Al_2O_3$ to produce lithium aluminate, $LiAlO_2$. The TGA data infers that the exotherms are accompanied by either a mass gain due to the oxidation of the metals or a mass loss due to the capping agent oxidation to produce combustion gases.

DSC data indicates that nMx, on average, can render at least three combustion events. Two combustion events can be attributed to the core nanoparticles and another to the combustion of the nanoscale organic layer. nMx and certain oxidizers used in combustion processes ignite within the same temperature ranges. If the oxidizer, a nonlimiting example being ammonium perchlorate, and the nMx nanocomposite ignite within the same temperature range, then the multiple combustion behavior could lead to improved advanced fuels or additives that give a unique burning behavior for many combustion applications.

TEM Data—nMx Nanoparticle Images

True nanoparticles for nMx are readily seen in TEM images shown in FIGS. 21-26. Transmission Electron Microscopy (TEM) is a well-known spectroscopic technique for giving high resolution images of samples that are 100 nm or less in diameter. All images were taken using a JEOL 1200ex TEM operated at 60 kV. Samples were cast on formvar TEM grids. An image analysis software suite, non-limiting examples being MacTempas image simulation software, Cerius2, EMAN, IMAGIC, CCP4, CRISP, MRC, or FEI Amira, was used to properly analyze nanoparticle size distributions for nMx samples.

With TEM, an image is formed from the interaction of electrons with the sample as the beam is transmitted through the specimen. This image provides information about the space group symmetries and orientation of the single crystal nanoparticles relative to the electron beam's path, giving the physical dimensions of the nanoparticles or a nanoscale size distribution of the same [22]. While PXRD scans identify the nanoscale extent of the crystalline domains, true nanoparticle nature is confirmed by TEM imaging.

TEM images show that the shape and size of nMx nanoparticles vary depending on the type of passivation agent used during the reaction and the push and pull of reaction conditions. FIG. 21 depicts two separate TEM images of $nMx_{10}$, where core metal nanosurfaces are passivated by octadiene as the nanoscale organic layer. FIG. 21 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 50 nm.

FIG. 22 depicts TEM imaging of $nMx_{12}$, where core metal surfaces are passivated by 50% steryl alcohol as the nanoscale organic layer. FIG. 22 shows the core metals as dark rods having a 1-dimensional (nanowire) shape for both elemental Al and $Li_3AlH_6$ nanoparticles. The lower density of the nanoscale organic layer surrounds the rods as a passivating agent, as shown by the lower contrast. The average nanoparticle size is 100 nm.

FIG. 23 depicts TEM imaging of $nMx_{13}$, where the surfaces of the core nanoparticles are passivated by 44% oleic acid as the nanoscale organic layer. FIG. 23 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 50 nm.

FIG. 24 depicts TEM imaging $nMx_{16}$, where core metal nanosurfaces are passivated by a mixture of octadecanol/TEG as the nanoscale organic layer. FIG. 24 shows the core metals as dark rods having a 1-dimensional (nanowire) shape for both elemental Al and $Li_3AlH_6$ nanoparticles. The lower density of the (lower contrast) nanoscale organic layer surrounds the rods as a passivating agent, as shown by the lower contrast. The average nanoparticle size is 100 nm.

FIG. 25 depicts TEM imaging for $nMx_{19}$, where core metal nanosurfaces are passivated by PEG 600 as the nanoscale organic layer. FIG. 25 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 100 nm.

FIG. 26 depicts TEM imaging for $nMx_{20}$, where core metal nanosurfaces are passivated by TEG as the nanoscale organic layer. FIG. 26 shows the heavier mass of the core metals appearing as dark spots, being elemental Al and $Li_3AlH_6$ nanoparticles, surrounded by the lower density of the nanoscale organic layer, as shown by the lower contrast. The average nanoparticle size is 100 nm.

nMx Heats of Formation

From Table 8, nMx composites have very high combustion enthalpies (in the range of −24 to −38 kJ/g), significantly exceeding that of other aluminum-containing nanomaterials which typically have maximum theoretical combustion enthalpies of 30.9 kJ/g. All nMx materials have very high burn rates in oxygen. Parr 1341 Plain Jacket calorimeter; The gravimetric heat of combustion for nMx materials varies from ~30 ($nMx_{20}$) to 39 ($nMx_{12}$). Metalized combustibles are typically in the range of from about 25 to about 31 kJ/g.

TABLE 8

Measured & Theoretical ΔH° values for the family of nMx nanocomposites.

| nMx Iteration | Measured ΔH° | Theoretical ΔH° | Nanoscale Organic Layer |
|---|---|---|---|
| $nMx_{11}$ | −24 kJ/g | −40 kJ/g | epoxydecene + alkadiene |
| $nMx_{12}$ | −38 kJ/g | −39 kJ/g | octadecanol |
| $nMx_{13}$ | −35 kJ/g | −37 kJ/g | oleic acid |
| $nMx_{16}$ | −29 kJ/g | −34 kJ/g | Octadecanol/tetraethylene glycol |
| $nMx_{19}$ | −27 kJ/g | −31 kJ/g | PEG (Mn = 6000 (55% by weight of PEG mixture) and 600 (20% by weight of PEG mixture) |
| $nMx_{20}$ | −28 kJ/g | −30 kJ/g | Tetraethylene glycol | nMx and its various uses as an explosive enhancer and a solid fuel grain for rocket motors are further discussed below.

nMx as Explosive Enhancer

Either $nMx_{19}$ or $nMx_{20}$ can be associated with a secondary high explosive by traditional means to enhance shockwave velocity and explosive pressure. Because the enhancer acts as both fuel and oxidizer, the nanocomposite combusts to release self-sustained heat energy that increases the propagation speed of a shockwave through a chemical explosive and raises the temperature (Q) and pressure (V) of newly formed hot gases by the same, thereby creating a more effective blast, where Explosive power=Q×V. Although there is a specific mention for $nMx_{19}$ and $nMx_{20}$ to act as explosive enhances, it is an embodiment of the present invention for $nMx_{12-18}$ to also be associated with a secondary high explosive by traditional means to enhance shockwave velocity, where these materials can possibly contribute more total energy over a longer period of time to the shock wave enhancement.

An explosion is a result of rapid combustion and is characterized by: the decomposition or rearrangement of chemicals by heat or by shockwaves; self-sustaining behavior; a large release of heat; and the formation of hot gases that increase localized pressure and expand surrounding air molecules to create a blast wave and shock front [25]. When a chemical explosive is detonated, hot gases produced during detonation expand and facilitate the propagation of a shockwave through the surrounding medium that affects the air molecules about the blast [25].

The enhanced explosive may be made via slurry casting either $nMx_{19}$ or $nMx_{20}$ with a secondary high explosive in an appropriate solvent, such as an ether or a hydrocarbon. The enhanced explosive may also be made by directly pressing a pellet of the enhancer with a secondary high explosive or by using an epoxide binder (or another appropriate binder) to combine the same. Either enhancer can be included into the secondary high explosive in concentrations ranges from about 0.1% up to about 50% by weight.

It is a preferred embodiment of the present invention where the enhancer is admixed with at least one secondary high explosive including but not limited to: 5-nitro triazol-3-one (NTO), 2,4,6-trinitrotoluene (TNT), 1,3,5,7-tetranitro-1,3,5,7-tetrazocane (HMX), trinitro triamino benzene (TATB), 3,5-dinitro-2,6-bis-picrylamino pyridine (PYX), nitroglycerine (NG), ethylene glycol dinitrate (EGDN), ethylenedinitramine (EDNA), diethylene glycol dinitrate (DEGDN), Semtex, Pentolite, trimethylol ethyl trinitrate (TMETN), tetryl, hexahydro-1,3,5-trinitro-1,3,5-triazine (RDX), pentaerythritol tetranitrate (PETN) and 2,2,2-trinitroethyl-4,4,4-trinitrobutyrate (TNETB), methylamine nitrate, nitrocellulose, N3,N3,N'3,N'3,N7,N7,N'7,N'7-octafluoro-1,5-dinitro-1,5 diazocane-3,3,7,7-tetraamine (HN-FX), CL-20 (HNIW) Hexanitrohexaazaisowurtzitane, nitroguanidine, hexanitrostilbene, 2,2-dinitroethene-1,1-diamin (FOX-7), dinitrourea, and picric acid. In various aspects, the energetic material is selected from the group consisting of 2,4,6-trinitrotoluene (TNT), 1,3,5,7-tetranitro-1,3,5,7-tetrazocane (HMX), AFX 757, or any combinations thereof.

Pellet Pressing of Enhanced Secondary High Explosive

For pellet pressing, the non-limiting example follows. An 8:1 ratio of a mixture of a dry secondary explosive is admixed with either $nMx_{19}$ or $nMx_{20}$ in a container. However, the concentration of either enhancer with the secondary high explosive can be from about 0.5%/wt to about 90%/wt of the total dry mixture. Gently agitate the two ingredients until there is a uniformed distribution of all ingredients in the mixture.

After which, a binder may be added to the uniformed mixture. It is a preferred embodiment of the present invention wherein the binder is Polyethylene glycol (PEG) and is added to the mixture in an amount that makes up roughly 0.5%/wt to 20%/wt of the total mixture of the two ingredients. It is an embodiment of the present invention where the binder may include without limitation waxes, PVP, PEG 1500, hydroxypropylmethylcellulose, methylcellulose, cellulose acetate, cellulose ethers, ethylene vinyl acetate, polystyrene plastic, nitrocellulose, polyurethane rubber, hydroxyl-terminated polybutadiene rubber, Viton fluoropolymer elastomeror, bis 2,2-dinitropropyl acetate [BDNPA], bis 2,2-dinitropropyl formal [BDNPA/f], or any combinations, copolymers, or varying molecular weights thereof.

After adding the binder, the total blend is placed in a mold having a desired shape for the resulting enhanced explosive. The blend is compressed in the mold to cure the mixture, where dwell times are very short, being from about a few seconds up to about 5 minutes. Pellet presses are machines that are readily known and used within the arts and are capable of compression forces that range of from about 2,000 to about 40,000 pounds per square inch gauge to cure and shape explosive mixtures, pharmaceuticals, or any differing dry materials that need to be blended and shaped into a uniformed composite. Use of the enhanced explosive, meaning further processing or detonation, is not dependent on curing time.

Also note that the dry admixture, being the enhancer, secondary high explosive, and the optional binder, may be subjected to an extruder, where the dry mixture is mixed using an auger or Archimedes screw, placed in a hopper, and subjected to pressure for pellet pressing. nMx composites may also be admixed with pyrotechnics. In contrast to secondary high explosives, a pyrotechnic is a combustible material that produces a special effect when burned, e.g. fireworks. This class of advanced fuel produces heat, light, smoke and sound. The fuels are typically metals including aluminum, chromium, magnesium, manganese, and the like. Oxidizers include chlorates, chromates, nitrates, oxides and perchlorates. Binders may include waxes, manmade vinyls, a variety of polymers, and the like. The addition of nMx to pyrotechnics enhances the physical properties of the same.

Slurry Casting of Enhanced Secondary High Explosives

The enhanced secondary high explosive can also be made via slurry casting. Here, a dispersion is created by placing either $nMx_{19}$ or $nMx_{20}$, a secondary high explosive, and a binder into a solvent bath. The solvent of the present invention may include, without limitation, ethyl ether, trichloroethane, trichlorofloromethane, benzene, toluene, xylene, naphthalene, THF, or any combinations thereof.

The dispersion is gently mixed for a time and solvent evaporated, where the resulting dry composite has all ingredients from the original dispersion. The dried composite may optionally be subjected to the same molding or casting process as described above for pellet pressing the same or used as is for explosive applications.

FIG. 27a and FIG. 27b display a relative comparison of shockwave velocities of secondary high explosive PETN with and without $nMx_{20}$ [standard]. This data is generated from roughly 3 g pellets for each of the enhanced and standard explosive. Each pellet is initiated with RP-2 detonators in a Tunnel for High-speed Optical Research (THOR). The testing in THOR includes at least two pellets of each mixture ratio and the pure explosive material. The shock wave tests include Schlieren or shadowgraph high-speed imaging to record shock wave motion and determine shock speed for each pellet.

Schlieren photography is a technique well known in the arts to capture images of showing the flow of fluids via the changes in the air that experiences the same. Pressure gages in THOR will record time-resolved pressure and provide a secondary measurement of shock wave speed. The Schlieren imaging equipment was set at 80K Frames/sec for each of FIGS. 27a and 27b. FIG. 27a [right] displays shockwave propagation through an enhanced admixture of $nMx_{20}$ and the explosive PETN. FIG. 27b [left] displays a shockwave propagating only through explosive PETN. The enhanced explosive of FIG. 27a gives an increased shock velocity relative to the PETN of FIG. 27b.

Additional Methods for Making the nMx Enhanced Explosive

It is an embodiment of the present invention for the enhanced secondary explosive to be manufactured via 3D printing. Any of the above ingredients, primarily $nMx_{12}$ 20, and the secondary high explosive, may be associated with UV curable photopolymers such as, without limitation, acrylates, monomers, oligomers, bismaleimides, thermosetting epoxies, urethanes, polyesters, silicones, and their combinations and blends.

A typical method for making a UV curable enhanced secondary explosive with nMx includes admixing the nanocomposite and the explosive, as detailed above in either the pellet pressing or the slurry casting methods, with a photopolymer resin in its near liquid or fluid state for use in stereolithography (SLA) or Digital Light Processing (DLP) technology. SLA uses a laser to trace out the cross-sections of the model, being 3D print instructions for a construct. Each layer is deposited in a continuous stream of a base UV curable resin. The laser essentially "draws" the layer to be cured at UV frequencies. With DLP, a UV projector sits beneath a photopolymer reservoir and selects image layer for which to cure, which is ideal for 2D imaging.

Additive manufacturing of the enhanced secondary high explosive may include, without limitation, the nMx enhanced explosive being added to a liquid photopolymer resin and agitated from about 0.5 hours to about 24 hours at room temperature with a magnetic stirrer to ensure uniform distribution of the enhanced explosive throughout the photopolymer's volume. The mixture may then be loaded into an SLA 3D printer. Under UV light, the photopolymer may solidify through a photopolymerization reaction to form the desired 3D object defined by computer instructions creating a construct that has a structure and weight having the nMx enhanced explosive within the UV cured matrix.

The UV cured materials, having the nMx enhanced explosive, are suited for making parts integral to bomb casings. Bomb casings are frequently made of metal or metal-alloy complexes, plastics (thermoplastic or thermoset), UV-curable materials, and adhesive resins (single or multi-ingredient). These casings react as they are projected away from the reaction epicenter, releasing their energy at a certain radius or stimuli away from the epicenter. One such method would involve mixing nMx within a workable material (plastic or resin) prior to allowing the material to set or cure. The material casing would then harden with energy-laden nMx encased within. A detonation, shock wave, or combustion front would then release the energy in application from the bomb casing.

Another method for making an nMx enhanced explosive includes ResonantAcoustic® Mixing. Low frequency, high-intensity, acoustic energy is used to create a uniform shear field throughout the entire mixing vessel. The result is rapid fluidization (like a fluidized bed) and dispersion of material. ResonantAcoustic® Mixing introduces acoustic energy into liquids, slurries, powders and pastes. An oscillating mechanical driver creates motion in a mechanical system comprised of engineered plates, eccentric weights, and springs. This energy is then acoustically transferred to the material to be mixed. The underlying technology principle is that the system operates at resonance. In this mode, there is a nearly complete exchange of energy between the mass elements and the spring elements in the mechanical system that would ensure a truly uniformed mix for the nMx and the secondary high explosive.

nMx as a Cast or 3D printed Solid Fuel Grain

It is an embodiment of the present invention to include nMx into solid propellant formulations, i.e. solid fuel grains for solid rocket motors (SRMs), hybrid rocket motors (HRMs), or solid fuel missiles. More specifically, solid formulations for SRM fuel grains may include without limitation: at least one nMx nanocomposite, as detailed above, being pressed, cast, or 3D printed with a powdered oxidizer, a polymeric binder or thermoplastic matrix, a plasticizer, a metal fuel, a curing agent, a cure catalyst, ballistic catalysts, burn rate catalysts or modifiers, or an oil or wax into a composite shape and placed into a motor.

HRM fuel grains may include without limitation: at least one nMx nanocomposite, as detailed above, being pressed, cast, or 3D printed with a polymeric binder or thermoplastic matrix, a plasticizer, a metal fuel, a curing agent, a cure catalyst, ballistic catalysts, burn rate catalysts or modifiers, or an oil or wax into a composite shape and placed into a motor, where the fuel grain is housed within or near the combustion chamber or motor casing of an HRM. A gaseous oxidizer is stored separately from the solid fuel grain. The oxidizing gas is injected over certain port surfaces of the fuel grain to start oxidation and combustion of the same. Hot gases form about the surfaces of the fuel gain and are expelled through a nozzle to create thrust.

Solid propellants power many missiles and rockets for military, commercial, and space applications. Solid grains for either an SRM or HRM should combust and release heat energy at a slower rate than explosives. nMx is an ideal material for a fuel grain as it burns quickly while producing viable heat and a rapid gas release, less the effect of a true explosion.

The design and functionality of a rocket motor depends on the fuel grain's burn rate when balanced against the weight, size, and shape of the fuel grain, the size and shape of the combustion chamber, nozzle characteristics, and evolving chamber pressure to ensure that an engine achieves the necessary thrust for propulsion while being more efficient at gaining altitude, distance, and velocity. Methods to improve the burn rate of a solid fuel grain includes adding burn rate modifiers to a formulation, changing the texture of the fuel grain surfaces, altering the central port configuration or the fuel grain design, or modifying the fuel grain with various other additives.

The burn rate reflects consumption of a fuel grain relative to its burning surface area perpendicular to the flame front within a combustion chamber. The linear burn rate of a material may be defined by the following equation:

$$r=[a]P_c^n,$$

where r=linear burning rate (in/sec), a=burn rate coefficient (in/sec), $P_c$=chamber pressure (psi), and n=pressure exponent (dimensionless). The burn rate is heavily affected by the chamber pressure and temperature about the fuel grain's surface. A solid propellant benefits from having a fast-linear burn rate. Rapid burning changes the mass of the object experiencing the thrust and forms combustion products that quickly push the object in the opposite direction. Due to nMx's unique burn profile having a low temperature ignition from about 180° C. to about 210° C. for $Li_3AlH_6$ nanoparticles, a combustion event for the nanoscale organic layer at about 300° C., and the elemental Al nanoparticle combustion at about 600° C., we believe that nMx may be tuned to produce a corresponding change in either the burn rate coefficient [a] and/or pressure exponent [n].

Increased pressure within the combustion chamber is a direct result of the propellants burn rate, where the flame front is perpendicular to the propellant's surface. The formation of product gases is equal to the propellant's burn rate by the mass flow rate equation:

$$\dot{m}_g=A_b\rho_p r,$$

where $A_b$ is the area of the solid propellant, $\rho_p$ is propellant density, and r is the burn rate. It is these gases, $\dot{m}_g$, that contribute to the pressure development and the resultant thrust.

Another important measure related to the propellant's burn rate is specific impulse, as defined by equation:

$$F=\Delta m/\Delta t * \Delta v.$$

The specific impulse is a measure of efficiency for combustion engines derived from Newton's second law of motion. It is a relationship between the amount of thrust produced relative to the rate in which the propellant mass changes via the creation and expulsion rate of combustion gases. Because fuel expels hot gases at a mass flow rate of $\Delta m/\Delta t$, F is the thrust on an object, which renders a change in velocity, $\Delta v$, of the rocket. The force, being specific impulse or thrust, can be interpreted as $F\Delta t$ as normalized by mass.

A higher specific impulse, typically around 250 seconds or so for larger SRM and HRM motors, uses the propellant's decreasing mass to create better thrust, where one would want a tradeoff between a less heavy propellant or the use of less fuel for improving Av. Therefore, there is a need for the present invention, nMx, as a fuel additive having a large energy density due to nanoscale effects, that improves the efficiency of solid propellants for SRMs or HRMs.

Casting an nMx Solid Fuel Grain

The inclusion of nMx in fuel grains gives comparable burn rates, increased energy density, reduced HCl emissions, an overall increase in fuel efficiency (thrust/mass flux), and exhibits a decrease in ignition temperature by circumventing the combustion inefficiency of traditional metal-oxide (e.g. alumina-coated) fuel additives. It is ideal for solid fuel grains to have a high specific impulse, where a fuel/oxidizer burns fast and expels a lot of energy in a short amount of time.

The ability to add nMx to fuel grains is due to the nanoparticles being air stable but still retaining their high energy densities and reactivity. Stated simply, being air stable makes nMx safe to handle in air long enough to press, cast, or 3D print a solid fuel formulation while retaining the nanoparticle's high energy densities. The fuel grain may either be a hybrid fuel grain, where the solid fuel is made to meet a flow of a gaseous oxidizer, or a solid fuel grain, where the fuel and the oxidizer are pressed, cast, or 3D printed into a shape within a common composite.

One embodiment of the present invention includes the fuel grain being formulated and mixed via methods known in the art for casting solid fuel grains, save for the novel addition of at least one nMx nanocomposite as listed above. A non-limiting example for making a solid fuel grain for an SRM may include placing a thermosetting binder, plasticizer, optional burn rate catalyst, and at least one nMx composite into a mixer to blend. Note that the thermosetting binder in raw form is a liquid prepolymer or monomer, and, as such, needs the addition of a curing agent to hold the fixed shape.

A high shear mixer, or an extruder, or alternatively a simple press may be used to mix the formulation. After which an inorganic oxidizer is added incrementally into the active mixer until uniformity is achieved. The curing agents, cross-linking agents, or other additives may be added now and thoroughly blended with the mix before casting into a suitable mold or rocket motor for an SRM. If desired, the mixing and casting of the fuel grain may be performed under vacuum to avoid air entrapment leading to voids in the enhanced propellant.

Depending on the selected binder, the temperature of the mix may be maintained from about 80° F. to about 175° F. to maintain a satisfactory viscosity during mixing and casting procedures, but the temperature should be sufficiently low as not to ignite the nMx additive or damage the integrity of the thermosetting binder. This procedure may be followed to create an HRM fuel grain less the addition of the inorganic oxidizer. An HRM has the oxidizer in gaseous form and is held in a separate tank to flow over the port surfaces of the solid grain to start oxidation and combustion of the same.

The semi-fluid formulation may be cast into a motor casing. A cylindrical type casing can be made prior to casting. It is an embodiment of the present invention where the fuel grain may be cast, molded, extruded, or in some instances machined into a cylindrically shape having a center port that is star shaped, a circular shaped, Maltese cross shaped, clover shaped, helix shaped, double anchor, rod in tube, and the like, so long as there is an outer cylindrical body having two distal ends and a hollow inner cavity, or port, with a shape that is designed to maximize the burn rate characteristics of an SRM or HRM solid fuel grain. It is known within the art that the quality of a finished solid fuel grain depends on the exclusion of entrapped air and upon the absence of cracks in the fuel grain's surface. We take into consideration that there is no extra surface area about the fuel grain to permit air pockets that would crack the solid fuel grain during combustion.

More specifically, it is an embodiment of the present invention for creating a solid fuel grain wherein nMx, is lightly ground into a fine powder with a mortar and pestle and sieved to size for enhanced surface area and uniformity within the solid propellant. A powdered oxidizer, nonlimiting examples being bimodal ammonium perchlorate (200 & 90 micron) or potassium perchlorate, is prepared by holding under vacuum for 48 hours to dry, or alternatively, the oxidizer is omitted and will be introduced during combustion as a gas for use in an HRM. Note that Woodson et al. cast a fuel grain made from $Li_3AlH_6$ and poly-DCPD (romp polymer) that exhibited some amount of burning [26].

143L MDI curing agent is then added to the bowl and the mixture can stir and cure for up to 45 minutes. Based on the reactivity of nMx with HTPB, it was found that allowing the propellant mixture to cure prior to addition of the nMx results in attenuated reactivity between species and subsequent grain growth. It is noted that if solid ingredients are added too late, an inhomogeneous mixture is created and a propellant grain with voids and delaminations is produced.

The fuel, 32-micron aluminum, is added followed by bimodal ammonium perchlorate (200 & 90 micron in a ratio of 2:1 by mass). Before addition to the mixture, ammonium perchlorate, is dried under vacuum for about 48 hours. nMx powder is then taken from an inert environment and added immediately after the oxidizer, where nMx is included in the cast from about 0.05% to about 50%, a binder being cast with a mass from about 1% to about 20%, and a solid oxidizer being cast with a mass from about 50% to about 80%.

After mixing the ingredients for 5 minutes, the formulation is held under vacuum for 5 minutes to remove voids and improve fuel grain density. Grains are then cast and packed into motors, and the motors are held under compression with a center-perf mandrel to maximize density and minimize growth. Curing and finished fuel grains are held under inert atmosphere prior to firing. The mandrel is removed. or if 110 mandrel is used during casting, a lathe is used to bore out the center of the fuel grains, and grains are weighed to allow for performance analysis post-firing.

Additional ingredients for making a solid fuel grain may include, without limitation, optional catalysts and additional plasticizers or modifiers. nMx particles are defined above. The binding agent may be, without limitation, a thermosetting polymer such as hydroxyl-terminated polybutadiene, or a thermoplastic polymer. The oxidizer may be, without limitation, bimodal ammonium perchlorate (AP), ammonium nitrate, ammonium dinitramide, and the like.

An example formulation for a cast of a 4% nMx fuel grain is given in Table 9.

TABLE 9

A non-limiting example for a cast solid fuel grain having 4% nMx as a burn rate enhancer for an SRM.

| Ingredient | % Addition |
| --- | --- |
| AP—powdered oxidizer | 78.0% |
| LV HTPB—rubber binder | 9.0% |
| IDP—plasticizer | 1.0% |
| Al 32 um—fuel | 4.0% |
| 143L—liquid curative | 3.0% |
| nMx—nanocomposite additive | 4.0% |
| Castor Oil—density and strength improvement | 1.0% |

To achieve a solid fuel grain for a hybrid engine, where reactants are in different physical states, usually a solid fuel is made to meet a gaseous oxidizer. At least two burning ingredients are cast into a single mold, a non-limiting example being nMx being cast with a mass from about 0.05% to about 50%, a binding agent being cast with a mass from about 1% to about 50%. A gaseous oxidizer flows through an intake opening into and over the nMx containing solid fuel and releases through a nozzle as exhaust. The nMx solid fuel is ignited by an igniter positioned proximal to where the oxidizing gas first contacts the fuel near the intake. In one embodiment of a solid fuel chamber for a hybrid engine, the solid nMx fuel bodies generally have a center elongated flow channel through which the oxidizer flows after ignition for ablating the fuel on the side walls of said channel.

Ingredients for a Cast or 3D Printed nMx Fuel Grain

What follows are the ingredients used to press, cast, or 3D print nMx into a solid fuel gain to use in a SRM or HRM system.

The solid fuel grain of the present invention is associated with at least one variation of nMx as outlined above. nMx is a singular material that is air stable and is a nanocomposite of $Li_3AlH_6$ nanoparticles, elemental Al nanoparticles, an amount of Ti metal, and a nanoscale organic layer. nMx protects and preserves the high energy densities of the core metals isolated from a controlled bottom up reaction and makes the nanoparticles safe to handle in air. nMx is lightly ground into a fine powder and sieved to size for enhanced surface area and uniformity within the solid propellant. nMx may be pressed, cast, or 3D printed within a solid fuel grain with a mass from about 0.05% to about 50% along with a thermoset polymer or a thermoplastic polymer being pressed, cast, or 3D printed with a mass from about 1% to about 50%.

The binder of the present invention gives structural integrity to the fuel grain and may either be a thermosetting or thermoplastic polymer. Thermoset polymers in their liquid polymer forms must be cured by cross-linking molecules to harden the material into shapes. Once cured the thermoset polymer cannot be remelted or reprocessed for any other uses. Because of their sensitivity to high temperatures, thermoset polymers are not well suited for 3D printing applications. Thermoset polymers do not melt when heated but instead char and ablate. Thermoset polymers must be used from their liquid forms, degassed, and then cast and cured. As such, traditional casting methods known in the art are best for shaping the final fuel grain having at least one nMx composite, a thermoset polymer as a binder, and optionally an oxidizer, curing agents, and other additives.

The thermoset polymer acts as a binder and is typically an elastomeric hydrocarbon polymer formed by the chain extension and cross-linking of functionally terminated liquid polybutadiene polymers. These binders may include without limitation: glycidyl azide polymer (GAP), BAMO, NMMO, HTPB, Low Viscosity HTPB (hydroxyl-terminated polybutadiene/LV HTPB), polyurethane or polybutadienes (($C_4H_6)_n$), polybutadiene-acrylic acid (PBAA), polybutadiene-acrylic acid terpolymer, polybutadiene-acrylic acid acrylonitrile (PBAN) carboxyl terminated polybutadiene (CTPB), elastomeric polyesters, polyethers, polymerized epoxy resins, or any combination thereof. The binder may be polymerized during rocket motor manufacture and is typically consumed as part of the fuel during burning, which also contributes to overall specific impulse of the system.

The thermoplastic polymer of the present invention is suitable as a base polymer for 3D printing applications. Instead of a binder, indicating the use of cross-linking agents, the thermoplastic acts as a matrix for the nMx composite and other additives. A thermoplastic polymer becomes soft and pliable when heated. It does not cure. There is no need for cross-linking or curing agents. Once the thermoplastic hardens into the shape as supplied by the 3D print instructions, the thermoplastic cools and hardens into that shape.

Thermoplastic polymers of the present invention are compatible with any commercial 3D printer and may include without limitation: polypropylene, PP Homopolymer (HPPP), PP Copolymer (CPPP), Polylactic Acid (PLA), acrylonitrile-butadiene-styrene (ABS), High Impact Polystyrene (HIPS), Thermoplastic Elastomer (TPE), Ethylene Vinyl Acetate (EVA), PolyAmide (PA), PE Low Density (LDPE/LLDPE), PE High Density (HDPE), Thermoplastic Elastomer, Polyphenylene Sulphide, thermoplastic polyurethane or polybutadienes (($C_4H_6)_n$), polybutadiene-acrylic acid terpolymer, styrene block-copolymers, thermoplastic silicone elastomer, aliphatic or semi-aromatic polyamides, thermoplastic vulcanisate, polyvinyl alcohol, polycarbonate, polylactic acid, polymethylmethacrylate, polyethylene, polystyrene, nylon, polycarbonate, polyvinyl chloride, Teflon, or any combinations thereof. Acrylonitrile-Butadiene-Styrene polymer (ABS), as provided by (Filabot Inc), has a print temperature of about 200° C.-230° C. and an extrusion temperature of 175° C.-190° C. The specific gravity is 1.04, and the ABS pellets are typically molding grade.

Polymeric binders of the present invention may also include products derived from ring-opening metathesis polymerization ("ROMP") reactions. Metal complexes, such as ruthenium or osmium-based complexes, are used in catalytic amounts to initiate polymerization in monomers with cycloolefins such as dicyclopentadiene ("DCPD") to produce a well-structured polymeric matrix capable of binding solid rocket propellant ingredients and our nanocomposite material. The resulting polymer, non-limiting examples being poly-dicyclopentadiene ("pDCPD"), poly-norbornene, poly-norbornadiene, poly-dicyclopentadiene, poly-cyclopentene, poly-cycloheptene, poly-cyclooctene, poly-cyclooctadiene, poly-cyclododecene, poly-7-oxanorbornene, poly-7-oxanorbornadiene, or any combination thereof, provides an inert environment to compound fuel grains in addition to strong mechanical properties and combustion characteristics. We hereby incorporate by reference US Pat. Pub. No. 20030164215 as filed by Woodson et al. as it pertains to using ROMP systems as binders for metal hydrides used as an energy source for a fuel grain for solid or hybrid rocket motors. However, these systems lack anticipation as it concerns the nMx nanocomposites of the present invention. It is also an embodiment of the present invention where the ROMP binders may also include optional additives.

The solid fuel grain of the present invention is associated with a powdered oxidizer, where the oxidizer may include without limitation, ammonium perchlorate ($NH_4ClO_3$) powder, metal perchlorates, ammonium nitrate and ammonium dinitramide ($NH_4N(NO_2)_2$) or for an HRM the oxidizers are in their gaseous form.

The plasticizer of the present invention reduces viscosity of the fuel grain. Plasticizers may include without limitation dioctyl sebacate, dioctyl adipate ("DOA"), isodecyl perlargonate (IDP), dioctyl phthalate ("DOP"), or mixtures thereof.

The fuel of the present invention may include without limitation powders of the following metals or alloys: micron aluminum (Al 32 μm or 44 μm), beryllium, zirconium, titanium, boron, magnesium, or alloys and combinations thereof. The fuels are preferably pure metals, where the powders have a maximum dimension of 500 μm or less. However, nanometer powders with dimensions from 25 nm up to 500 nm may also be used. The metal fuel can have various shapes, including but not limited to spherical, flake, irregular, cylindrical, or any combinations thereof.

The present invention includes a curing agent to cure or crosslink the thermoset polymer. The curing agent may include without limitation Modified diisocyanate (143L), polyurethane hexamethylene diisocyanate ("HMDI"), isophorone diisocyanate ("IPDI"), toluene diisocyanate ("TDI"), trimethylxylene diisocyanate ("TMDI"), dimeryl diisocyanate ("DDI"), diphenylmethane diisocyanate ("MDI"), naphthalene diisocyanate ("NDI"), dianisidine diisocyanate ("DADI"), phenylene diisocyanate ("PDI"), xylene diisocyanate ("MXDI"), ethylenediisocyanate ("HDI"), other diisocyanates, triisocyanates, polyfunctional isocyanates, or any combinations thereof.

The fuel grain's bonding agent includes a viscous material that adheres the propellant grain and improves the density thereof and may include without limitation: coconut oil, palm oil, cottonseed oil, vegetable oil, soybean oil, olive oil, peanut oil, corn oil, sunflower oil, safflower oil, jojoba oil, canola oil, shea butter, cocoa butter, milk fat, amaranth oil, apricot oil, argan oil, avocado oil, babassu oil, ben oil, algaroba oil, coriander seed oil, false flax oil, grape seed oil, hemp oil, kapok seed oil, meadowfoam seed oil, okra seed oil, perilla seed oil, tepanol, poppyseed oil, prune kernel oil, pumpkin seed oil, quinoa oil, ramtil oil, rice bran oil, camellia oil, thistle oil, wheat germ oil, poly amines (HX-752), beeswax, chinese wax, lanolin, shellac wax, bayberry wax, candelilla wax, carnauba wax, castor wax, esparto wax, japan wax, ouricury wax, rice bran wax, soy wax, tallow tree wax, ceresin wax, montan wax, ozocerite, peat wax, petroleum wax, paraffin wax, microcrystalline wax, or any combination thereof.

The above examples for making either a solid or hybrid fuel grain having nMx as an ingredient lies in the nanocomposite's unique burn rate characteristics. The burn rate of a material may be thought of as the distance traveled per second by a flame perpendicularly exposed to a surface of a material. The burn rate for a material is dependent upon the pressure of the surrounding gas phase within a container. For a solid rocket motor to achieve the greatest thrust possible, it must burn a large amount of fuel/oxidizer in a short amount of time, while expelling combustion gases out of a nozzle, where our data seems to indicate that nMx nanocomposite materials are well suited for this event.

3D Printing nMx Fuel Grains

It is an embodiment of the present invention where at least one nMx composite is embedded in a bulk thermoplastic matrix, being a base material or feed stock for 3D printing solid fuel grains. The base material is compatible for 3D Printing, extrusion moulding, and injection moulding, where any of these processes shape, layer, or print the base material into a final construct that is endowed with nMx's unique burn characteristics. In addition to solid fuel grains, the base material may be used to print via a 3D printer an explosive, a photonic, a plasmonic, and the like.

3D Printing technology is used with applications in architecture, industrial design, automotive, aerospace, military, civil engineering, medical industries, biotech, and many other fields. Selective Laser Sintering (SLV), Fused Deposition Modeling (FDM)™, the various forms of Stereolithography, and Continuous Liquid Interface Production are all forms of 3D Printing that include a computer associated with a 3D printer scanning a file format exported from a 3D modeling program that contains the spatial points for creating the fuel grain.

With the present invention, an nMx composite may either be introduced into a thermoplastic polymer either in a solvent based reaction or during the hot melt delivery of the thermoplastic to a printing platform during the layering process as executed by a 3D printer. Either process creates a base material that has energetic properties suitable as a solid fuel grain for combustion applications.

It is an embodiment of the present invention where the nMx base material is compatible with a 3D printer capable of fuse deposition modeling (FDM) to make solid fuel grains for an solid rocket motor (SRM) or hybrid rocket motor (HRM) system. Although the disclosed method uses FDM, the base material should be compatible with 3D printers that employ Selective Laser Sintering (SLV), Stereolithography, Continuous Liquid Interface Production, powder bed printing, and/or Inkjet Head printing. The solid fuel grain may be layered via other methods known within the arts, including but not limited to, extrusion deposition, binding of granular materials, lamination, or photo polymerization. The polymer material can be virtually any thermoplastic elastomer with sufficient fatigue resistance.

These materials may include without limitation: a powdered oxidizer, a thermoplastic polymer, a plasticizer, a metal fuel, a curing agent, a cure catalyst, ballistic catalysts, burn rate catalysts or modifiers, or an oil or wax. These optional ingredients may be added with nMx in a dry powder form before combining the nanocomposite with the thermoplastic polymer in the hot melt process at a 3D printer, or, alternatively, the thermoplastic polymer may be softened in a separate process, by methods known within the art, and the optional ingredients added to the same before being heated and layered by a 3D printer.

Burning and Test Firing of nMx Fuel Grain nMx may be incorporated into a hybrid or solid fuel grain for performance increase delivered by the nanoparticles. We can mix $nMx_{20}$, or any iteration thereof, into solid rocket formulations for testing purposes and eventual applications in rocket and missile motors. Fuel grains were made according to any of the methods listed above for an SRM. However, these methods can also be made for HRMs less the oxidizer in the cast. Each of the four testing grains contained 8% being a combination of 4%-micron aluminum powder and 4% $nMx_{20}$. The rest of the solid fuel grain contained the following constituents: 78% bimodal ammonium perchlorate [oxidizer]; 9% low viscosity HTPB [binder]; 1% IDP [plasticizer]; 3% 143L [curative]; 1% castor oil [bonding agent].

A firing test for an nMx fuel grain in an SRM and the data collection method are as follows: a motor diameter of 38 mm, a solid fuel grain being multiple-segment, where each segment is a hollow cylindrical grain that is case bonded. The initial burning surface areas are at the port core and segment ends, and the cylinder cast is inhibited to burning from outside to inside. The port is drilled directly though the center of the grain at 7/16". The nozzle size is about 0.291" at throat and about 0.688" at the exit. The fuel grain has dimensions of 38 mm diameter (1.5")×3.6" length grains. A 100 kg S-type load cell, as purchased from RobotShop, is used to measure the SRM thrust. A 9milelake 1600 psi stainless steel pressure sensor is used to collect pressure data. The fuel grain is ignited within the SRM casing via an electronic match igniter (Wildman Rocketry), as dipped in Pyromag pyrogen by Firefox Enterprises, LLC and set off with a 12V battery. The chamber pressure is ambient until ignition and formation of hot gasses. Due to the complexity of nMx's burn profile in relation to the primary fuel for the propellant, the burn rate is to be determined.

Our SRM test gives Isp data (seconds) as reported below in Table 10, where thrust is in Newtons and derived from the force/mass flux relationship as mentioned above. Four firings, SRMs a-d, are recorded at room temperature under ambient pressure before firing. The HTPB pre-polymer is a viscous liquid until the curative is added. No temperature changes were applied through the entire process.

TABLE 10

Isp (s) calculations for $nMx_{12}$ and $nMx_{20}$

| SRM | Formulation Fuels | Isp (s) |
|---|---|---|
| a | Al [8%] | 188 |
| b | Al [4%] + $nMx_{12}$ [4%] | 186 |
| c | Al [4%] + $nMx_{20}$ [4%] | 192 |
| d | Al [4%] + $nMx_{20}$ [4%] | 190 |

The nMx enhanced fuel grains show a greater contribution to performance relative to 8% Al micron powders. However, $nMx_{12}$ gives a slightly lower Isp number due to the possibility of having less O atom in the nanoscale organic layer. Energy densities are maintained, allowing $nMx_{20}$ to increase specific impulse by ~2-4 seconds when compared to the baseline firings of 8% micron aluminum. If the estimated delivered energy density of aluminum is taken as 20 kJ/g, and the theoretical energy density of $nMx_{20}$ is ~30 kJ/g, an energetic increase of 50% in 4% of the formulation would lead to a rough performance increase of 2%, which is indicated by the data. To utilize more nMx's energy density, especially $nMx_{12}$, larger motors should be used to achieve complete combustion and full effect.

Since some delamination was seen with higher percentages of nMx (failure at 8%), more binder may be used to provide better structural integrity. Alternate bonding agents and binders are also being explored to allow higher incorporation of nMx without strong chemical incompatibility.

Another important testing avenue is to determine the performance improvement of nMx cores with reduced organic cap. With reduced cap, the kinetics and combustion ability of the material will be improved, and the density will improve slightly. Also, new handling procedures under inert atmosphere make stronger the viability of processing the reduced organic material into usable, high energy fuel grains.

Approximately 3 grams of commercial aluminum powder and nMx powder is weighed and placed on a flat metal surface. Each powder is spread in an even line measuring 150 mm, measured with calipers. A video recording is started, and a propane torch is used to light one end of each line of powder. After combustion is complete, the video is digitally analyzed to determine linear burn rate in length per time.

Table 11 presents linear burn rates taken at atmospheric pressure for pure nMx powders and Novacentrix 80 nm commercial grade aluminum powder in mm/sec. This data indicates that nMx displays an extremely high linear burn rate as compared to the state of the art, being Novacentrix 80 nm aluminum powder. Note that, $nMx_{12}$ HC [High Core] and $nMx_{20}$ HC [High Core] designate a balance between the nanoscale organic layer and the core metal nanoparticles of ⅓ and ⅔ by weight respectively. Reducing a portion of the nanoscale organic layer allows the combustion reaction to access the cores quicker for faster burn rates. This ambient burn shows that the nMx HC powders display significantly better burn rates against the standard aluminum powders. It is an embodiment of the present invention to tune the fraction of the nanoscale organic layer about the surfaces of both core metal nanoparticles to be about 25% to about 75% by weight to modify the burn rate characteristics of an nMx composite.

TABLE 11

Linear burn rates in atmospheric pressure for pure nMx powders and commercial comparison powders.

| Burning Material | Burn Rate (mm/sec) |
|---|---|
| Novacentrix 80 nm Aluminum Powder | 5 |
| $nMx_{12}$ | 4 |
| $nMx_{16}$ | 6 |
| $nMx_{20}$ | 110 |
| $nMx_{12}$ HC | 14 |
| $nMx_{20}$ HC | 100 |

What follows are two non-limiting examples of introducing the nMx composite into a thermoplastic polymer. One example is via a solvent based reaction that influence the state of the thermoplastic polymer and the other is via heat as supplied by elements of a 3D printing machine using the FDM technique. However, these examples are not a limitation of the scope of the invention but are present only as examples.

Solvent Reaction for an nMx (20% m/m) Base Material for 3D Printing nMx in an ABS polymer has been produced. The formulation consists of 20% m/m nMx in 80% m/m ABS. A non-limiting example of the reaction is as follows. Once the nMx particles are synthesized and acquired as above, a Schlenk line connected to a vacuum and an Argon gas line is used to produce an Acrylonitrile-Butadiene-Styrene (ABS) polymer embedded with nMx powder. However, the use of this polymer is non-limiting and may be replaced by any suitable polymer to form an nMx based matrices. The nMx powder is defined as a nanocomposite being $Li_3AlH_6$ nanoparticles, elemental Al nanoparticles, an amount of Ti metal, and a nanoscale organic layer.

A vacuum trap is connected to the Schlenk line to trap any solvent removed from the reaction mixture dispersion. The Schlenk line is connected to two bubblers on either side to indicate Argon gas flow in and out of the Schlenk line. A needle valve is used to control the flow of Argon gas within the apparatus, and the Ar gas is provided by a compressed tank installed with a regulator. Vacuum hoses connected to all the ports on the Schlenk line and the connections within the general setup. To contain any dispersions and reaction mixtures, air-free glass flasks are used. These flasks contain a stopcock valve to expose its contents to either vacuum or Argon gas. Luer lock syringes are used to transfer and mix any dispersions.

4 g of ABS is dissolved in ~30 mL of distilled THF within an air-free flask. A magnetic stirrer is included, and the stirring is used to agitate and dissolve the ABS. Eventually, the ABS is fully dissolved in ~30 minutes. In another air-free flask, 1 g of the organic polymer capped nMx powder is dissolved in 60 mL of distilled THF for the 20% nMx formulation. The organic polymer capped nMx powder is not very dispersible, but agitation is able to suspend the powder. A stirrer is included into the flask to stir and agitate the suspension.

With a Luer lock syringe, the ABS solution is drawn and injected into the organic polymer capped nMx dispersion while stirring. The combined dispersion of ABS and organic polymer capped nMx powder is left to stir for ~30 minutes. Then, it was vacuumed at room temperature to remove the THF solvent. Stirring is still present while vacuuming to agitate and improve the efficiency of the removal. After the solvent is removed, a plastic sheet or film of ABS with embedded organic polymer capped nMx is produced. It is a dark black or gray sheet that sticks to the glass. It can be removed with a spatula. The nMx powder is uniformly distributed in the thermoplastic, where ratios for the resulting composition of matter $[Li_3AlH_6:Al:Ti:NSOL]:ABS$ exist from about 3:1 to about 1:100.

The resulting mixture of the nanocomposite and the ABS thermoplastic polymer is a base material that is suitable for 3D printing a fuel grain for either an SRM or HRM. The base material may be ground into powder particles that may be sintered or melted to form via Selective Laser Sintering (SLS®) until the solid fuel grain is constructed. Alternatively, the base material may be layered when melted beads of the thermoplastic polymer meet nMx powder in a dual heated nozzle configuration for Fused Deposition Modeling. Alternatively, the base material maybe formed as a bead containing nMx, the thermoplastic polymer, and other additives and then used as base polymer or feed stock for a 3D printer for printing a fuel grain construct.

It is an embodiment of the present invention where the base materials shape and method of combining the nMx nanocomposite and the thermoplastic polymer may be altered to ensure compatibility with any of stereolithography, laminated object manufacturing, ink jet head printing, or other photopolymer based 3D printers without departing from the spirit of the invention and any changes that are contemplated by one of ordinary skill in the art to make the base material compatible with these 3D printing processes are captured by this specification.

Fuse Deposition Modeling of an nMx Fuel Grain

It is an embodiment of the present invention where the ingredients for a base material used to 3D print a solid fuel grain for either a SRM or HRM may be combined at or near the nozzle of a 3D printer during the hot melt process before the base material is layered by the same. All forms of 3D Printers include a computer having a 3D modeling program that contains the spatial points for creating a construct. A user exports digital instructions for a fuel grain shape from the 3D modeling program to a computer located at the 3D printer. The digital instructions are spatial points that create a 3D template for layering the fuel grain in the real world. Layering is done from the bottom surface up. 3D printer file formats include, hut are not limited to, .stl (standard triangular language), .obj, PLY, or the like.

The computer of the present invention includes one or more devices having one or more processors capable of communicating with the other components of the system. The computer typically receives many inputs and outputs for communicating information externally to a 3D printing system. Non-limiting examples of inputs and outputs may include: a keyboard, a mouse, a trackball, a joystick, a touchpad, and/or a microphone, a CRT monitor, and/or an LCD display panel.

Communication may either be a wireless frequency signal or a direct wired communication signal that sends instructions to a 3D printer for printing an nMx fuel grain. The processor can execute computer programs, e.g. 3D modeling programs with instructions for printing an nMx fuel grain stored in a computer-readable medium or memory such as a random-access memory ("RAM"), read only memory ("ROM"), and/or a removable storage device. The computer should have a basic operating system, such as MS Windows, Linux, Mac OS, or the like. The fuel grain instructions may comprise code from any computer-programming language, including, C, C++, Visual Basic, Java, Python, Perl, and JavaScript.

Suitable processors may comprise a microprocessor, an ASIC, and state machine. Example processors can be those provided by Intel Corporation, AMD Corporation, and Motorola Corporation. Such processors comprise, or may be in communication with media, for example computer-readable media, which stores instructions that, when executed by the processor, cause the processor to perform the elements described herein.

Within a 3D modeling program, points and line segments in a Cartesian plane, e.g. an [x, y, z,] Cartesian system, are used as predetermined spatial instructions or can be drawn free hand to create virtually solid models of the solid fuel grain having nMx. The construct will have weight, density, and a center of gravity in either case. The fuel gain in its final form will be tangible and can be readily used in combustion process for a SRM or hybrid rocket motor HRM systems.

The digital instructions for making a fuel grain can be stored in memory or the processor. The computer program for creating the fuel grain are of the type typically used for rapid prototyping or manufacturing instructions, including but not limited to: 3DMLW (3D Markup Language for Web), Dassault Systemes graphic representation, Virtual Architecture CAD, Ashlar-Vellum Argon-3D Modeling, Art-CAM model, BRL-CAD Geometry, Solidedge Assembly, Pro/ENGINEER Assembly, Data Design System DDS-CAD, CopyCAD Curves, CopyCAD Model, CopyCAD Session, CadStd, CATIA V5 Drawing document, CATIA V5 Part document, CATIA V5 Assembly document, CATIA V5 Manufacturing document, AutoCAD and Open Design Alliance applications, Solidedge Draft, MicroStation design file, Delcam Geometry, Delcam Machining Triangles, ASCII Drawing Interchange file format-AutoCAD, VariCAD drawing file, Wilcom-Wilcom ES Designer Embroidery, Agtek format, EXCELLON, FeatureCAM, FormZ, BRL-CAD, GERBER, T-FLEX CAD, GRAITEC, Auto CAD, Solidworks, Autodesk Inventor, Fusion 3D, Rhino 3D, Alias, Pro-Engineer Sketchup, and the like.

Any generic program should be capable of sweeping, extruding, revolving, lofting, slicing, sculpting of a surface, or converting connected points forming 2D parametric contours and straight lines into any imaginable 3D shape. Fused Deposition Modeling (FDM)™ includes a computer associated with a 3D printer that slices a file format exported from a 3D modeling program. The sliced program creates a tool path for heated nozzles. The data is then sent to another part of the printer, which then manufactures the solid fuel grain layer by layer on a build platform.

A dual heated nozzle configuration may extrude materials and precisely lay them down in successive layers, where the nozzles move as an x-y plotter, and the platform moves, or drops, with a z motion according to the tool path of the solid fuel grain. A suitable system is available from Stratasys, Incorporated of Minneapolis, Minn. FDM printers may include without limitation The Stratasys Fortus 900, The Stratasys Polyjet machines, The Stratasys Connex machines, The Ultimaker machines, The Makerbots Rep 2, and 5th Generation machines. One nozzle is connected to a reservoir containing the nMx powder and another nozzle is connected to the thermoplastic polymer, which may either be a bead or wound about a spool the feeds the nozzle.

The thermoplastic polymer and the nMx powder are used to create each cross section of the solid fuel grain. As the heated nozzle softens the thermoplastic, nMx powder sprayed from one of the dual nozzles into a heating zone to disperse the nanocomposite within the softened thermoplastic polymer before the nozzle reacts to the layering instructions from the 3D software program. The thermoplastic polymer and the nMx nanocomposite are layered at the same time and the extruded base material can harden. The process is repeated based on the 3D instructions for the solid fuel grain now located at 3D printer until the 3D solid fuel grain is complete.

The semi-fluid formulation may be cast into a motor casing. A cylindrical type casing can be made prior to casting. It is an embodiment of the present invention where the fuel grain may be cast, molded, extruded, or in some instances machined into a cylindrically shape having a center port that is star shaped, a circular shaped, Maltese cross shaped, clover shaped, helix shaped, double anchor, rod in tube, and the like, so long as there is an outer cylindrical body having two distal ends and a hollow inner cavity, or port, with a shape that is designed to maximize the burn rate characteristics of an SRM or HRM solid fuel grain.

The solid fuel grains as described herein, being a thermoset polymer or a thermoplastic polymer matrix with nMx, may be used with SRMs or HRMs known within the art. A typical SRM will at least include a motor with an igniter, a head closure cap, a cylindrical case/combustion chamber, and a nozzle. The igniter, having a pyrotechnic that releases and transfers heat about the inner surfaces of the fuel grain's port, starts the thrusting event by igniting these surfaces to combustion and flames to form. The solid propellant of the present invention may be packed into a combustion chamber under pressure or, alternatively, created as a cylindrical elongated construct having two distal ends with a longitudinally extending bore, a port, therein (see FIG. 29a). For an HRM, the fuel grain is less an oxidizer as an additive and the port is made to meet via an injector or valve a gaseous flow of an oxidizing material held in a separate container near the combustion chamber (see FIG. 29b).

The foregoing words describe embodiments for a nanocomposite having two distinct nanoparticles that render unique burning characterizes. A bottom up synthesis creates nanoparticles that are carefully sized and passivated at the controlled first reaction step of $LiAlH_4$ decomposition. The nanocomposite is air stable being $Li_3AlH_6$ nanoparticles, elemental Al nanoparticles, an amount of Ti metal, and a nanoscale organic layer, which protects and preserves the high energy densities of the nanoparticles isolated from the precisely controlled reaction. All compositions of matter, methods for making the same, and/or uses of the present invention disclosed and claimed herein can be made and executed without undue experimentation. However, these words are not a limitation on the scope of the present invention but are written to detail certain embodiments thereof. Changes made by one of ordinary skill in the art to our invention does not alter and take away from the scope and spirit of our invention and are meant to be captured herein. Thus, the scope of the present invention may be defined by the following claims.

REFERENCES

[1] T. Himanshu, et al. (2008) Increased Hot-Plate Ignition Probability for Nanoparticle-Laden Diesel Fuel. *Nano Lett*, 8(5), pp 1410-1416.
[2] Ehrlich, et al. (1966) The Chemistry of Alane. XI. A New Complex Lithium Aluminum Hydride, $Li_3AlH_6$. *Journal of the American Chemical Society*, 88:4, pp. 858-860.
[3] Dvorak, J. J., et al. Process for Preparing Alkali Metal Aluminum Hexahydrides. U.S. Pat. No. 3,357,806. Issued Dec. 12, 1967.
[4] Dilts, et al. (1971) A Study of the Decomposition of Complex Metal Hydrides. *Inorganic Chemistry*, vol. 11 no. 6, pp. 11230-1236.
[5] Fasolino, L. G. Department of Navy—Office of Naval Research. (1963) *Heat of Formation of $Li_3AlH_6$*. Washington, D.C.
[6] Chen, et al. (2001) Reversible Hydrogen Storage via Titanium-Catalyzed $LiAlH_4$ and $Li_3AlH_6$. *J. Phys. Chem. B*, vol. 105, pp. 11214-11220.
[7] Mahendiran, C. et al. (2009) Sonoelectrochemical Synthesis of Metallic Aluminum Nanoparticles. *Eur. J. Inorg. Chem.* 2050-2053.
[8] Pecharsky, V.; Balema, V.; "Method of production of pure hydrogen near room temperature from aluminum-based hydride materials," U.S. Pat. Pub. No. 2003/0026757.
[9] Choi, J. Y. et al. (2011) Reaction Mechanisms in the $Li_3AlH_6/LiBH_4$ and $Al/LiBH_4$ Systems for Reversible Hydrogen Storage. Part 1: H Capacity and Role of Al. *The Journal of Physical Chemistry C*, 115, pp. 6040-6047.
[10] Yang, J. et al., Method of Enhancing Thermal Conductivity in Hydrogen Storage Systems,"U.S. Pat. App. No. 20110165061.
[11] Buzea, C., Pacheco-Blandino, I. I., et al. (2007) Nanomaterials and nanoparticles: Sources and toxicity. *Biointerphases*, vol. 2(issue 4), pp. MR17-MR172.
[12] Roduner, E. (2006) Size Matters: Why Nanomaterials are Different. *Chem. Soc. Rev.*, 35 583-592).
[13] Anderson, S. L.; et al. "Production of Nanoparticles Using Homogenous Milling and Associated Products." U.S. Pat. Appl. Pub. (2015) US 2015/0086416.
[14] Balema et al. (2000) Rapid solid-state transformation of tetrahedral $[AlH_4]$—into octahedral $[AlH_6]$—in lithium aluminhydride. *Chemical Communications—The Royal Society of Chemisty*, pp. 1665-1666.
[15] Balema et al. (2001) Titanium catalyzed solid-state transformation in $LiAlH_4$ during high-energy ball milling. *Journal of Alloys and Compounds*, vol. 329, pp. 108-114.
[16] Jouet, et al., *Chem. Mater.* 17:2987-2996, 2005.
[17] Foley, et al., *Chem. Mater.* 17:40864091. 2005.
[18] Jelliss, P. A.; Buckner, S. W.; Chung, S. W.; Thomas, B. J.; "Passivated metal nanoparticles having an epoxide-based oligomer coating", U.S. patent application Ser. No. 13/178,398.
[19] Thomas et al., "Synthesis of aluminum nanoparticles capped with copolymerizable epoxides," *J. Nanopart. Res.*, 15:1729, 2013.
[20] U.S. Pat. No. 6,251,349 "Method of Fabrication of Complex Alkali Metal Hydrides" Zaluska, A., et al. Jun. 26, 2006 citing J Mayet, S. Kovacevic, and J. Tranchant, *Bull. SOC. Chim. Fr.*, vol. 2 pg. 504, (1973).
[21] Jelliss, P. A.; Buckner, S. W.; Thomas, B. J.; "Novel Hydrogen-Evolving Polymer-Capped Aluminum Nanoparticles, Composites, and Methods of Synthesis Using Lithium Aluminum Hydride", U.S. application Ser. No. 14/259,859.
[22] Pyrz W. D., et al., (2008) Particle Size Determination Using TEM: A Discussion of Image Acquisition and Analysis for the Novice Microscopist, *Langmuir*, 24, pp. 11350-11360.
[23] Bastide, et al., *Stud. Inorg. Chem.*, 3:785-788, 1983.
[24] Varin, et al. (2010) Decomposition behavior of unmilled and ball milled lithium alanate ($LiAlH_4$) including long-term storage and moisture effects. *Journal of Alloys and Compounds* 504 89-101.
[25] Agrawal, Jai P., *High Energy Materials: Propellants, Explosives, and Pyrotechnics*. Weinheim: Wiley VCH Verlag GmbH & Co. KgaA. 2010.
[26] Woodson, C. et al.; "Rocket fuels based on metal hydrides and poly-DCPD," U.S. Pat. Pub. No. 2003/0164215.

We claim:

1. A solid propellant formulation comprising: a combination of a nanocomposite powder, oxidizer, a polymeric binder, and optional additives, wherein the nanocomposite powder further comprises a first nanoparticle being $Li_3AlH_6$ and a second nanoparticle being elemental Aluminum metal, wherein both nanoparticles are associated with an amount of Ti metal and are passivated by a nanoscale organic layer.

2. The solid propellant formulation of claim 1, wherein the polymeric binder includes polypropylene, PP Homopolymer (HPPP), PP Copolymer (CPPP), Polylactic Acid (PLA), acrylonitrile-butadiene-styrene (ABS), High Impact Polystyrene (HIPS), Thermoplastic Elastomer (TPE), Ethylene Vinyl Acetate (EVA), PolyAmide (PA), PE Low Density (LDPE/LLDPE), PE High Density (HDPE), Thermoplastic Elastomer, Polyphenylene Sulphide, thermoplastic polyurethane or polybutadienes (($C_4H_6)_n$), polybutadiene-acrylic acid terpolymer, styrene block-copolymers, thermoplastic silicone elastomer, aliphatic or semi-aromatic polyamides, thermoplastic vulcanisate, polyvinyl alcohol, polycarbonate, polylactic acid, polymethylmethacrylate, polyethylene, polystyrene, nylon, polycarbonate, polyvinyl chloride, Teflon, glycidyl azide polymer (GAP), BAMO, NMMO, HTPB, Low Viscosity HTPB (hydroxyl-terminated polybutadiene/LV HTPB), polyurethane or polybutadienes (($C_4H_6)_n$), polybutadiene-acrylic acid (PBAA), polybutadiene-acrylic acid terpolymer, polybutadiene-acrylic acid acrylonitrile (PBAN) carboxyl terminated polybutadiene (CTPB), elastomeric polyesters, polyethers, polymerized epoxy resins, poly-norbornene, poly-norbornadiene, poly-dicyclopentadiene, poly-cyclopentene, poly-cycloheptene, poly-cyclooctene, poly-cyclooctadiene, poly-cyclododecene, poly-7-oxanorbomene, poly-7-oxanorbornadiene, or any combination thereof.

3. The solid propellant formulation of claim 1, wherein the optional additives include a powdered oxidizer, plasticizers, a fuel, a curing agent, a bonding agent, a burn rate modifier, or any combination thereof.

4. The solid propellant formulation of claim 3, wherein the powdered oxidizer includes ammonium perchlorate ($NH_4ClO_3$) powder, metal perchlorates, metal nitrates, ammonium nitrate, ammonium dinitramide ($NH_4N(NO_2)_2$), or any combination thereof.

5. The solid propellant formulation of claim 3, wherein the plasticizer includes dioctyl sebacate, dioctyl adipate ("DOA"), isodecyl perlargonate (IDP), dioctyl phthalate ("DOP"), or any combination thereof.

6. The solid propellant formulation of claim 3, wherein the fuel includes micron aluminum (Al 32 µm or 44 µm), beryllium, zirconium, titanium, boron, magnesium, or alloys or combinations thereof.

7. The solid propellant formulation of claim 3, wherein the curing agent includes Modified diisocyanate (143L), polyurethane hexamethylene diisocyanate ("HMDI"), isophorone diisocyanate ("IPDI"), toluene diisocyanate ("TDI"), trimethylxylene diisocyanate ("TMDI"), dimeryl diisocyanate ("DDI"), diphenylmethane diisocyanate ("MDI"), naphthalene diisocyanate ("NDI"), dianisidine diisocyanate ("DADI"), phenylene diisocyanate ("PDI"), xylene diisocyanate ("MXDI"), ethylenediisocyanate ("HDI"), triisocyanates, polyfunctional isocyanates, or any combination thereof.

8. The solid propellant formulation of claim 3, wherein the bonding agent includes coconut oil, palm oil, cottonseed oil, vegetable oil, soybean oil, olive oil, peanut oil, corn oil, sunflower oil, safflower oil, jojoba oil, canola oil, shea butter, cocoa butter, milk fat, amaranth oil, apricot oil, argan oil, avocado oil, babassu oil, ben oil, algaroba oil, coriander seed oil, false flax oil, grape seed oil, hemp oil, kapok seed oil, meadowfoam seed oil, okra seed oil, perilla seed oil, tepanol, poppyseed oil, prune kernel oil, pumpkin seed oil, quinoa oil, ramtil oil, rice bran oil, camellia oil, thistle oil, wheat germ oil, poly amines (HX-752), beeswax, chinese wax, lanolin, shellac wax, bayberry wax, candelilla wax, carnauba wax, castor wax, esparto wax, japan wax, ouricury wax, rice bran wax, soy wax, tallow tree wax, ceresin wax, montan wax, ozocerite, peat wax, petroleum wax, paraffin wax, microcrystalline wax, or any combination thereof.

9. The solid propellant formulation of claim 2, wherein the polymeric binder includes polypropylene, PP Homopolymer (HPPP), PP Copolymer (CPPP), Polylactic Acid (PLA), acrylonitrile-butadiene-styrene (ABS), High Impact Polystyrene (HIPS), Thermoplastic Elastomer (TPE), Ethylene Vinyl Acetate (EVA), PolyAmide (PA), PE Low Density (LDPE/LLDPE), PE High Density (HDPE), Thermoplastic Elastomer, Polyphenylene Sulphide, thermoplastic polyurethane or polybutadienes (($C_4H_6$)$_n$), polybutadiene-acrylic acid terpolymer, styrene block-copolymers, thermoplastic silicone elastomer, aliphatic or semi-aromatic polyamides, thermoplastic vulcanisate, polyvinyl alcohol, polycarbonate, polylactic acid, polymethylmethacrylate, polyethylene, polystyrene, nylon, polycarbonate, polyvinyl chloride, Teflon, or any combination thereof, wherein these polymeric binders are compatible base materials for 3D printing techniques including fused deposition modeling (FDM), Selective Laser Sintering (SLV), Stereolithography, Continuous Liquid Interface Production, powder bed printing, or Inkjet Head printing, and wherein said base material is endowed with the burning characteristics of the nanocomposite powder.

10. The solid rocket formulation of claim 2, wherein:
a.) the polymeric binder is a matrix for the nanocomposite powder and is endowed with the burning characteristics of the same;
b.) the polymeric binder includes optional additives being a powdered oxidizer, plasticizers, a fuel, a curing agent, a bonding agent, a burn rate modifier, or any combination thereof; and
c.) the polymeric binder is cast, molded, extruded, or machined into a cylindrical shape having a center port that is star shaped, circular shaped, Maltese cross shaped, clover shaped, helix shaped, double anchor, rod in tube, or any combination thereof so long as there is an outer cylindrical body having two distal ends and a hollow inner cavity.

11. The solid rocket formulation of claim 10, wherein the cylindrical shaped polymeric binder having a center port may be used as a fuel grain for a solid rocket motor or a hybrid rocket motor.

12. The solid rocket formulation of claim 11, wherein the hybrid rocket motor includes pressurized gaseous oxidizers such as hydrogen peroxide, nitrous oxide, oxygen, or any combination thereof.

13. The solid rocket formulation of claim 2, wherein the nanocomposite powder may be pressed, cast, or 3D printed within a solid fuel grain with a mass from 0.05% to 50% along with any one of the polymeric binders having a mass from 1% to 20%, and a solid oxidizer having a mass from 50% to 80%.

14. The solid rocket formulation of claim 2, wherein the nanocomposite powder may be pressed, cast, or 3D printed within a solid fuel grain with a mass from 0.05% to 50% along with any one of the polymeric binders having a mass from 1% to 50%.

15. The solid rocket formulation of claim 1, wherein the mass percentage of the nanoscale organic layer about the two distinct core metal nanoparticles in the final composite can vary from 25% to 75% by mass and includes: 1,7-octadiene, 1,9-decadiene, myrcene, or 1,13-tetradecadiene, 1,3-butadiene, isoprene, 2-methyl-1,3-pentadiene, 2,3-dimethyl-1,3-butadiene, 1,3-pentadiene, 2-methyl-3-ethyl-1,3-butadiene, 2-methyl-3-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-octadiene, 2,4-diethyl-1,3-butadiene, 2,3-di-n-propyl-1,3-butadiene, and 2-methyl-3-isopropyl-1,3-butadiene, fatty alcohols being tert-butyl alcohol, tert-amyl alcohol, 3-methyl-3-pentanol, etchlorvynol, 1-octanol (capryl alcohol), pelargonic alcohol (1-nonanol), 1-decanol (decyl alcohol, capric alcohol), undecyl alcohol (1-undecanol, undecanol, hendecanol), lauryl alcohol (dodecanol, 1-dodecanol), tridecyl alcohol (1-tridecanol, tridecanol, isotridecanol), myristyl alcohol (1-tetradecanol), pentadecyl alcohol (1-pentadecanol, pentadecanol), cetyl alcohol (1-hexadecanol), palmitoleyl alcohol (cis-9-hexadecen-1-ol), heptadecyl alcohol (1-n-heptadecanol, heptadecanol), stearyl alcohol (1-octadecanol), nonadecyl alcohol (1-nonadecanol), arachidyl alcohol (1-eicosanol), heneicosyl alcohol (1-heneicosanol), behenyl alcohol (1-docosanol), erucyl alcohol (cis-13-docosen-1-ol), lignoceryl alcohol (1-tetracosanol), ceryl alcohol (1-hexacosanol), 1-heptacosanol, montanyl alcohol, cluytyl alcohol, or 1-octacosanol, 1-nonacosanol, myricyl alcohol, melissyl alcohol, or 1-triacontanol, 1-dotriacontanol (lacceryl alcohol), geddyl alcohol (1-tetratriacontanol), cetearyl alcohol, carboxylic (fatty) acids being butyric acid [CH3(CH2)2COOH], valeric acid [CH3

$(CH_2)_3COOH$], caproic acid [$CH_3(CH_2)_4COOH$], enanthic acid [$CH_3(CH_2)_5COOH$], caprylic acid [$CH_3(CH_2)_6COOH$], pelargonic acid [$CH_3(CH_2)_7COOH$], capric acid [$CH_3(CH_2)_8COOH$], undecylic acid [$CH_3(CH_2)_9COOH$], lauric acid [$CH_3(CH_2)_{10}COOH$], tridecylic acid [$CH_3(CH_2)_{11}COOH$], myristic acid [$CH_3(CH_2)_{12}COOH$], pentadecylic acid [$CH_3(CH_2)_{13}COOH$], palmitic acid [$CH_3(CH_2)_{14}COOH$], margaric acid [$CH_3(CH_2)_{15}COOH$], stearic acid [$CH_3(CH_2)_{16}COOH$], nonadecylic acid [$CH_3(CH_2)_{17}COOH$], arachidic acid [$CH_3(CH_2)_{18}COOH$], PEG having various molecular weights, tetraethylene glycol, triethylene glycol, or any combination thereof.

* * * * *